United States Patent
Lundsgaard et al.

(10) Patent No.: US 9,859,940 B1
(45) Date of Patent: *Jan. 2, 2018

(54) PHONE HOLDER

(71) Applicant: Allstate Insurance Company, Northbrook, IL (US)

(72) Inventors: Soren K. Lundsgaard, Inverness, IL (US); Joy A. Thomas, Glenview, IL (US); David J. Krug, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/881,973

(22) Filed: Oct. 13, 2015

Related U.S. Application Data

(63) Continuation-in-part of application No. 14/615,037, filed on Feb. 5, 2015, now Pat. No. 9,281,857.

(51) Int. Cl.
*H04B 1/3877* (2015.01)
*H04B 1/3822* (2015.01)
*H04W 4/00* (2009.01)

(52) U.S. Cl.
CPC ......... *H04B 1/3877* (2013.01); *H04B 1/3822* (2013.01); *H04W 4/008* (2013.01)

(58) Field of Classification Search
CPC ........ H01H 71/08; H01R 25/14; H01R 25/16; H01R 4/36; H02B 1/04; H02B 1/056; H02B 1/20
See application file for complete search history.

(56) References Cited

U.S. PATENT DOCUMENTS

| | | | |
|---|---|---|---|
| 5,995,622 A | 11/1999 | Roussy et al. |
| 5,996,866 A | 12/1999 | Susko et al. |
| 6,185,302 B1 | 2/2001 | Rytkonen et al. |
| 6,243,463 B1 | 6/2001 | Cheon |
| 6,269,258 B1 | 7/2001 | Peiker |
| 6,464,185 B1 | 10/2002 | Minelli et al. |
| 6,888,940 B1 | 5/2005 | Deppen |

(Continued)

FOREIGN PATENT DOCUMENTS

WO   2006077460 A1   7/2006

OTHER PUBLICATIONS

Sep. 3, 2015—U.S. Non-Final Office Action—U.S. Appl. No. 14/615,037.

(Continued)

*Primary Examiner* — Thomas D Lee
*Assistant Examiner* — Frantz Bataille
(74) *Attorney, Agent, or Firm* — Banner & Witcoff, Ltd.

(57) ABSTRACT

An apparatus for holding a cell phone or a mobile device in a vehicle that includes a phone enhancer and a cradle to hold the cell phone in the vehicle, a keypad wirelessly connected to the phone enhancer, and a phone enhancer application installed and operated on the cell phone. The keypad includes a Bluetooth connection for wireless connection of the keypad to the phone enhancer. The keypad receives one or more keypad instructions that include one or more of the following: answer the cell phone, hang up the cell phone, pause and play music from the cell phone, adjust the volume of a phone call on the cell phone, adjust the volume of the music on the cell phone, and dial a phone number for a phone call on the cell phone. The phone enhancer application determines a driver of the vehicle when multiple users are in the vehicle.

20 Claims, 38 Drawing Sheets

(56) References Cited

U.S. PATENT DOCUMENTS

| | | | |
|---|---|---|---|
| 7,003,333 | B2 | 2/2006 | Chow et al. |
| 7,103,397 | B2 | 9/2006 | Oh |
| 7,274,788 | B2 | 9/2007 | Schanz et al. |
| 7,697,963 | B1 | 4/2010 | Pomery |
| 7,920,905 | B2 | 4/2011 | Bury |
| 8,473,018 | B2 * | 6/2013 | Wilson ................. H04B 1/3877 455/11.1 |
| 8,487,169 | B2 | 7/2013 | Dunlop |
| 8,783,458 | B2 | 7/2014 | Gallagher et al. |
| 8,827,341 | B2 | 9/2014 | Sofield |
| 2003/0128840 | A1 | 7/2003 | Luginbill et al. |
| 2005/0135603 | A1 | 6/2005 | Stanford |
| 2005/0255895 | A1 | 11/2005 | Lee et al. |
| 2008/0057889 | A1 | 3/2008 | Jan |
| 2009/0294617 | A1 | 12/2009 | Stacey et al. |
| 2010/0035667 | A1 | 2/2010 | Bury |
| 2011/0045872 | A1 * | 2/2011 | Simmons ............... G02B 27/01 455/557 |
| 2011/0163211 | A1 | 7/2011 | Cicco |
| 2012/0106304 | A1 | 5/2012 | Strauser |
| 2014/0063180 | A1 * | 3/2014 | Sharma ................. G08C 19/00 348/36 |
| 2014/0066049 | A1 * | 3/2014 | Cho .................... B60W 50/085 455/420 |
| 2016/0036478 | A1 | 2/2016 | Wong |

OTHER PUBLICATIONS

Belkin Car Cup Holder Mount for iPhone—Apple Store (Canada), Sep. 1, 2015 [On-line], Retrieved from the internet: http://store.apple.com/ca/product/HH0K2ZM/A/belkin-car-cup-holder-mount-for-iphone.

Rotating Windscreen Car Mount Stand Holder for 7 inch Tablet PC GP . . . , Sender.Asia Largest Online Asian Marketplace, Sep. 1, 2015 [On-line], retrieved from the internet: http://www.sender.asia/showproduct_Rotating-Windscreen-Car-Mount-. . . .

360 Degree Rotating Suction Cup Car Mount Holder for Mobile Phone Tablet, Hytparts, Sep. 1, 2015 [On-line], retrievedfrom the internet: http://www.hytparts.com/004768-360-degree-rotating-suction-cup-car-mount-holder-for-mobile-phone-tablet.html.

Koomus CD-Eco CD slot Universal Smartphone Car Mount Holder Cradle, Sep. 1, 2015 [On-line] retrieved from the internet: http://www.koomus.com/products/cd-eco.

CT-8510S Mini Universal Stick Windshield Car Mount Holder for iPhone 5 / iPhone 4 & 4S / iPad mini 1 / 2 / 3 / New iPad / Samsung / HTC / Nokia / Other 2.5-10 inch Tablet PC, Support 360 Degree Rotation, SUNKSKY—CT-8510S Mini Universal Stick Windshield Car Mount Hol . . . , Sep. 1, 2015, [On-line], Retrieved from the internet: http://www.sunsky-online.com/product/default!view.do?subject.id=279434.

Heavy-Duty Universal Car Mount Holder, Sep. 1, 2015 [On-line], retrieved from the internet: http://www.eflystone.com/car-vehicle-electronics/175-heavy-duty-univ . . . .

Apr. 20, 2016—U.S. Non-Final—U.S. Appl. No. 14/881,967.

Sep. 4, 2015—U.S. Non-Final Office Action—U.S. Appl. No. 14/625,854.

Apr. 20, 2016—U.S. Non-Final Office Action—U.S. Appl. No. 14/881,970.

* cited by examiner

PHONE HOLDER

RELATED APPLICATIONS

The application is a continuation-in-part of U.S. application Ser. No. 14/615,037, filed Feb. 5, 2015 which is incorporated in their entirety.

FIELD OF THE INVENTION

The present invention is directed towards an apparatus for holding a cell phone or mobile device in a vehicle, more specifically towards an apparatus for a phone cradle with rotary release.

BACKGROUND

Various designs of phone holders for vehicles have side and bottom contact points that may cover buttons or USB connections. Other various designs of phone holders for vehicles may provide side-by-side holding designs which may potentially force the phone off center. Other various designs of phone holders for vehicles may provide side-by-side holding designs that require and necessitate a large grabbing area. Other various phone holders for vehicles may not provide the ability to attach or remove the cell phone or mobile device with one hand. The problem solved by this invention may be one of a cell phone or mobile device enhancer correcting many of these problems identified above. A phone holder that holds the cell phone or mobile device or mobile device which does not cover the buttons and/or the USB connections is desired. The phone holder may also allow the user to attach or remove the cell phone or mobile device with one hand. The phone holder may also be intended to improve driver safety and holding the cell phone or mobile device in the cradle in a vehicle.

BRIEF SUMMARY OF THE INVENTION

The following presents a general summary of aspects of the invention. This summary is not intended as an extensive overview of the invention. It is not intended to identify key or critical elements of the invention or to delineate the scope of the invention. The following summary merely presents some concepts of the invention in a general form as a prelude to the more detailed description provided below.

In an aspect of the present invention, an apparatus for holding a cell phone in a vehicle that may include: a phone enhancer and a cradle attached to the phone enhancer configured to hold a cell phone in a vehicle, a keypad wirelessly connected to the phone enhancer, a phone enhancer application installed and operated on the cell phone. The phone holder may also include a vehicle mount to secure the phone holder to the inside of the vehicle such that the driver can see the cell phone more safely without diverting their attention/looks/gaze from the road ahead of them. The phone enhancer may wirelessly connect to the cell phone. The phone enhancer may include a Bluetooth connection for wireless connection of the cell phone to the phone enhancer. The keypad may include a Bluetooth connection for wireless connection of the keypad to the phone enhancer. The keypad may receive one or more keypad events and instructions that include one or more of the following: answer the cell phone, hang up the cell phone, pause and play music from the cell phone, adjust the volume of a phone call on the cell phone, adjust the volume of the music on the cell phone, and dial a phone number for a phone call on the cell phone. The phone enhancer application may determine a driver of the vehicle when multiple users are in the vehicle. The phone enhancer may transform the keypad events and instructions to a Bluetooth event and then send the keypad events and instructions to the cell phone. The phone enhancer may retain an order of pairing of cell phones and a least recently used connection list, wherein the least recently used connection list is a list of most recently connected cell phone to least recently connected cell phone. Additionally, when a cell phone has a valid connection with the phone enhancer, the phone enhancer may place an identification associated with the cell phone in the least recently used connection list to the most recently connected cell phone. Additionally, when the vehicle has multiple users whose cell phones have previously connected to the phone enhancer, the phone enhancer application may start when the cell phone detects the phone enhancer. The phone enhancer application may communicate with the phone enhancer and display in a list an identification of the other cell phones connected the phone enhancer. Further, when the vehicle has multiple users whose cell phone have previously connected to the phone enhancer, the phone enhancer may not allow an audio service or a keypad service until a driver of the vehicle is determined. The phone enhancer may include a power charger adapter connection and a USB connector connection.

In another aspect of the present invention, a mobile device holder for holding a mobile device in a vehicle that may include: a phone enhancer and a cradle attached to the phone enhancer configured to hold a mobile device in a vehicle, a keypad wirelessly connected to the phone enhancer, a phone enhancer application installed and operated on the mobile device. The phone holder may also include a vehicle mount to secure the phone holder to the inside of the vehicle such that the driver can see the mobile device more safely without diverting their attention/looks/gaze from the road ahead of them. The phone enhancer may wirelessly connect to the mobile device. The phone enhancer may include a Bluetooth connection for wireless connection of the mobile device to the phone enhancer. The keypad may include a Bluetooth connection for wireless connection of the keypad to the phone enhancer. The keypad may receive one or more keypad events and instructions that include one or more of the following: answer the mobile device, hang up the mobile device, pause and play music from the mobile device, adjust the volume of a phone call on the mobile device, adjust the volume of the music on the mobile device, and dial a phone number for a phone call on the mobile device. The phone enhancer application may determine a driver of the vehicle when multiple users are in the vehicle. The phone enhancer may transform the keypad events and instructions to a Bluetooth event and then send the keypad events and instructions to the mobile device. The phone enhancer may retain an order of pairing of mobile devices and a least recently used connection list, wherein the least recently used connection list is a list of most recently connected mobile device to least recently connected mobile device. Additionally, when a mobile device has a valid connection with the phone enhancer, the phone enhancer may place an identification associated with the mobile device in the least recently used connection list to the most recently connected mobile device. Additionally, when the vehicle has multiple users whose mobile devices have previously connected to the phone enhancer, the phone enhancer application may start when the mobile device detects the phone enhancer. The phone enhancer application may communicate with the phone enhancer and display in a list an identification of the other mobile devices connected the phone enhancer. Further, when the vehicle has multiple users whose mobile device have previously connected to the phone enhancer, the phone enhancer may not allow an audio service or a keypad service until a driver of the vehicle is determined.

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein.

The reader is advised that the attached drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 1A:
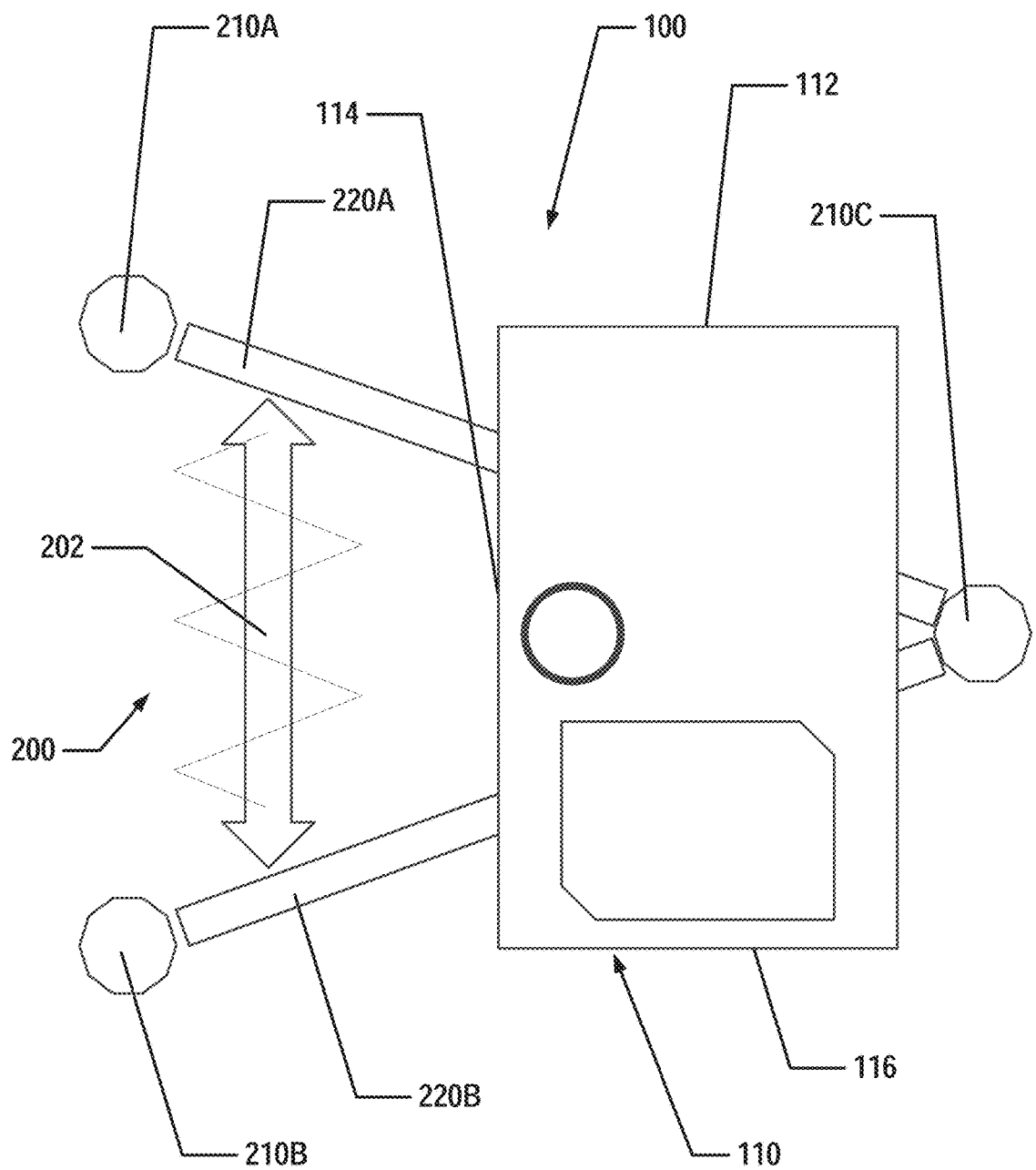
FIG. 1A illustrates a front plan view of an example phone holder in accordance with the present invention.
Figure 1B:
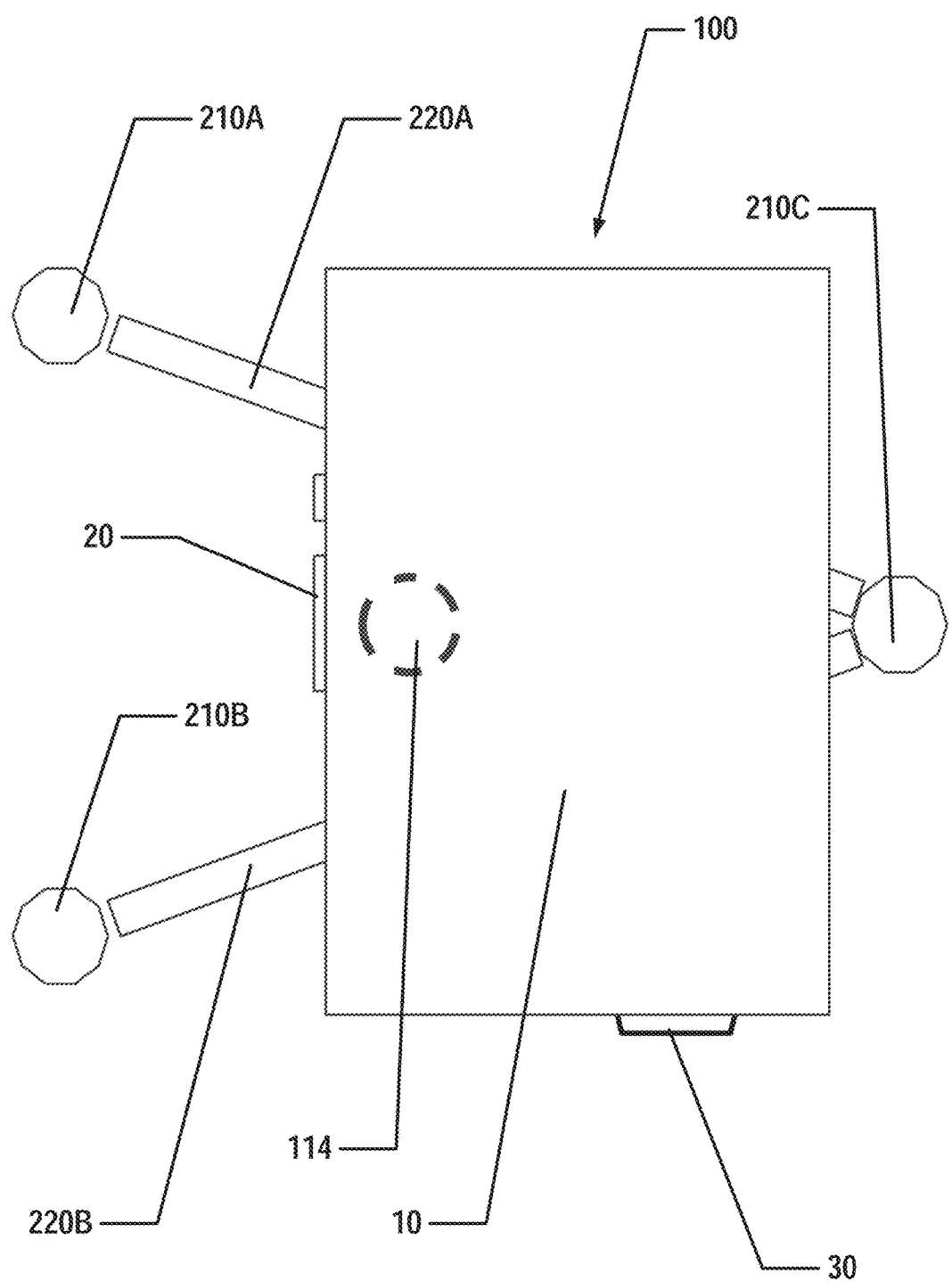
FIG. 1B illustrates a front plan view of the example phone holder shown in FIG. 1A with a cell phone or mobile device prior to engagement in accordance with this invention.
Figure 1C:
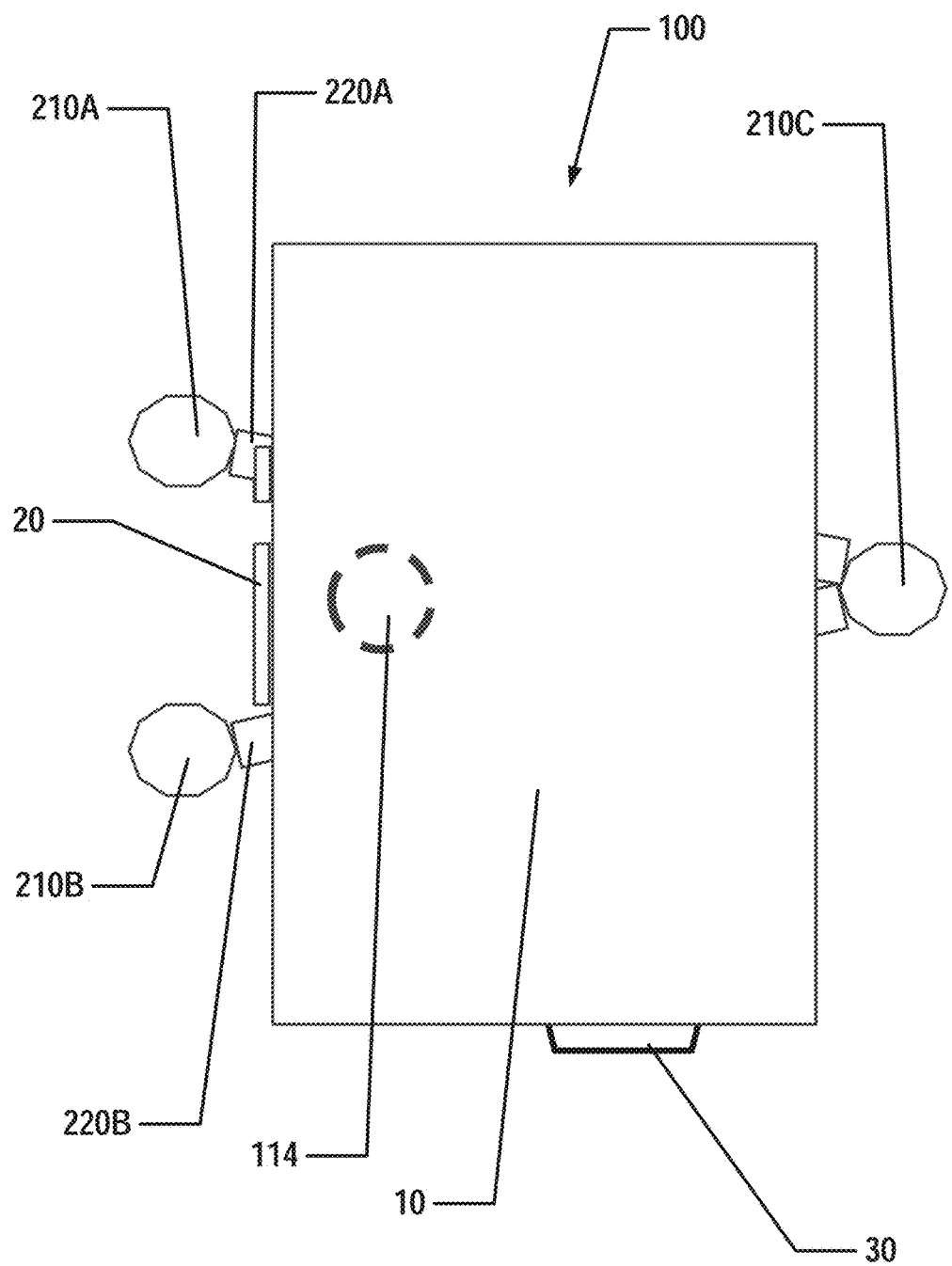
FIG. 1C illustrates a front plan view of the example phone holder shown in FIG. 1A with a cell phone or mobile device with the arm grab posts released in accordance with this invention.

FIG. 1 illustrates a phone holder 100 for use with a cell phone or mobile device 10 in a vehicle. The phone holder 100 may be used with a cell phone or other mobile device utilized in a vehicle. The mobile device may be any mobile device that may be utilized for display in a vehicle, for example, such as a GPS device, a tablet, a computer, or other mobile device.

The phone holder 100 may be secured to the inside of a vehicle such that the driver and/or passenger can see the screen of the cell phone or mobile device 10. The phone holder 100 may be secured in a variety of different ways to the inside of the vehicle. For example, the phone holder 100 may be secured to the inside of the vehicle by the use of a suction mechanism attached to the windshield. In another example, the phone holder 100 may be secured to the inside of the vehicle by the use of an attachment mechanism to the dashboard, such as a suction mechanism or other mechanical connection to the dashboard. In another example, the phone holder 100 may be secured to the vent system of the vehicle by a mechanical means, such as a clip or vice securing mechanism. Other example ways to secure the phone holder 100 to the inside of the vehicle may be utilized with the phone holder 100 without departing from this invention.

As illustrated in FIG. 1, the phone holder 100 may include a cradle 110 and a securement system 200. The securement system 200 may be attached to, engaged with, or connected to the cradle 110 in a variety of mechanical methods, such as screwed, snapped, clipped, etc. The cradle 110 may receive a cell phone or mobile device 10. The cell phone or mobile device 10 may include buttons 20, such as volume buttons or other operative buttons that are usually located on one side of the cell phone or mobile device 10. The cell phone or mobile device 10 may also include a USB connection or power connection port 30 at the bottom of the cell phone or mobile device 10. The securement system 200, as described below in the various embodiments, may engage and hold the cell phone or mobile device 10 within the cradle 110.

The cradle 110, as illustrated in FIG. 1 may include a base plate 112, a release mechanism 114, and a latch mechanism 116. The release mechanism 114 may be in the form of a latch button 114 as is illustrated in FIG. 1. The latch button 114 and the latch mechanism 116 may be defined or located on the base plate 112. Also, the latch mechanism 116 may be located internal to the base plate 112. The base plate 112 may be various shapes to be configured to accept the cell phone or mobile device 10. For example, since most cell phones or mobile devices 10 are rectangular-shaped, the base plate 112 may be rectangular-shaped. However, the base plate 112 may be other shapes without departing from this invention, such as square, circular, oval, pentagon, octagon, or other possible irregular shapes not mentioned.

The release mechanism 114 or the latch button 114 may be located on the base plate 112 such that when the user presses the cell phone or mobile device 10 into the cradle 110 and against the base plate 112, the cell phone or mobile device 10 presses against the latch button 114. Generally, the latch button 114 may extend above the base plate 112 such that when the cell phone or mobile device is placed flat against the base plate 112, the latch button 114 is depressed. The latch button 114 may release the latch mechanism 116 allowing the grab posts 210 to move and grab and engage the cell phone or mobile device 10. Generally the latch button 114 may be located approximately on the center of the base plate 112 between the first grab post 210A, the second grab post 210B, and the third grab post 210C.

The securement system 200 may include a triangular hold system. The triangular hold system may include a spring mechanism 202 or linkage elements and three grab posts (collectively listed as reference 210 and individually listed as reference numbers 210A, 210B, 210C). The three grab posts 210 may be connected by one or more arms 220A, 220B. The spring mechanism 202 or linkage elements (as will be described later) may spread the posts 210 during non-engagement of the cell phone or mobile device 10 and pull the grab posts 210 during the engagement of the cell phone or mobile device 10. When the latch button 114 is released, the spring mechanism 202 or linkage elements may force the posts 210 towards the cell phone or mobile device 10 for the securement of the cell phone or mobile device 10 in the cradle 110 and phone holder 100. The spring mechanism 202 may be any biasing element known and used in the art.

Figure 2A:
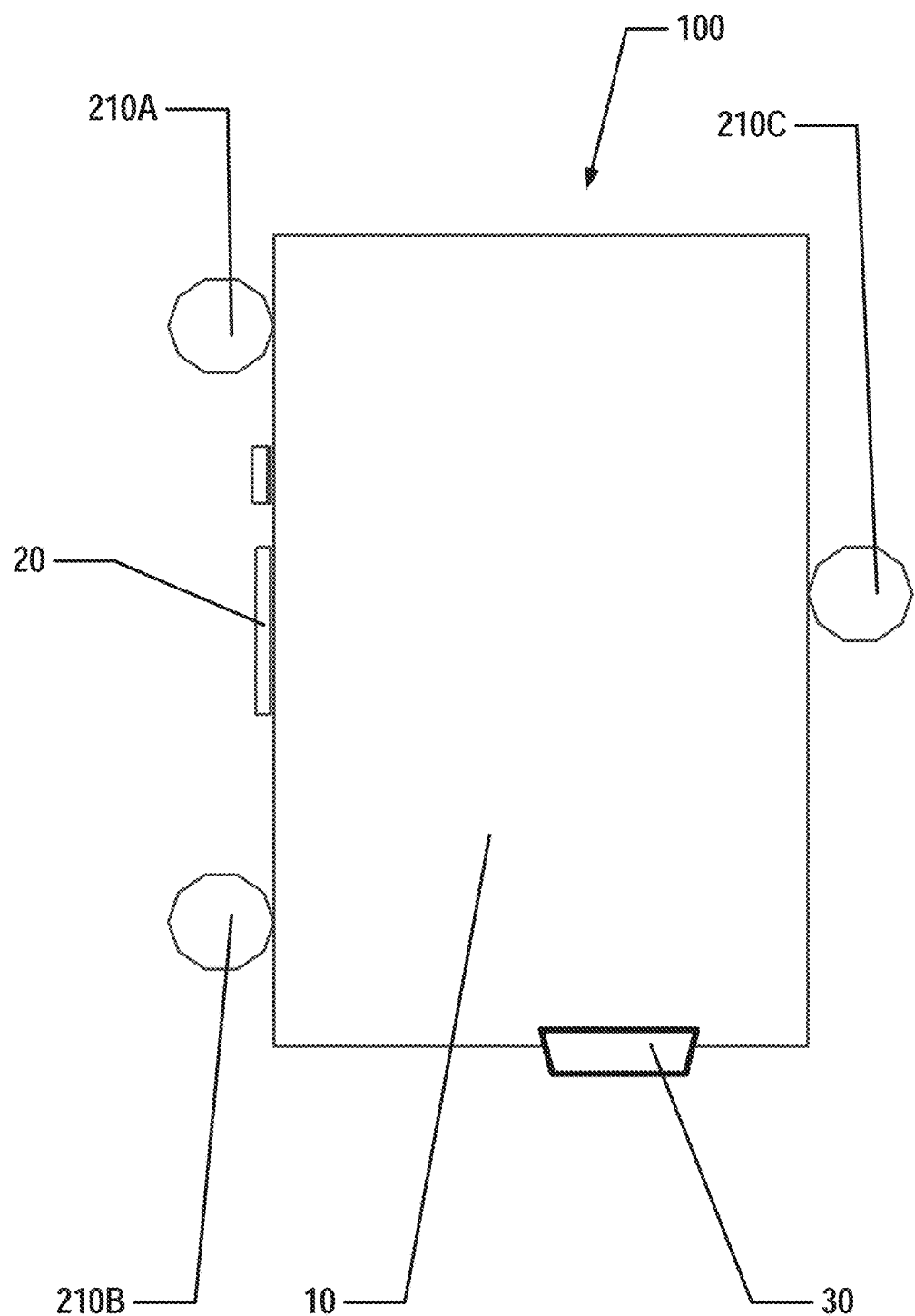
FIG. 2A illustrates a front plan view of the example phone holder shown in FIG. 1A with a cell phone or mobile device in accordance with this invention.
Figure 2B:
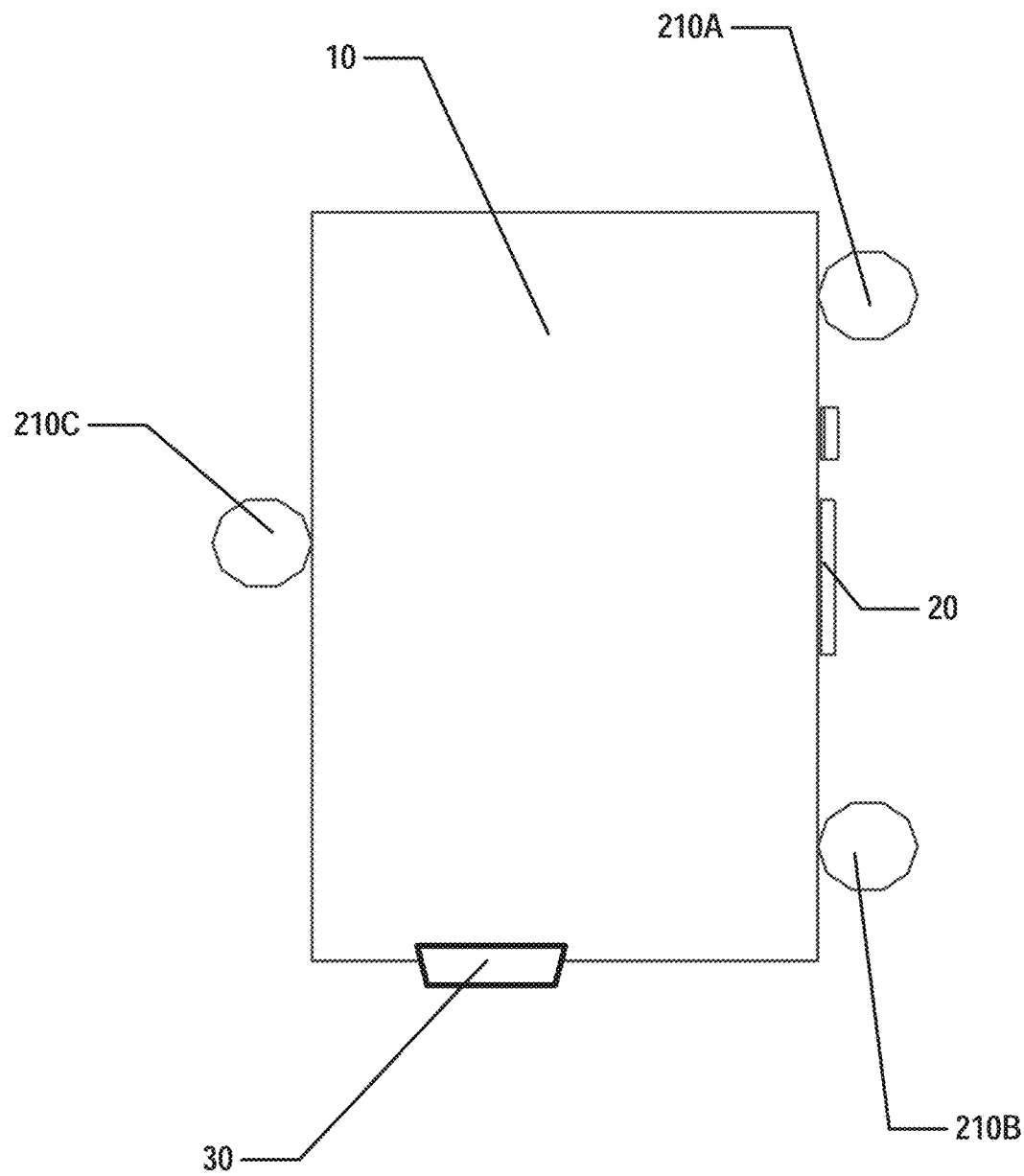
FIG. 2B illustrates a front plan view of the example phone holder shown in FIG. 1A in an opposite configuration from FIG. 2B with a cell phone or mobile device in accordance with this invention.

As illustrated in FIGS. 1A through 2B, the triangular hold system may include a first grab post 210A, a second grab post 210B, and a third grab post 210C. Each of the first grab post 210A, the second grab post 210B, and the third grab post 210C may be positioned to hold the long sides of the cell phone or mobile device 10. The first grab post 210A and the second grab post 210B may be positioned to contact and engage on one of the two long sides of the cell phone or mobile device 10. The third grab post 210C may be positioned to contact and engage on the opposite long side of the first grab post 210A and the second grab post 210B. FIG. 2A illustrates the first grab post 210A and the second grab post 210B located on the left side of the cell phone or mobile device 10 with the third grab post 210C located on the right side of the cell phone or mobile device 10 opposite the first grab post 210A and the second grab post 210B. FIG. 2B illustrates the first grab post 210A and the second grab post 210B located on the right side of the cell phone or mobile device 10 with the third grab post 210C located on the left side of the cell phone or mobile device 10 opposite the first grab post 210A and the second grab post 210B. Because the phone holder 100 can be rotated 360 degrees, the orientation of the third grab post 210C on the left or right side is not significant and will be shown in either rotation throughout the drawings.

As shown in FIGS. 2A and 2B, the grab posts 210 may be circular in shape. The grab posts 210 may be other shapes without departing from the invention, such as, half moon, square, hexagon, octagonal, or other irregular shapes without departing from this invention. Additionally, the grab posts 210 may also include flat areas. The grab posts shown in FIGS. 2A and 2B are circular in shape but have ten-flat sides to the circular post. The grab posts 210 may include other numbers of flat sides without departing from the invention. The flat sides on the grab posts 210 may help to hold or grip the sides of the cell phone or mobile device 10. Additionally, the grab posts 210 may be made of any resilient material, such as a soft rubber material without departing from this invention. Other materials may be utilized for the grab posts 210 without departing from this invention.

In another embodiment of the invention, and as shown in FIGS. 2A and 2B, the grab posts 210 may form an equilateral triangle. The angles of the grab posts 210 may be approximately 60 degrees. The angles of the grab posts 210 may also between 45 and 90 degrees without departing from the invention. Additionally, the angle between the first grab post 210A and the third grab post 210C may be equal to the second grab post 210B and the third grab post 210C, thereby creating an isosceles triangle between the grab posts 210.

The distance between the grab posts 210 when the grab posts 210 are engaged with the cell phone or mobile device 10 and in the locked position may be between approximately 3 and 5 inches. This distance may be dependent on the width of the cell phone or mobile device 10. For example, the distance between the first grab post 210A and the second grab post 210B may be between approximately 2 and 5 inches. The distance between the first grab post 210A and the third grab post 210C may be between approximately 2.5 and 4 inches. The distance between the second grab post 210B and the third grab post 210C may be between approximately 2.5 and 4 inches. Generally, the distance from the first grab post 210A and the second grab post 210B to the third grab post 210C will be equal, thereby forming an isosceles triangle.

Generally, the triangular hold system utilizing the three grab posts 210A, 210B, and 210C provides a number of benefits for holding rectangular-shaped objects or at least an object P with two parallel sides P1 and P2. For example, changing the angles and distances of the triangular hold system by rotating one or two points about an axis, the triangular hold system can hold (and release) different sized P objects. When the triangular hold system is holding an object P with points of contact on the parallel sides P1 and P2 of the object P, two points 210A and 210B will be on one parallel side P1 of the object P, and a third point 210C will be on the other parallel side P2 of the object P. The rule for a stable hold is that the line on a right angle from P1 and passing through 210A and 210C must intersect P1 between 210A and 210B. If this line does not intersect P1 between 210A and 210B, the hold will not be stable. The triangular hold system as disclosed with this invention follows these geometries and meets this criterion.

Additionally, the grab posts 210 may be slightly angled inward towards the cell phone or mobile device 10. With the grab posts 210 slightly angled inwards towards the cell phone or mobile device 10, a funnel effect may be created with the grab posts 210 and the cell phone or mobile device 10. The funnel effect may allow for the cell phone or mobile device 10 to be pulled in more and cause the grab posts 210 to grip the cell phone or mobile device 10 more.

Additionally, as the cell phone or mobile device 10 vibrates (either through the vibration mode of the cell phone or mobile device 10 or the vibration of the vehicle), the cell phone or mobile device 10 may become more engaged. This further engagement of the cell phone or mobile device 10 helps to stabilize the cell phone or mobile device 10 such that the stabilization allows for the analysis of the 3-axis accelerometer data from the cell phone or mobile device 10.

The cell phone or mobile device 10 may be rotated to remove the cell phone or mobile device 10 from the phone holder 100. When the user holds the cell phone or mobile device 10 and rotates the cell phone or mobile device 10 without touching the mount, one or more grab posts 210 move about an axis to change the geometry of the grab posts 210 such that the rectangular cell phone or mobile device 10 is no longer held by the phone holder 100. This action also opens the latch mechanism 114 and releases the cell phone or mobile device 10. The cell phone or mobile device 10 may be rotated left or right around a swivel axis. The latch mechanism 116 may latch to the open position as the user is already holding the cell phone or mobile device 10.

Figure 3A:
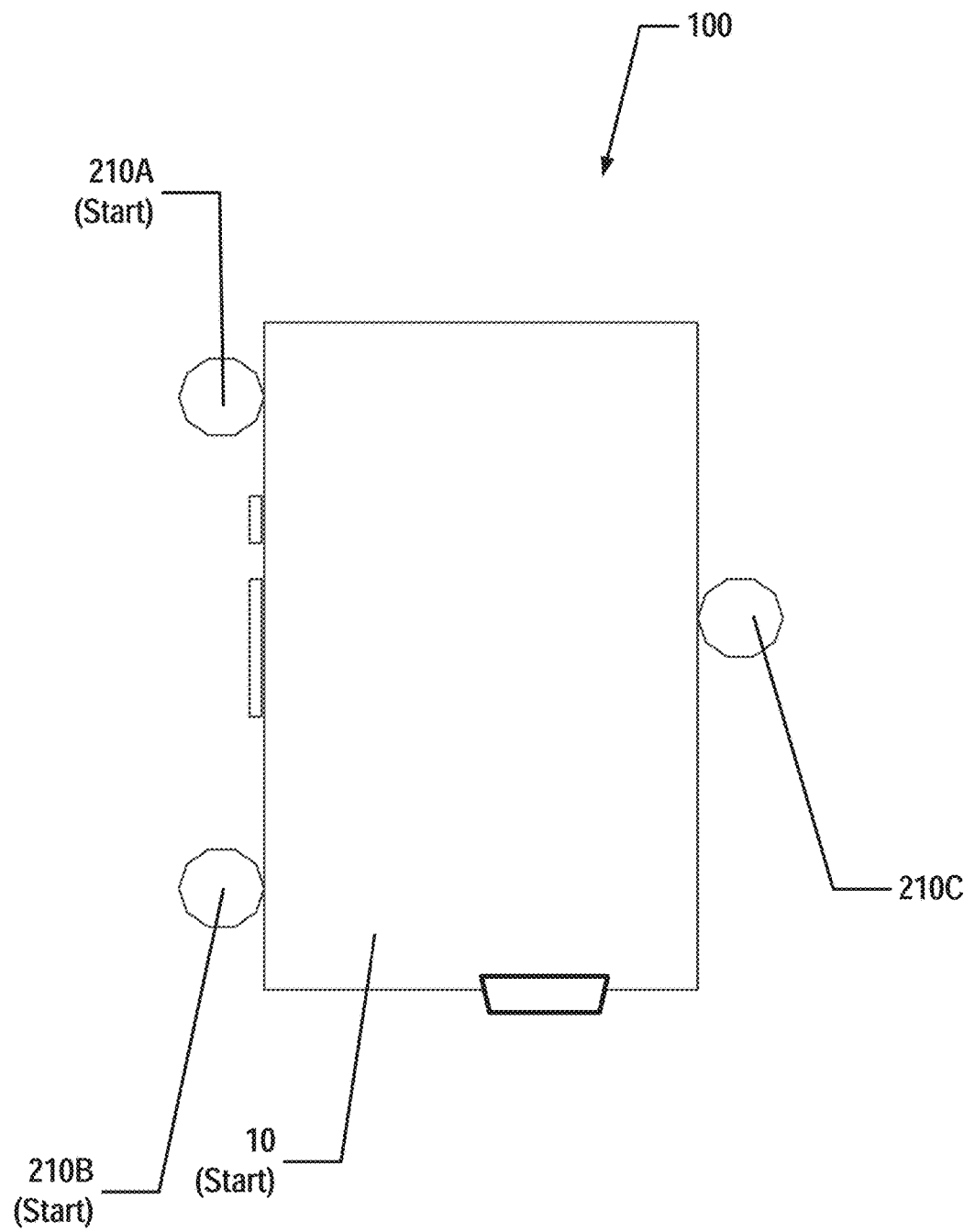
FIG. 3A illustrates a front plan view of the example phone holder shown in FIG. 1A showing the phone holder in a secure configuration in accordance with this invention.
Figure 3B:
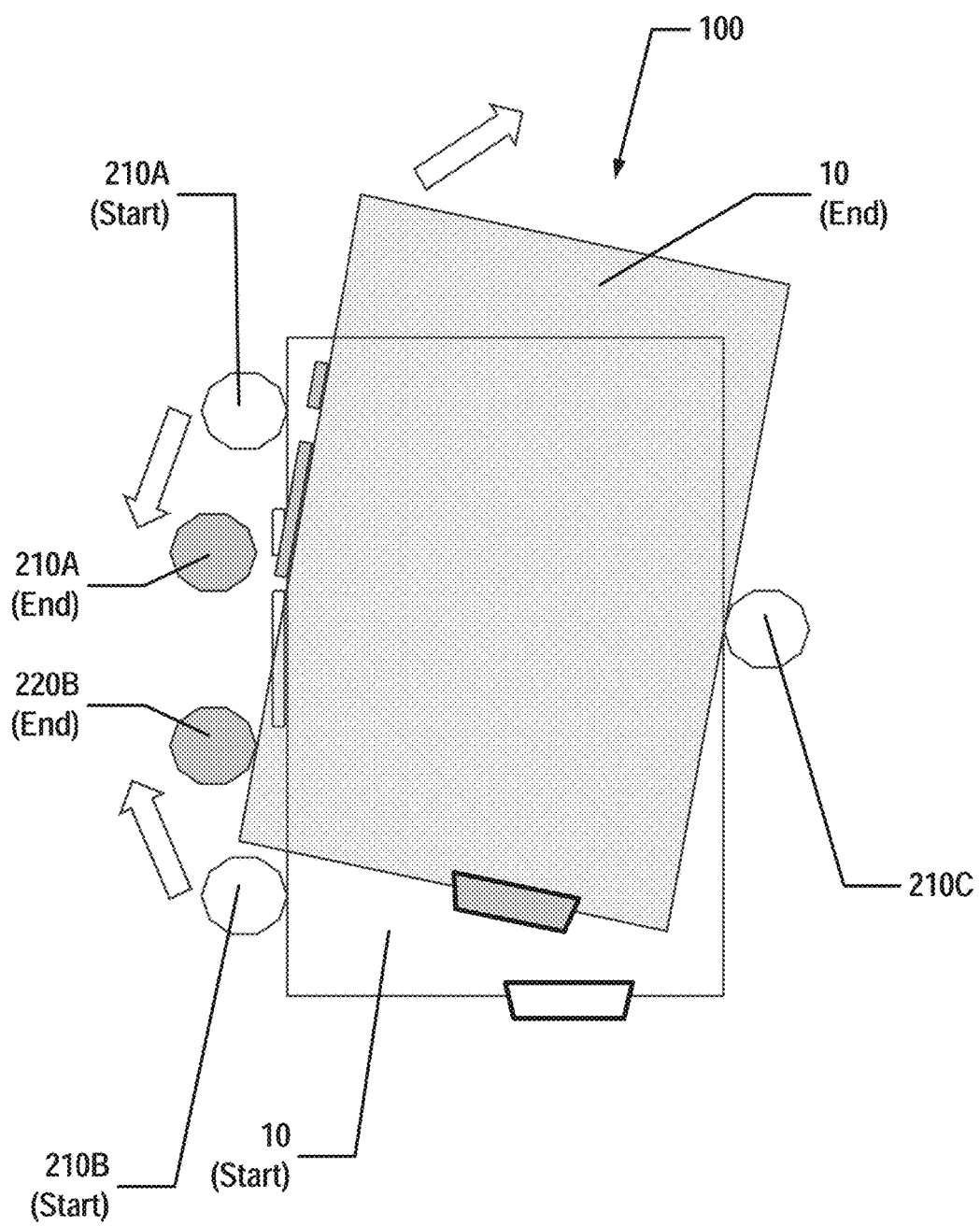
FIG. 3B illustrates a front plan view of the example phone holder shown in FIG. 1A with a secondary view showing the phone holder rotated in accordance with this invention.
Figure 3C:
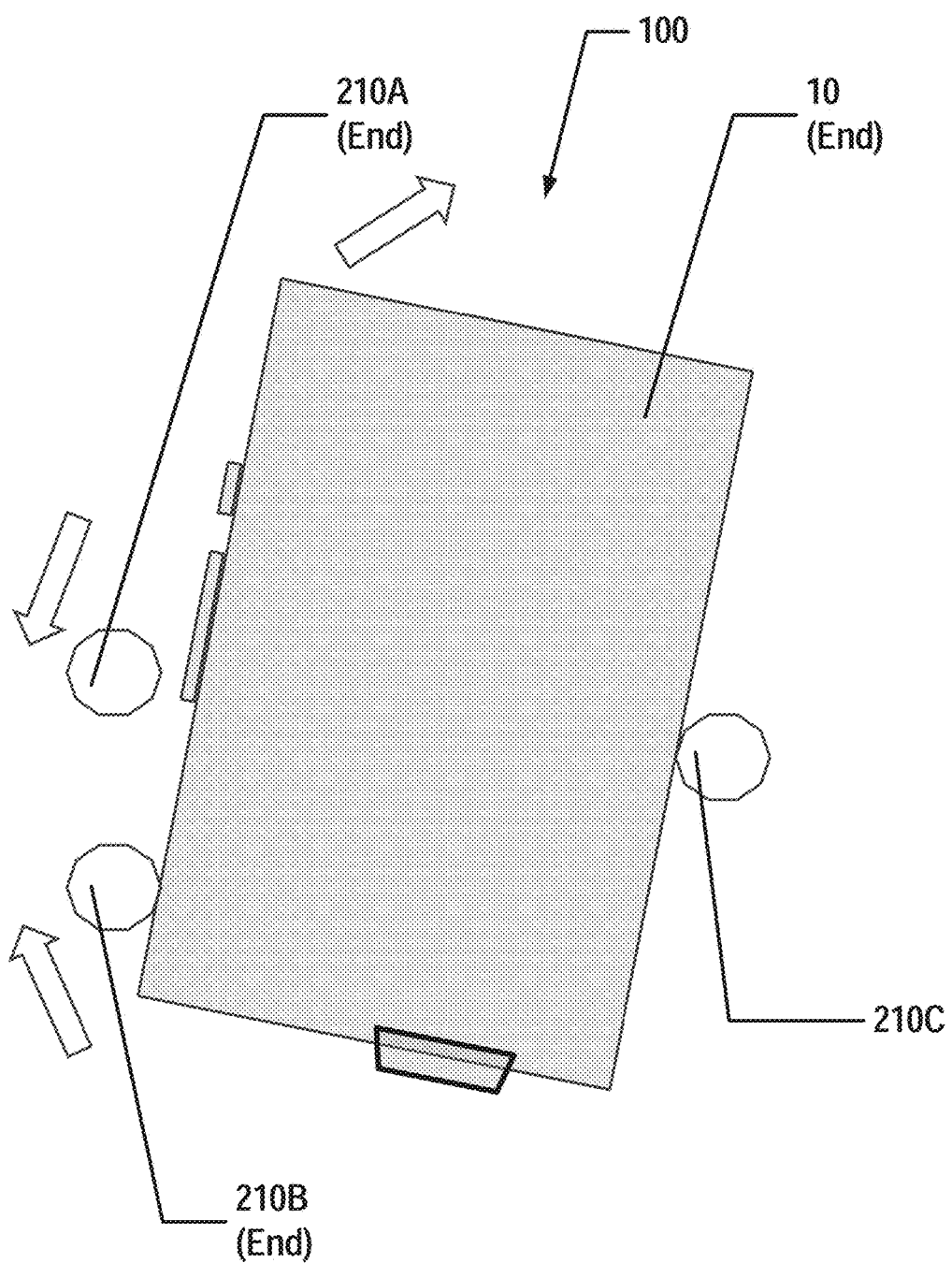
FIG. 3C illustrates a front plan view of the example phone holder shown in FIG. 1A in a released configuration in accordance with this invention.

FIGS. 3A through 3C illustrate the rotate release geometry of the securement system 200 when the cell phone or mobile device 10 is being released from the phone holder 100. As illustrated in FIG. 3A, in the starting position, as the user rotates the cell phone or mobile device 10 to the ending position, the cell phone or mobile device 10 is rotated about an axis of rotation about the third grab post 210C. When the release mechanism 114 is engaged, the grab posts 210 may rotate outward and then collapse inward. Additionally, as the user rotates the cell phone or mobile device 10 and when the cell phone or mobile device 10 is withdrawn, the latch button 114 resets and pops up to a re-engage position. FIG. 3B illustrates the securement system 200 and the grab posts 210 in the dis-engage position, thereby allowing the user to withdraw the cell phone or mobile device 10.

After rotating the cell phone or mobile device 10 and moving the grab posts 210A, 210B, the latch mechanism 116 opens, and the user can feel and hear the "un-latch." The audible and tactile "unlatch" when the cell phone or mobile device 10 can be removed from the phone cradle 110 and the latch button 114 can reset. The feeling of the "unlatch" may be important for people with hearing impairment or if hearing the unlatch is difficult because of outside noise. The feel may be created by including a detent which the spring mechanism 202 moves into when the cradle 110 is rotated into the un-latch position. In an example without departing from the invention, the feel could also be created by adjusting how the latching mechanism 116 changes the rotation force when un-latching.

To engage the cell phone or mobile device 10 into the phone holder 100, the user presses the cell phone or mobile device 10 into the cradle 110. The cell phone or mobile device 10 presses against the latch button 114, thereby locking the latch button 114 into the locked position, and thereby triggering the latching mechanism 116 to unlatch the two arms 220A, 220B from the open position to rotate symmetrically with the first grab post 210A and the second grab post 210B to hold the cell phone or mobile device 10 against the third grab post 210C.

Pressing the latch button 114 presses or engages the latch mechanism 116, which releases the arms 220A, 220B from the securement system 200. When the arms 220A, 220B move to engage the cell phone or mobile device 10, the arms 220A, 220B release the latch button 114 from the latch mechanism 116. The latch button 114 may no longer push on the latch mechanism 116. The latch mechanism 116 can re-engage when the user rotates to remove the cell phone or mobile device 10. When the user rotates the cell phone or mobile device 10 from the phone holder 100, the latch button 114 is still pressed down. The latch mechanism 116 does re-engage, but the latch button 114 is still pressed down. The latch button 114 may include an internal spring that resets to be above the surface of the base plate 112 after the user removes the cell phone or mobile device 10.

The triangular hold system may allow the entire phone holder 100 to rotate 360 degrees to allow the user to adjust the picture or screen on the cell phone or mobile device 10. For example, the triangular hold system allows the user the ability to configure landscape or portrait orientation such that the buttons 20 on the cell phone or mobile device 10 are located away from the grab posts 210. The orientation of the phone holder 100 may be moved or changed and rotated while the cell phone or mobile device 10 is not in the phone holder 10 and cradle 100. The present invention provides various methods for allowing the rotation to portrait/landscape position for the cell phone or mobile device 10.

First, a user may adjust the orientation of the phone holder 100 by removing the cell phone or mobile device 10, rotating to the cradle 110 or phone holder 10 to the new position, and then re-engaging the cell phone or mobile device 10. The orientation of the phone holder 10 may be locked while the cell phone or mobile device 10 is in the phone holder 100. The angular force required to rotate the phone holder 100 may be greater than the angular force to release the cell phone or mobile device 10 from the phone holder 100. The phone holder 100 may provide a singled-handed adjustment to the user.

In another embodiment, the user may push the phone holder 100 thereby releasing the brake and unlocking the phone holder 100 to rotate the phone holder 100 with the user's hand on the cell phone or mobile device 10. In another embodiment, the user may pull the phone holder 100 thereby releasing the brake and unlocking the phone holder 100 to rotate the phone holder 100 with the user's hand on the cell phone or mobile device 10. For rotation with the push and pulling of the phone holder 100, the phone holder 100 may include a spring-loaded telescoping connection and brake with teeth that engage at certain angles, or a clutch that disengages when the phone is pushed or pulled.

In another embodiment, the user may unlock a lever on the phone holder 100 to rotate the phone holder 100 thereby unlocking the phone holder 100, which requires the user moving the hand from the cell phone or mobile device 10. For the unlock lever, a lever may engage or disengage a clutch or set of teeth.

Additionally, in another embodiment, the phone holder 100 may include a "brake" which might be a friction brake or a pawl into a notched wheel which prevents rotation. In this embodiment, the friction to rotate may be greater than the torque to release the cell phone or mobile device 10 from the phone holder 100. The notched wheel may determine the number of orientation positions through the use of the notches on the wheel. The number of orientation positions may be adequate enough to satisfy a user.

Figure 4A:
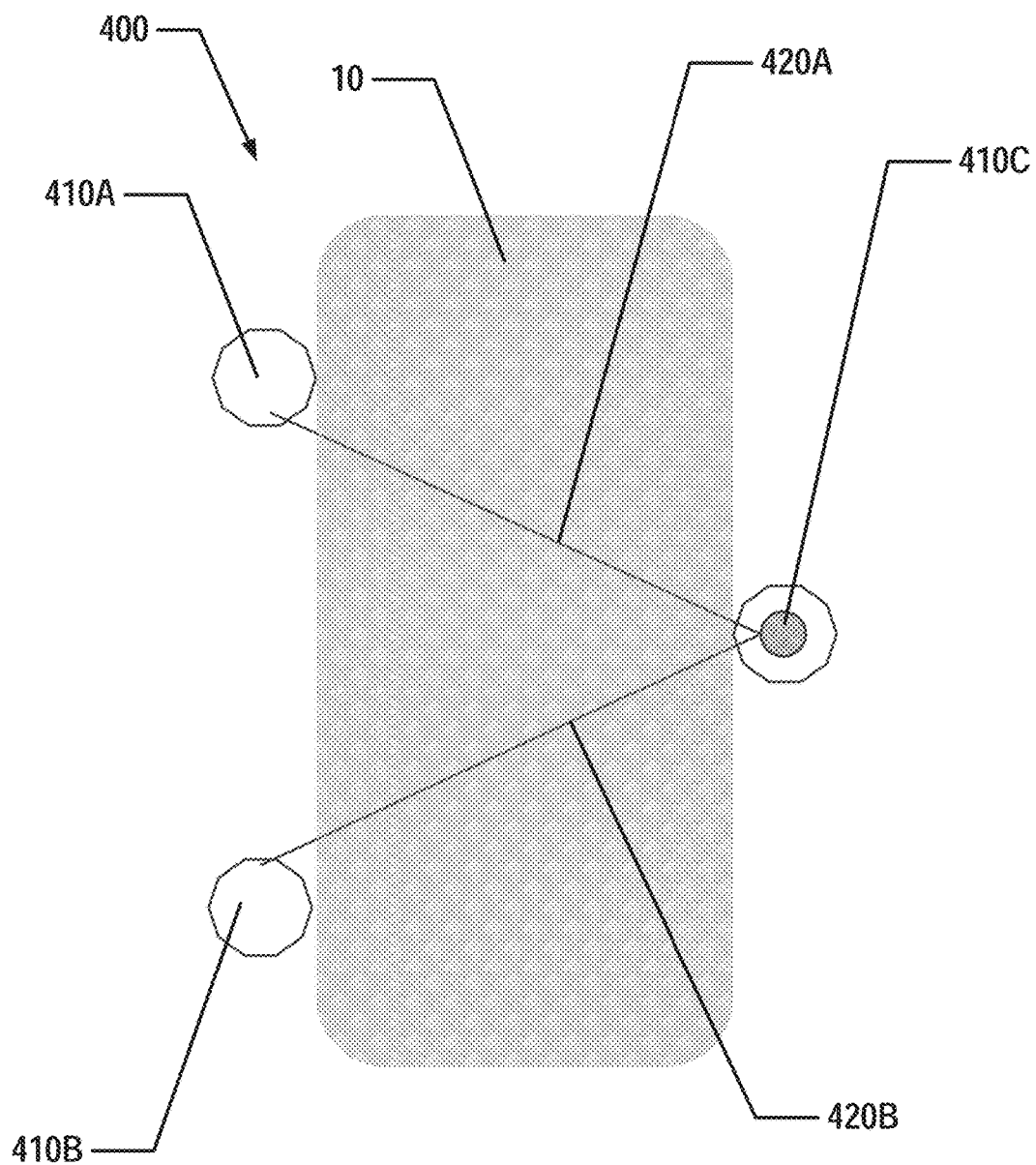
FIG. 4A illustrates a front plan view of an example phone holder showing an axis of rotation in accordance with this invention.
Figure 4B:
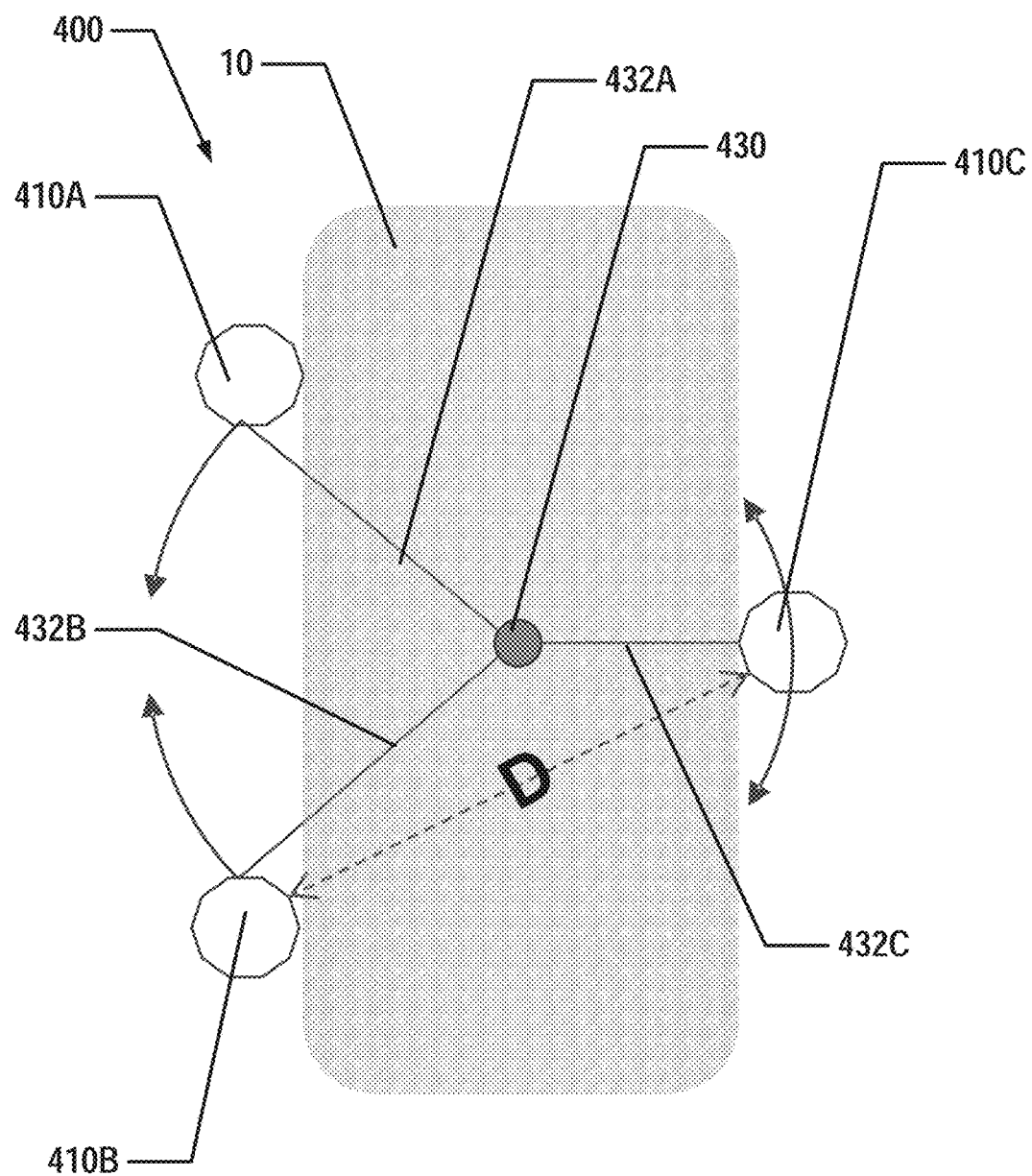
FIG. 4B illustrates a front plan view of an example phone holder showing a second axis of rotation in accordance with this invention.
Figure 4C:
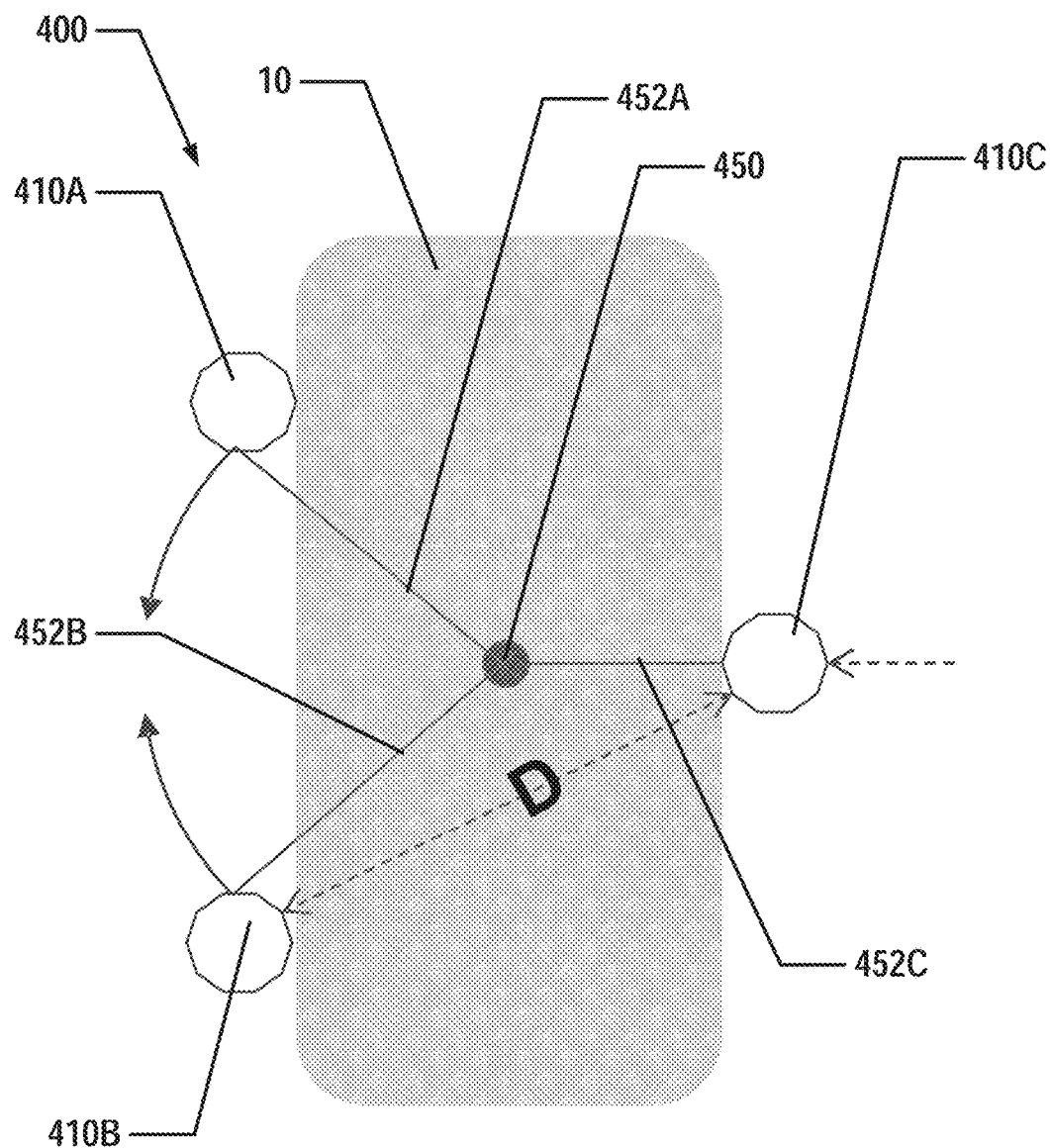
FIG. 4C illustrates a front plan view of an example phone holder showing a third axis of rotation in accordance with this invention.

FIGS. 4A through 4C illustrate various configurations of the geometric orientation of the grab posts as part of the securement system on a phone holder 400. The phone holder 400 is described according to this invention similar to that described above in conjunction with FIGS. 1 through 3C (the same or similar reference numbers are used in FIGS. 4A through 4C as those used in FIGS. 1 through 3C to denote the same or similar parts).

In one alternative configuration, as illustrated in FIG. 4A, a phone holder 400 may include a first grab post 410A, a second grab post 410B, and a third grab post 410C. The third grab post 410C may be connected to an arm 420A with the first grab post 410A and connected to a second arm 420B with the second grab post 410B. When removing the cell phone or mobile device 10 with clockwise rotation, the distance from the first grab post 410A to the third grab post 410C must remain constant, thereby rotating around the third grab post 410C. Additionally, when removing the cell phone or mobile device 10 with counter-clockwise rotation, the distance from the second grab post 410B to the third grab post 410C must remain constant. The axis of rotation may be around the third grab post 410C.

Table 1 below illustrates exemplary geometry and distances between the three grab posts 410A, 410B, 410C for the phone holder illustrated in FIGS. 4A and 6A. These dimensions are based on various example phone width distances and dimensions. The example phone dimensions are those of example cell phones or mobile devices as known and used in the art. Other phone dimensions with width and length may be utilized with this invention without departing from this invention. Generally, the distance from the first grab post 410A to the third grab post 410C is equal to the distance from the second grab post 410B to the third grab post 410C, with the cell phone or mobile device 10 rotating about the third grab post 410C. Additionally, utilizing Pythagoras, the distance between the first grab post 410A and the second grab post 410B can be represented below:

$$d(A,B)=2*\mathrm{sqrt}[d(A,C)^2-w^2]$$

wherein: d(A,B)—distance between grab post 410A and grab post 410B d(A,C)—distance between grab post 410A and grab post 410C w—width of the cell phone or mobile device 10

TABLE 1

Figure 6A:
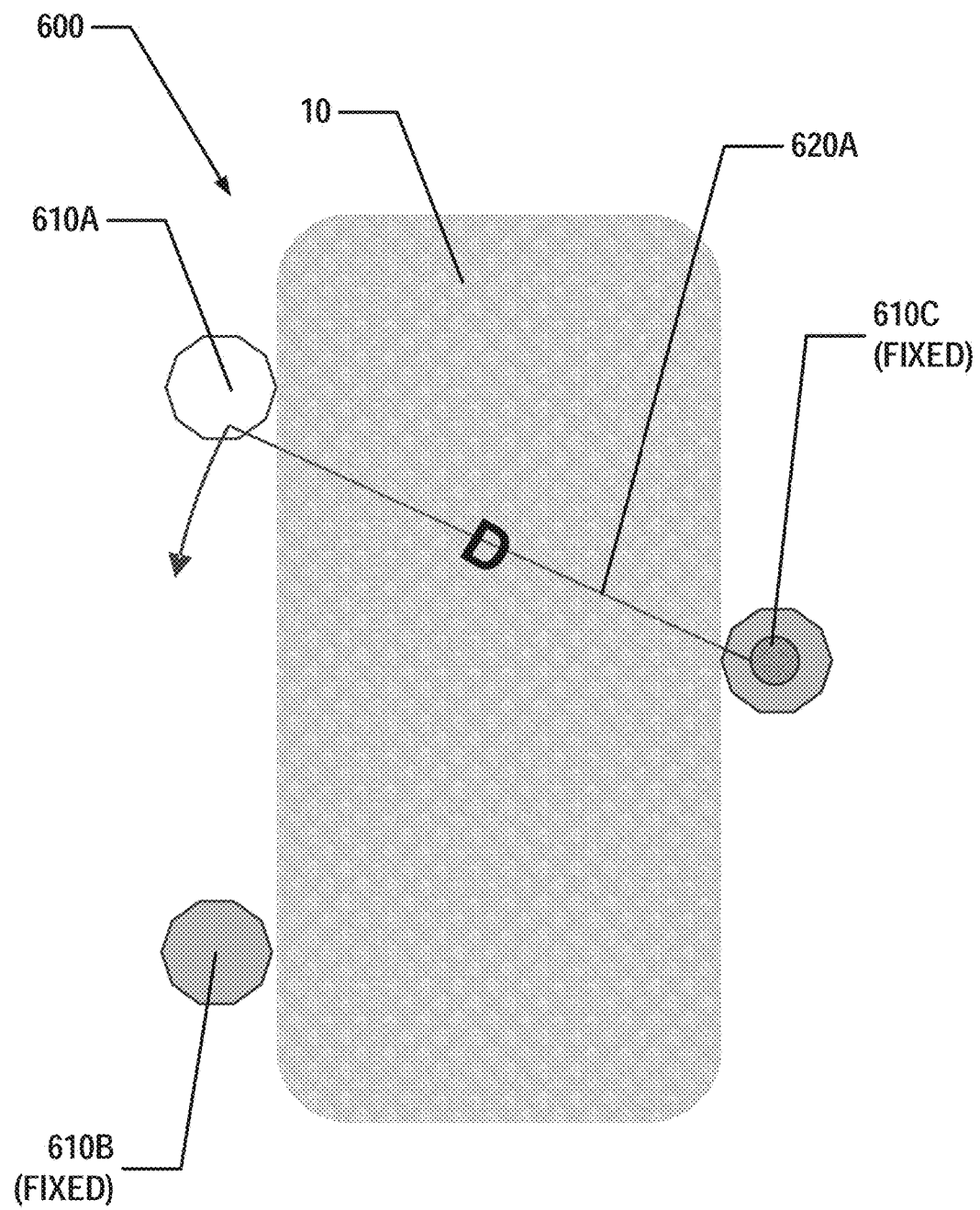
FIG. 6A illustrates a front plan view of another phone holder with a cell phone or mobile device in accordance with this invention.

(corresponding to FIGS. 4A and 6A)

| Cell phone width (w) [inches] | Cell phone height [inches] | d(A,C) [inches] | d(A,B) [inches] |
| --- | --- | --- | --- |
| 2.78 | 5.38 | 3 | 2.26 |
| 2.75 | 5.38 | 3 | 2.40 |
| 3.12 | 5.95 | 3.5 | 3.17 |
| 2.57 | 4.96 | 3 | 3.10 |
| 3.17 | 5.95 | 3.5 | 2.97 |
| 2.85 | 5.59 | 3 | 1.87 |
| 2.32 | 4.49 | 2.5 | 1.86 |
| 2.22 | 4.4 | 2.5 | 2.30 |
| 2.69 | 5.41 | 3 | 2.66 |
| 2.5 | 4.7 | 3 | 3.32 |
| 2.31 | 4.54 | 3 | 3.82 |
| 2.64 | 5.44 | 3 | 2.85 |
| 3.06 | 6.22 | 3.5 | 3.40 |

FIG. 4B illustrates another embodiment or alternative geometric orientation of the phone holder 400 and the grab posts 210. As illustrated in FIG. 4B, the cell phone or mobile device 10 rotates around a center pivot point 430. The third grab post 410C may be connected to an arm 432C sharing the axis with a first arm 432A to the first grab post 410A and a second arm 432B to the second grab post 410B. In this embodiment, the rotation of the cell phone or mobile device 10 may be around an axis or center pivot point 430 in the center of the phone holder 400 or mount. In this embodiment, as illustrated in FIG. 4B, as the first grab post 410A or the second grab post 410B rotate inward (depending on the rotation direction—clockwise or counter-clockwise), the third grab post 410C also rotates, thereby maintaining a constant distance D between the third grab post 410C and the rotating grab post. As described above, when removing the cell phone or mobile device 10 with clockwise rotation, the second grab post 410B rotates and the distance from the second grab post 410B to the third grab post 410C remains constant. Additionally, when removing the cell phone or mobile device 10 with counter-clockwise rotation, the first grab post 410A rotates and the distance from the first grab post 410A to the third grab post 410C remains constant. With this configuration, when the cell phone or mobile device 10 is not in the phone holder 400, the grab post that freely rotates for removal could be locked while the cell phone or mobile device 10 is not in the phone holder 400. This locking may be because when the cell phone or mobile device 10 is inserted, the grab post that freely rotates is most nearly at the point where the other two grab posts grab with the greatest distance between them.

FIG. 4C illustrates another embodiment or alternative geometric orientation of the phone holder 400 and the grab posts 410. As illustrated in FIG. 4C, the phone holder 400 includes a pivot point 450 that the cell phone or mobile device 10 rotates about. The third grab post 410C may be connected to an arm 452C sharing the axis with a first arm 452A to the first grab post 410A and with a second arm 452B to the second grab post 410B at a grab point 450 in the center of the base plate 112. A spring mechanism may provide a linkage telescope between the third grab post 410C and the center pivot point 450. The third grab post 410C may telescope to assist with the tension of the grab posts 410A, 410B and the cell phone or mobile device 10. The first grab post 410A and the second grab post 410B may rotate about the pivot point 450 in the center of the base plate 112 (depending on the rotation of the cell phone or mobile device 10). The spring mechanism may pull the third grab post 410C to the center pivot point 450 upon the engage and pushing down of the latch button 114 during the engagement of the cell phone or mobile device 10 in the cradle 110 and engaging the latch mechanism 116. In this embodiment, as illustrated in FIG. 4C, as the first grab post 410A or the second grab post 410B rotate inward (depending on the rotation direction—clockwise or counter-clockwise), the third grab post 410C telescopes outward, thereby maintaining a constant distance D between the third grab post 410C and the rotating grab post. When removing the cell phone or mobile device 10 with clockwise rotation, the second grab post 410B rotates and the distance from the second grab post 410B to the third grab post 410C must remain constant. Additionally, when removing the cell phone or mobile device 10 with counter-clockwise rotation, the first grab post 410A rotates and the distance from the first grab post 410A to the third grab post 410C must remain constant.

Table 2 below illustrates exemplary geometry and distances between the three grab posts 410A, 410B, 410C for the phone holder illustrated in FIGS. 4B, 4C, and 6B. These dimensions are based on various example phone width distances and dimensions. The example phone dimensions are those of example cell phones or mobile devices as known and used in the art. Other phone dimensions with width and length may be utilized with this invention without departing from this invention. Generally, the distance from the first grab post 410A to the center pivot point 430 is equal to the distance from the second grab post 410B to the center pivot point 430. The distance from the center pivot point 430 to the third grab post 410C is fixed with grab post 410A, grab post 410B, and grab post 410C rotating about the center pivot point 430. Additionally, utilizing Pythagoras, the distance between the first grab post 410A and the second grab post 410B can be represented below:

$$d(A,B) = 2 * \text{sqrt}[d(A,D)^2 - (w - d(C,D))^2]$$

wherein: d(A,B)—distance between grab post 410A and grab post 410B
- d(A,D)—distance between grab post 410A and pivot point 430
- d(C,D)—distance between grab post 410C and pivot point 430
- w—width of the cell phone or mobile device 10

TABLE 2

Figure 6B:
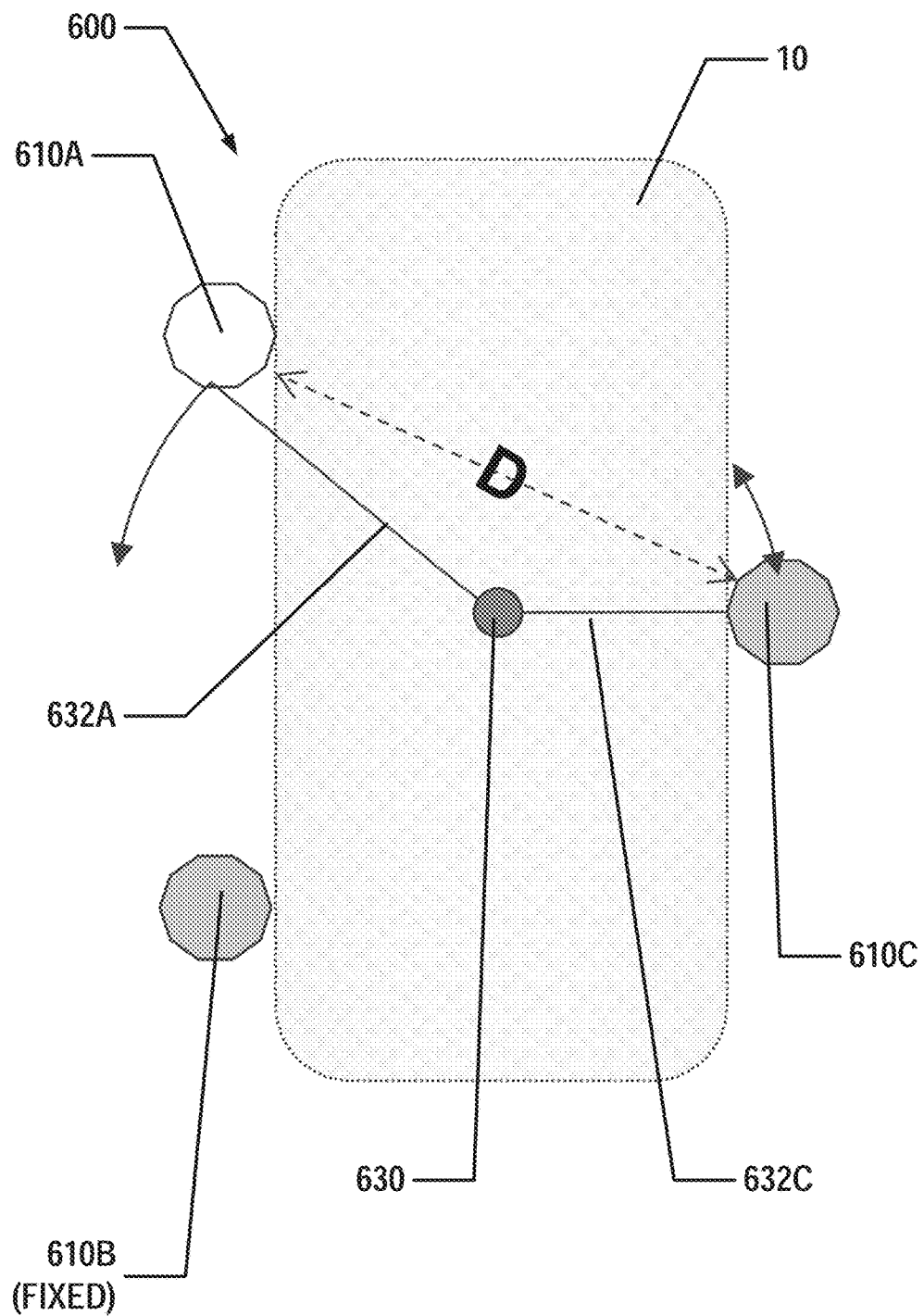
FIG. 6B illustrates a front plan view of another phone holder with a cell phone or mobile device in accordance with this invention.

(corresponding to FIGS. 4B, 4C and 6B)

| Cell phone width (w) [inches] | Cell phone height [inches] | d(A,D) [inches] | d(C,D) [inches] | d(A,B) [inches] |
|---|---|---|---|---|
| 2.78 | 5.38 | 2 | 1 | 1.82 |
| 2.75 | 5.38 | 2 | 1 | 1.94 |
| 3.12 | 5.95 | 2 | 2 | 3.31 |
| 2.57 | 4.96 | 2 | 1 | 2.48 |
| 3.17 | 5.95 | 2 | 2 | 3.24 |
| 2.85 | 5.59 | 2 | 1 | 1.52 |
| 2.32 | 4.49 | 2 | 1 | 3.01 |
| 2.22 | 4.4 | 3 | 2 | 5.98 |
| 2.69 | 5.41 | 2 | 1 | 2.14 |
| 2.5 | 4.7 | 2 | 1 | 2.65 |
| 2.31 | 4.54 | 2 | 1 | 3.02 |
| 2.64 | 5.44 | 2 | 1 | 2.29 |
| 3.06 | 6.22 | 2 | 2 | 3.39 |

As described above for the arm rotation symmetry, the arms holding the first grab post 410A and the second grab post 410B should rotate symmetrically about their common axis with a linkage. Without departing from this invention, the linkage may be various mechanical linkages as illustrated in FIGS. 5A and 5B.

Figure 5A:
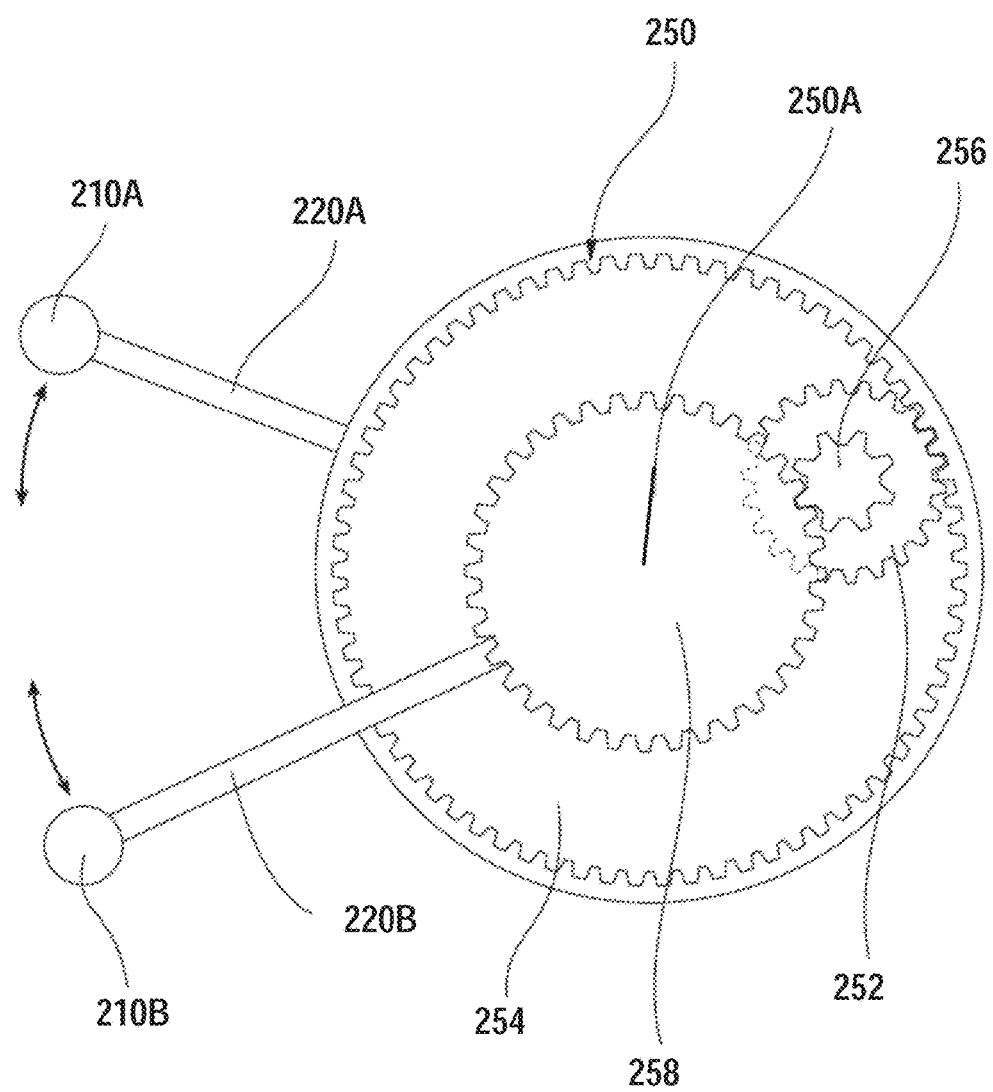
FIG. 5A illustrates a front plan view of an example phone holder showing an exemplary linkage system in accordance with this invention.

FIG. 5A illustrates a pinion gear linkage 250 between first grab post 210A and the second grab post 210B. As specifically illustrated in FIG. 5A, the arms 220A, 220B holding the first grab post 210A and the second grab post 210B are rotated symmetrically about their common axis 250A with a pinion gear linkage 250. With the pinion gear linkage 250, all gear teeth should have the same spacing. As illustrated in FIG. 5A, an outer pinion gear 252 is connected to an outer gear 254 for a first arm 220A to the first grab post 210A. An inner pinion gear 256 is connected to an inner gear 258 for a second arm 220B to the second grab post 210B. The outer pinion gear 252 and inner pinion gear 256 are connected on a fixed axis. The ratio of the outer pinion gear 252 and the inner pinion gear 256 is related to the radii of the inner gear 258 and outer gear 254:

$$R_{OUTER\ 252}/R_{INNER\ 256} = G_{INNER\ 258}/G_{OUTER\ 254}$$

Figure 5B:
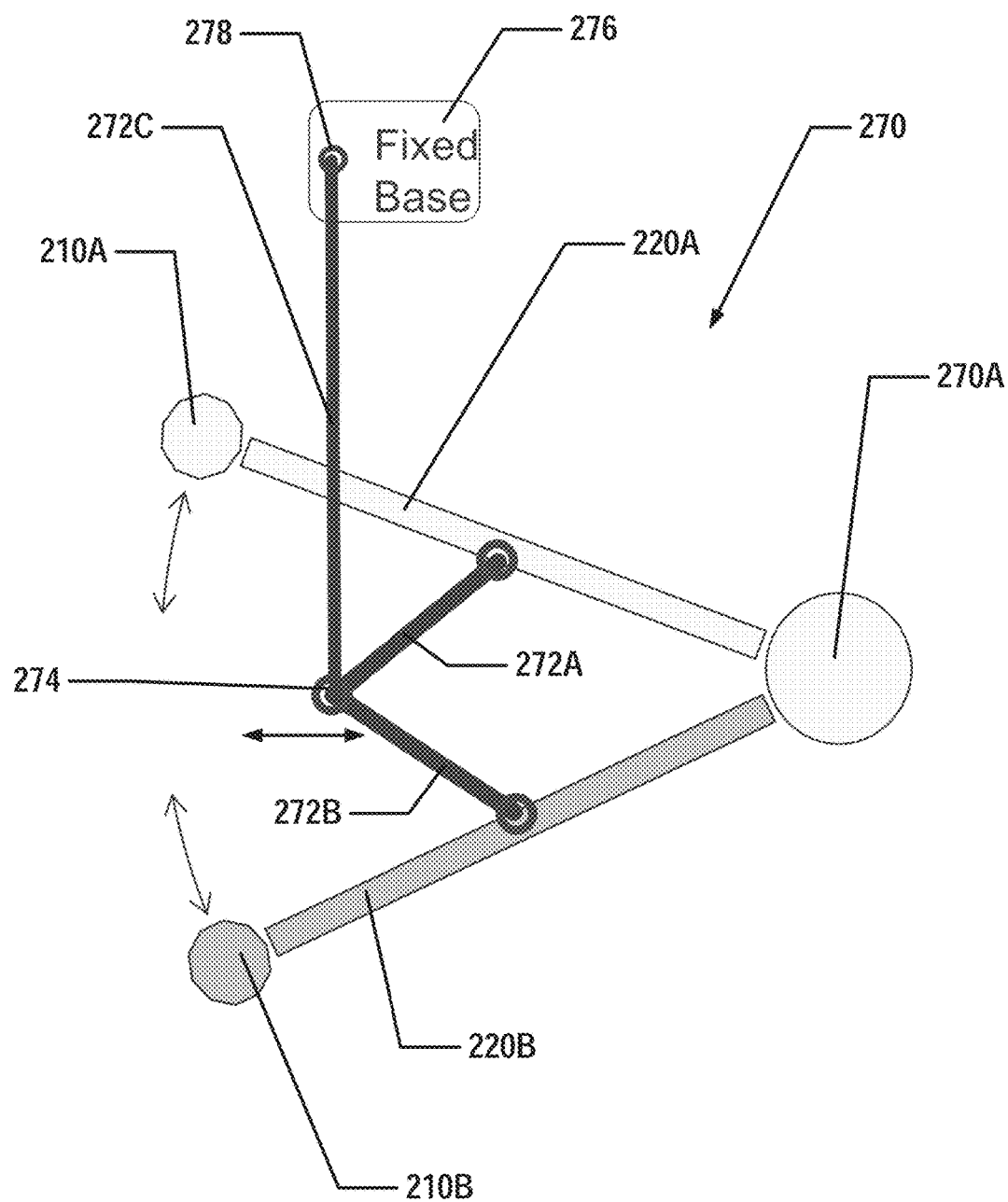
FIG. 5B illustrates a front plan view of an example phone holder showing another exemplary linkage system in accordance with this invention.

FIG. 5B illustrates a link arm linkage 270 between first grab post 210A and the second grab post 210B. As specifically illustrated in FIG. 5B, the arms 220A, 220B holding the first grab post 210A and the second grab post 210B are rotated symmetrically about their common axis 270A with a link arm linkage 270. For example, the link arm linkage 270 may include three link arms, 272A, 272B, 272C, a connecting point 274 and a fixed point 278 located on a fixed base 276. Link arm 272A may have endpoints on the first arm 220A and the connecting point 274. Link arm 272B may have endpoints on the second arm 220B and the connecting point 274. Link arm 272C may have endpoints on the fixed point 278 and the connecting point 274 and may define the left and right movement of the connecting point 274, which allows the arms 220A and 220B to move symmetrically. Generally, the fixed point 278 may be located centered above the connecting point 274. The first arm 220A and the second arm 220B may be connected with the secondary link arms 272A, 272B to the link point 274 and able to move laterally between the first arm 220A and the second arm 220B. The link point 274 must be located between the first arm 220A and the second arm 220B at a location equidistant from the first arm 220A and the second arm 220B.

As described above for both FIGS. 5A and 5B, the latch mechanism 116 may only need to latch one part of the gear linkage 250 or the arm linkage 270. The latch mechanism 116 may be ideally located near the spring mechanism that pushes the grab posts 210 towards the cell phone or mobile device 10. The latch mechanism 116 may have its own spring that resets when the user removes the cell phone or mobile device 10. The latch button 114 may depress a latch spring and the latch mechanism 116, which releases the arms 220A, 220B with the grab posts 210.

FIGS. 6A through 6D illustrate an example according to this invention similar to that described above in conjunction with FIGS. 1 through 5B (the same or similar reference numbers are used in FIGS. 6A thought 6C as those used in FIGS. 1 through 5B to denote the same or similar parts). As illustrated in FIGS. 6A through 6D, a phone holder 600 may include many of the same or similar features and components of the phone holder 100 as described above. The phone holder 600 may include only one arm moving as compared to the two moving arms of the phone holder 100 as described above. As illustrated in FIGS. 6A and 6B, the first grab post 610A rotates, while the second grab post 610B and the third grab post 610C are fixed. The phone holder 600 may require either counter-clockwise or clockwise direction of rotation to remove the cell phone or mobile device 10 from the phone holder 600. The counter-clockwise direction of rotation release would most like be chosen to utilize as opposed to clockwise rotation because of counter-clockwise rotation is utilized for unscrewing lids, bolts, screws, etc.

As illustrated in FIG. 6A, the third grab post 610C may be connected to an arm 620A with the first grab post 610A. For example, when removing the cell phone or mobile device 10 with clockwise rotation, the distance D from the first grab post 610A to the third grab 610C post must remain constant. The axis of rotation will be around the third grab post 610C.

As illustrated in FIG. 6B, in another embodiment or alternative geometric orientation of the grab posts 610, the third grab post 610C may be connected to an arm 632C sharing an axis 630 with an arm 632A to the first grab post 610A. In this embodiment, the rotation of the cell phone or mobile device 10 may be around the axis 630 in the center of the mount. In this embodiment, as illustrated in FIG. 6B, as the first grab post 610A rotates inwards, the third grab post 610C also rotates, thereby maintaining a constant distance D between the first grab post 610A and the third grab post 610C. As described above, when removing the cell phone or mobile device 10 with clockwise rotation, the distance D from the first grab post 610A to the third grab post 610C remains constant.

Figure 6C:
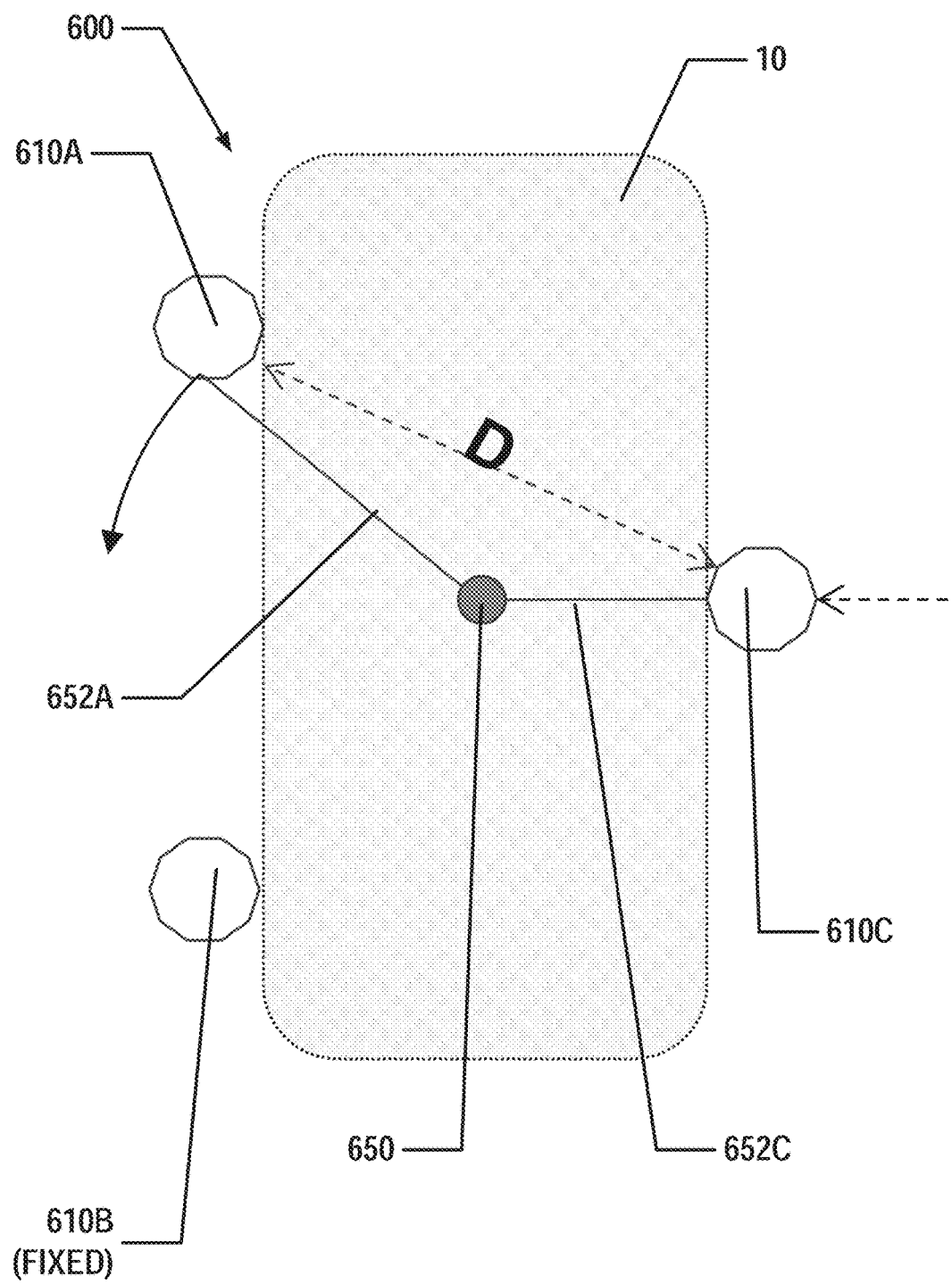
FIG. 6C illustrates a front plan view of another phone holder with a cell phone or mobile device in accordance with this invention.

As illustrated in FIG. 6C, in another embodiment or alternative geometric orientation of the grab posts 610, the phone holder 600 may rotate about a center pivot point 650. The phone holder 600 may include a third grab post 610C that may be connected to an arm 652C sharing the axis with a first arm 652A to the first grab post 610A at the pivot point 650 in the center of the base plate 112. A spring mechanism may provide a linkage telescope between the third grab post 610C and the grab point 650. The third grab post 610C may telescope to assist with the tension of the first grab post 610A and the cell phone or mobile device 10. The first grab post 610A may rotate about the pivot point 650 in the center of the base plate 112 (depending on the rotation of the cell phone or mobile device 10). The spring mechanism may pull the third grab post 610C to the center pivot point 650 upon the engagement and/or pushing down of the latch button 114 during the engagement of the cell phone or mobile device 10 in the cradle 110 and engaging the latch mechanism 116. In this embodiment, as illustrated in FIG. 6C, as the first grab post 610A rotates inward, the third grab post 610C telescopes outward, thereby maintaining a constant distance D between the third grab post 610C and the rotating grab post 610A. When removing the cell phone or mobile device 10, the first grab post 610A rotates and the distance from the first grab post 610A to the third grab post 610C must remain constant.

Figure 6D:
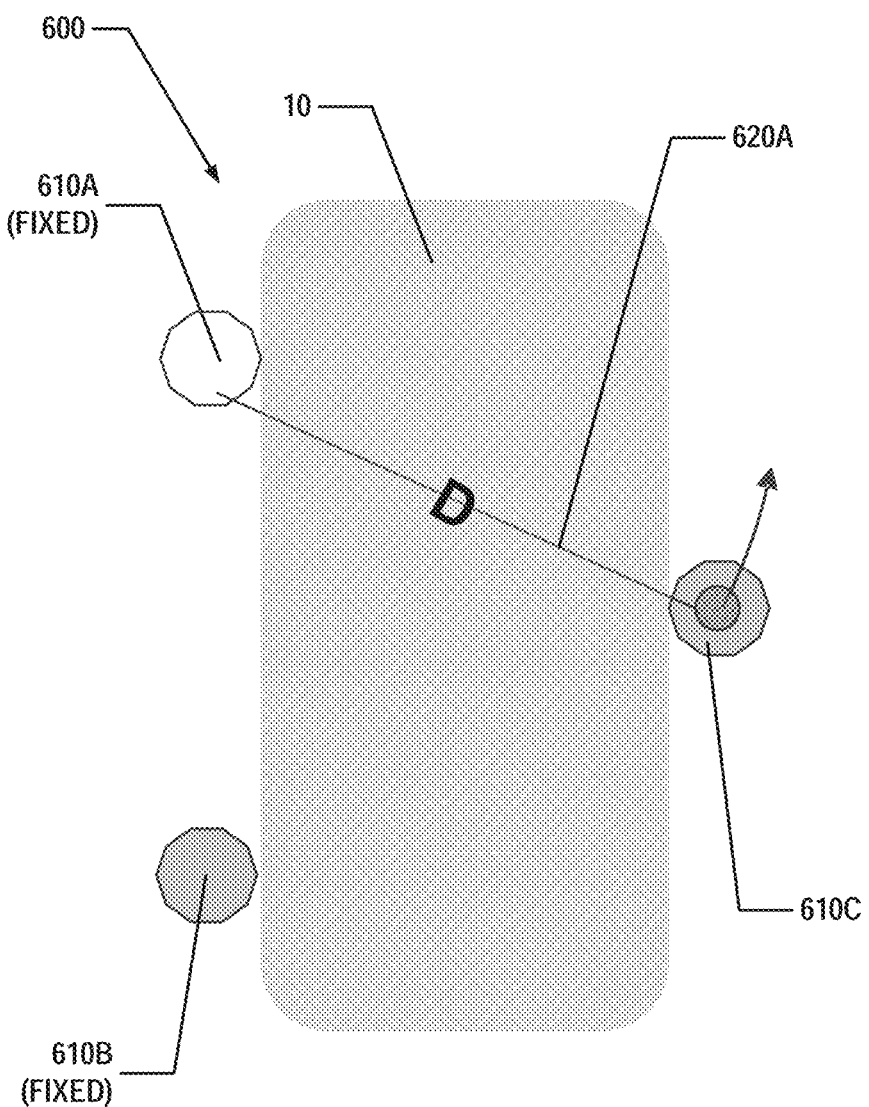
FIG. 6D illustrates a front plan view of another phone holder with a cell phone or mobile device in accordance with this invention.

As illustrated in FIG. 6D, in another embodiment or alternative geometric orientation of the grab posts 610, the third grab post 610C rotates, while the first grab post 610A and the second grab post 610B are fixed. The phone holder 600 may require either counter-clockwise or clockwise direction of rotation to remove the cell phone or mobile device 10 from the phone holder 600. The counter-clockwise direction of rotation release would most like be chosen to utilize as opposed to clockwise rotation because of counter-clockwise rotation is utilized for unscrewing lids, bolts, screws, etc. As illustrated in FIG. 6D, the third grab post 610C may be connected to an arm 620A with the first grab post 610A. For example, when removing the cell phone or mobile device 10 with clockwise rotation, the distance D from the first grab post 610A to the third grab 610C post must remain constant. The axis of rotation will be around the first grab post 610A.

Figure 7A:
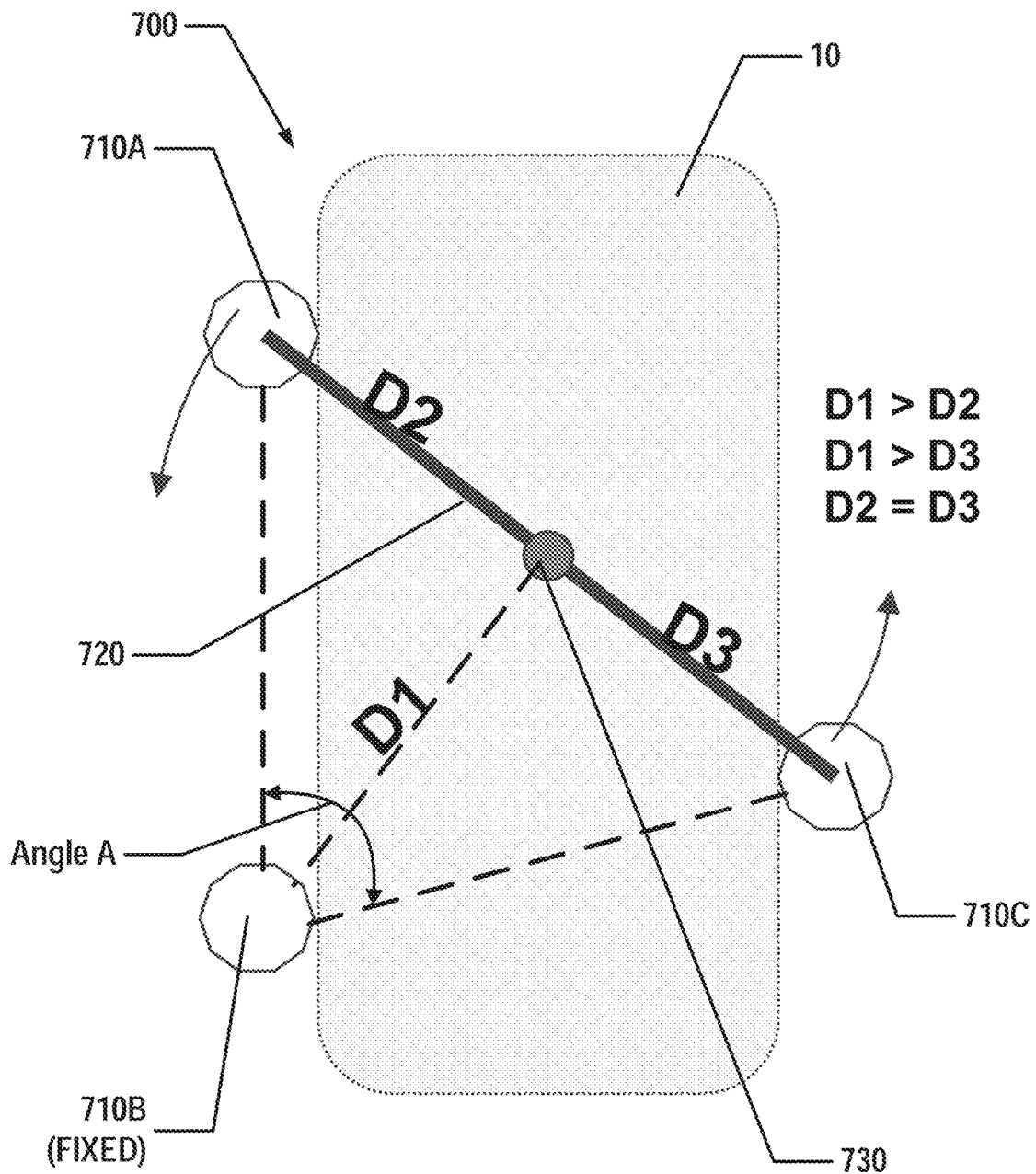
FIG. 7A illustrates a front plan view of another phone holder with a cell phone or mobile device in accordance with this invention.
Figure 7B:
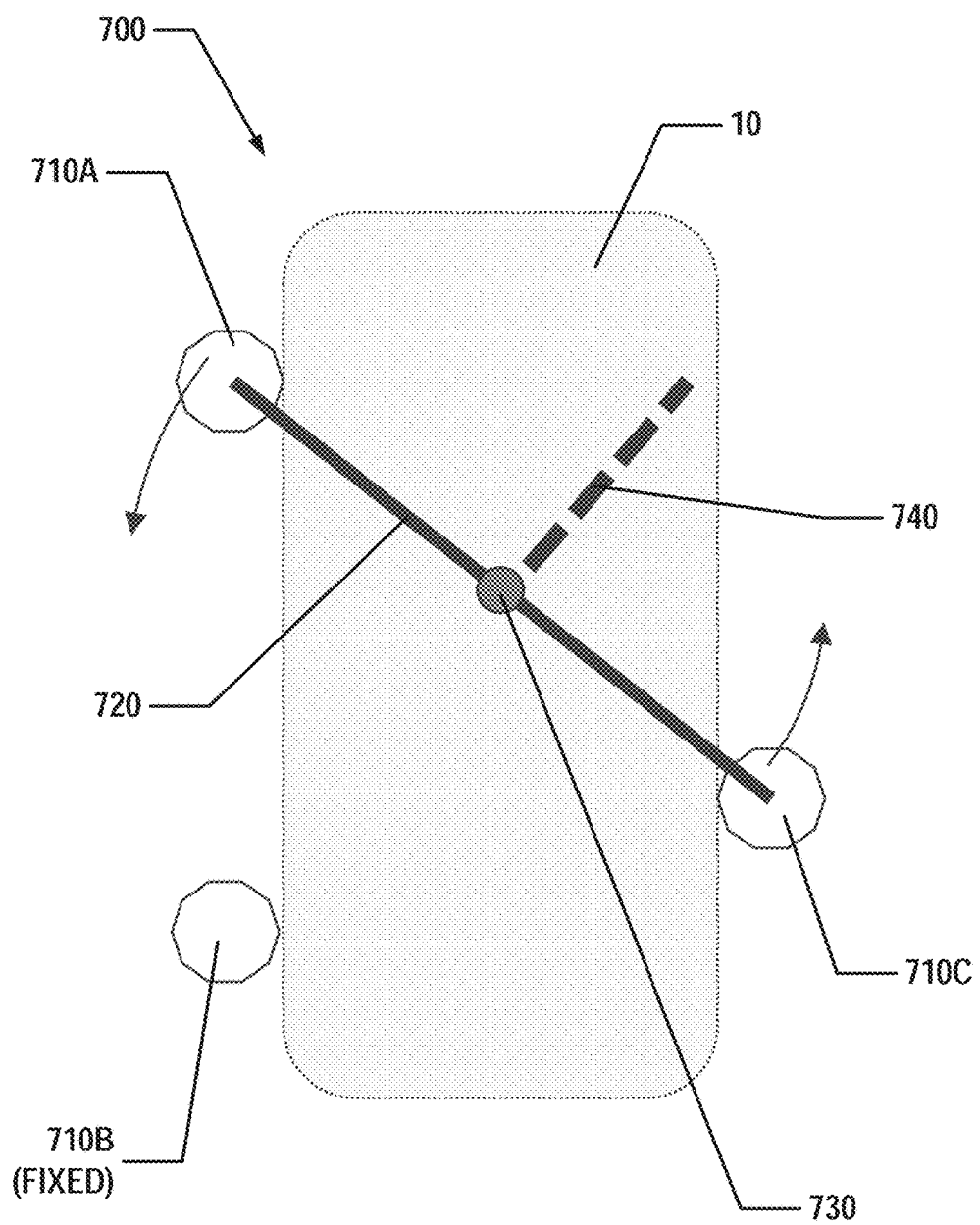
FIG. 7B illustrates a front plan view of another phone holder with a cell phone or mobile device in accordance with this invention.
Figure 7C:
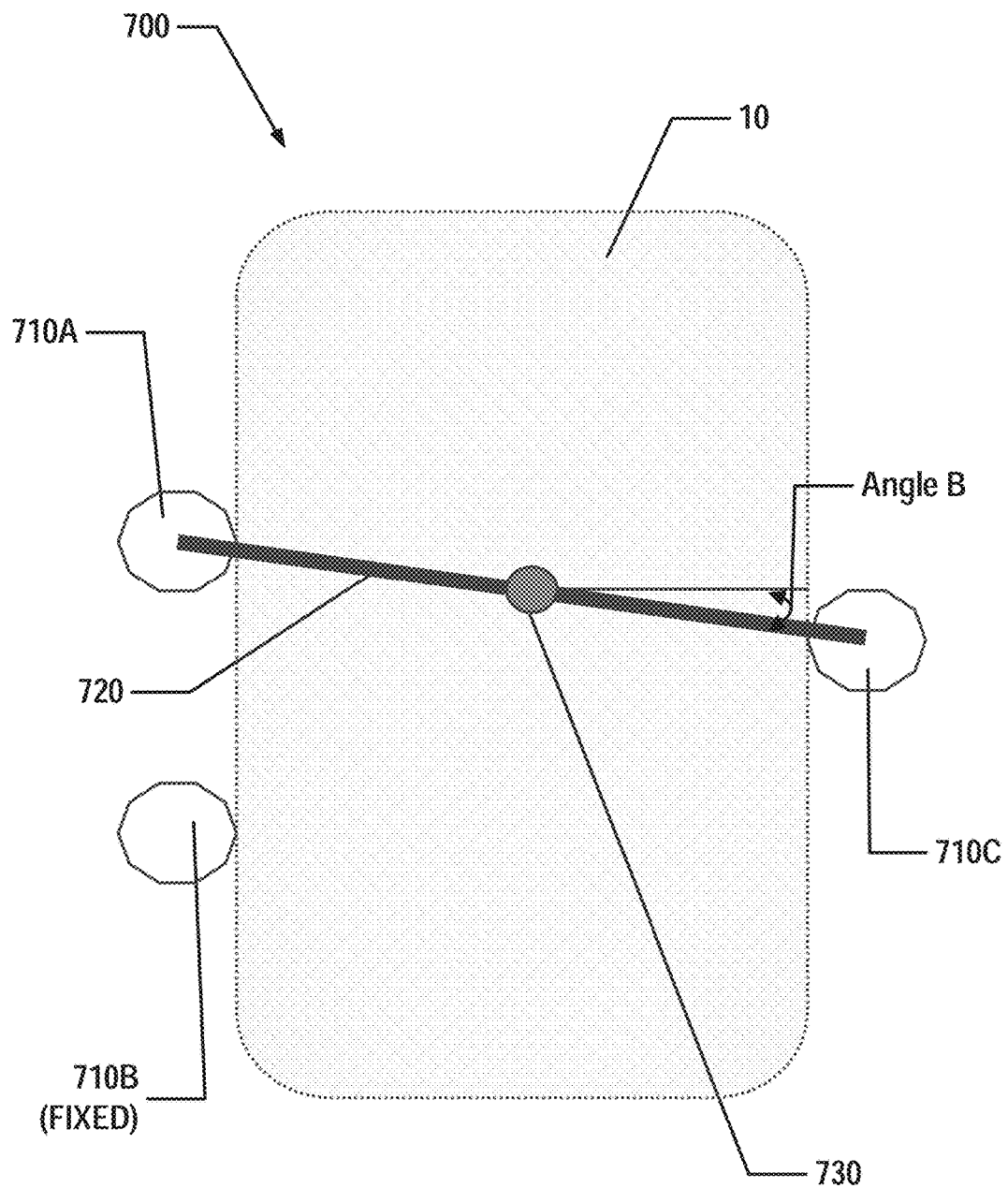
FIG. 7C illustrates a front plan view of another phone holder with a cell phone or mobile device in accordance with this invention.

FIGS. 7A through 7C illustrate another example according to this invention similar to that described above in conjunction with FIGS. 1 through 6C (the same or similar reference numbers are used in FIGS. 7A through 7C as those used in FIGS. 1 through 6C to denote the same or similar parts). As illustrated in FIGS. 7A through 7C, a phone holder 700 may include many of the same or similar features and components of the phone holder 100 as described above. As illustrated in FIGS. 7A through 7C, the phone holder 700 includes a midline center of rotation about an axis or pivot point 730 in the center of the phone holder 700, which grabs or holds the phone with the triangular securement system. The phone holder includes a solid bar 720 with two grab points, a first grab post 710A and a third grab post 710C grabbing both sides of the cell phone or mobile device 10. A second grab post 710B may remain fixed on the phone holder 700. As illustrated, the geometry of this phone holder 700 is such that a distance D1 from the center pivot point 730 to the fixed second grab post 710B is greater than the distance D2 from the center pivot point 730 to the first grab post 710A or the distance D3 from the center pivot point 730 to the third grab post 710C. Additionally, the distance D2 from the center pivot point 730 to the first grab post 710A is equal to the distance D3 from the center pivot point 730 to the third grab post 710C.

The first grab post 710A and third grab post 710C create an angle A at the second grab post 710B. Since the pivot point 730 is located in the midline of the cell phone or mobile device 10, the angle A is always acute. If angle A were to be obtuse, then the second grab post 710B would tend to push the cell phone or mobile phone 10 away from the first grab post 710A. Additionally, the second grab post 710B would get closer to the second grab post 710B, which would then turn into a two-point grab or hold of the cell phone or mobile device 10.

Table 3 below illustrates exemplary geometry and distances between the three grab posts 710A, 710B, 710C for the phone holder 700 illustrated in FIG. 7A. These dimensions are based on various example phone width distances and dimensions. The example phone dimensions are those of example cell phones or mobile devices as known and used in the art. Other phone dimensions with width and length may be utilized with this invention without departing from this invention. Generally, the distance from the first grab post 710A to the pivot point 730 is equal to the distance from the third grab post 710C to the pivot point 430. The distance from the pivot point 730 to the second grab post 710B is greater than the distance from the first grab post 710A to the pivot point 730. The distance from the pivot point 730 to the second grab post 710B is greater than the distance from the third grab post 710C to the pivot point 730. The bar 720, from grab post 710A to pivot point 730 to grab post 710C rotates about the pivot point 730. Additionally, utilizing Pythagoras, the distance between the first grab post 410A and the second grab post 410B can be represented below:

$$d(A,B) = \text{sqrt}[d(A,D)^2 - (w/2)^2] + \text{sqrt}[d(B,D)^2 - (w/2)^2]$$

wherein: d(A,B)—distance between grab post 710A and grab post 710B
  d(A,D)—distance between grab post 710A and pivot point 730
  d(B,D)—distance between grab post 710B and pivot point 730
  w—width of the cell phone or mobile device 10

TABLE 3

(corresponding to FIG. 7A)

| Cell phone width (w) [inches] | Cell phone height [inches] | d(A,D) [inches] | d(B,D) [inches] | d(A,B) [inches] |
|---|---|---|---|---|
| 2.78 | 5.38 | 1.5 | 3 | 3.22 |
| 2.75 | 5.38 | 1.5 | 3 | 3.27 |
| 3.12 | 5.95 | 1.6 | 3 | 2.92 |
| 2.57 | 4.96 | 1.5 | 3 | 3.48 |
| 3.17 | 5.95 | 1.6 | 3 | 2.77 |
| 2.85 | 5.59 | 1.5 | 3 | 3.11 |
| 2.32 | 4.49 | 1.5 | 3 | 3.72 |
| 2.22 | 4.4 | 1.5 | 3 | 3.80 |
| 2.69 | 5.41 | 1.5 | 3 | 3.35 |
| 2.5 | 4.7 | 1.5 | 3 | 3.56 |
| 2.31 | 4.54 | 1.5 | 3 | 3.73 |
| 2.64 | 5.44 | 1.5 | 3 | 3.41 |
| 3.06 | 6.22 | 1.6 | 3 | 3.05 |

FIG. 7B illustrates another embodiment of the current invention shown in FIG. 7A which illustrates a backing for larger cell phones or mobile devices 10 (such as a tablet or similar electronic device). For larger cell phones or mobiles devices 10, if a user is touching the tablet on the upper right corner (as illustrated in FIGS. 7A through 7C), this may cause some flexing of the larger cell phone or mobile device 10. In this embodiment, the phone holder may include some added support 740 along a line from the pivot point 730 in a direction away from the second grab post 710B. This added support 740 may be similar in length to the length of D3 or the distance from the third grab post 710C to the pivot point 730. With this geometry, the support 740 may not extend past the back of the larger cell phone or mobile device 10 and will improve the user's sense of stability of support for the larger cell phone or mobile device 10.

Additionally, the phone holder 700 may provide advantages for holding a wider phone. FIG. 7C illustrates the phone holder 700 holding a wider phone. Wider phones tend to be heavier because of their larger screen size. The phone holder 700 as described and detailed in FIGS. 7A and 7B, may enjoy additional holding power for two reasons. First, the extension of the spring between the grab posts 710. Angle B represents an angle between the horizontal across the cell phone and an arm 720 between the first grab post 710A and the third grab post 710C on the opposite side of the cell phone or mobile device 10. Generally, the spring force equal K*s (F=K*s), wherein K is the spring constant and s is the extension of the spring. Second, the holding force or grabbing force (W=Force*Distance) may be amplified by 1/sin (A). As illustrated in FIG. 7C, when using a wider phone, the angle A is small, so the tan (A) is also small, and thus 1/sin (A) is large.

FIGS. 8A through 18 illustrate another exemplary phone holder 800 for use with a cell phone or mobile device 10 in a vehicle. The phone holder 800 may be used with a cell phone or other mobile device 10 utilized in a vehicle. Generally, the phone holder 800 may provide a twist-to-release securement system to release the cell phone or mobile device 10 from the phone holder 800. The mobile device 10 may be any mobile device that may be utilized for display in a vehicle, for example, such as a GPS device, a tablet, a computer, or other mobile device.

Figure 9A:
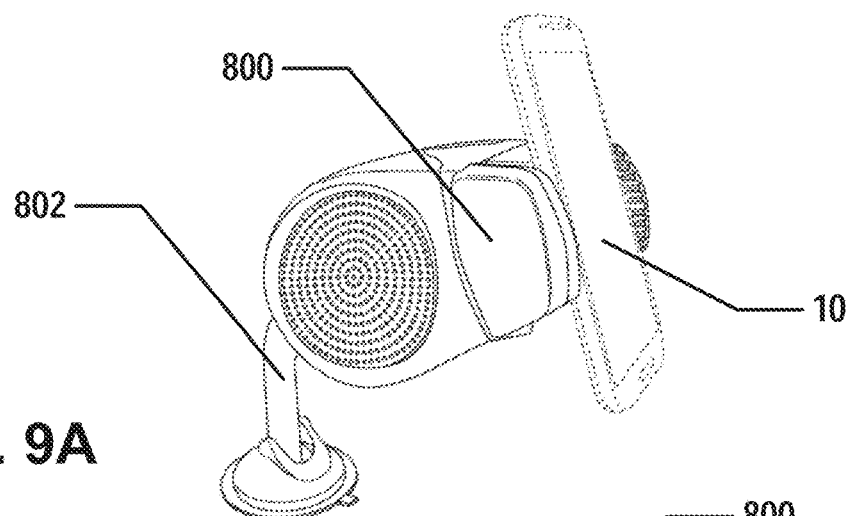
FIGS. 9A-9C illustrate various views of the phone holder from FIGS. 8A and 8B with a cell phone or mobile device in accordance with aspects of this invention.
Figure 9B:
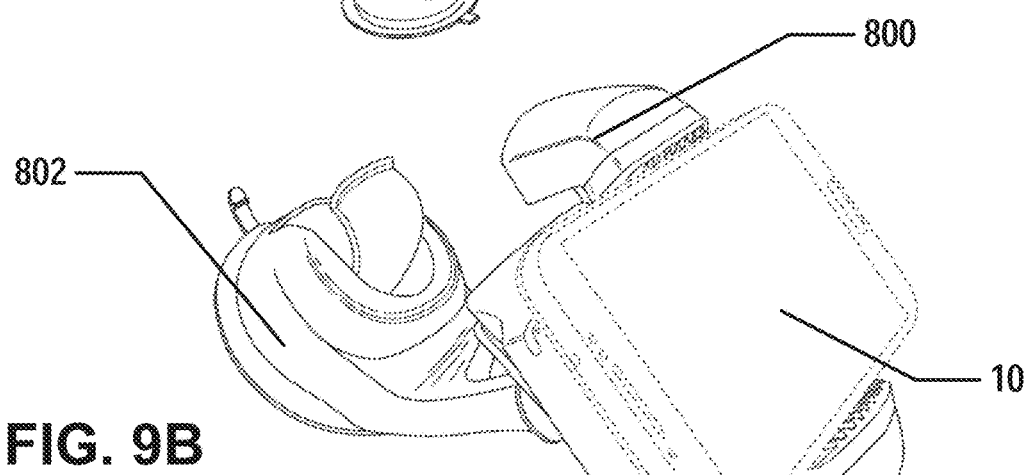
Figure 9C:
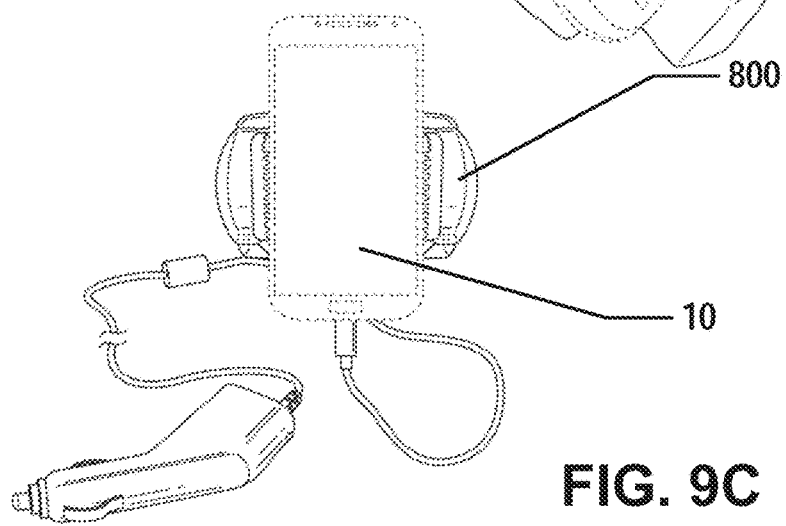

FIGS. 9A-9C illustrate various views of the phone holder 800 and a vehicle mount with a cell phone or mobile device 10. FIGS. 9A through 9C illustrate the phone holder 800 with a vehicle mount 802. The phone holder 800 may be secured to the inside of a vehicle such that the driver and/or passenger can see the screen of the cell phone or mobile device 10 more safely without diverting their attention/looks/gaze from the road ahead of them. The phone holder 800 may include a vehicle mount 802 such that the phone holder may be secured in a variety of different ways to the inside of the vehicle. For example, the phone holder 800 and vehicle mount 802 may include a suction mechanism attached to the windshield. In another example, the phone holder 800 and vehicle mount 802 may include an attachment mechanism that is attached or connected to the dashboard, such as a suction mechanism or other mechanical connection to the dashboard. In another example, the phone holder 800 and the vehicle mount 802 may be secured to the vent system of the vehicle by a mechanical means, such as a clip or vice securing mechanism. Other example vehicle mounts 802 may be utilized to secure the phone holder 800 to the inside of the vehicle without departing from this invention.

Figure 8A:
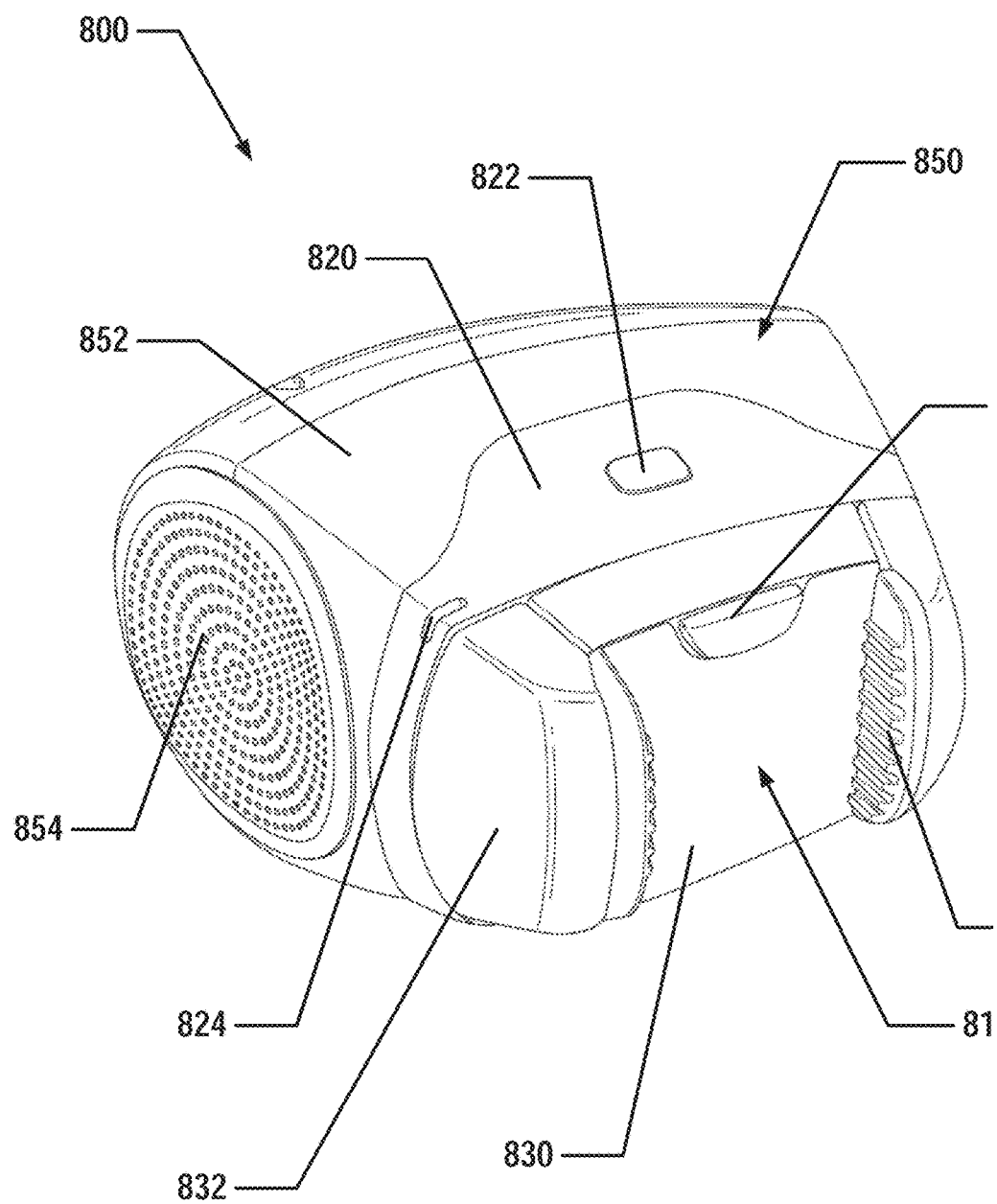
FIG. 8A illustrate a perspective front view of a phone holder in accordance with aspects of this invention.
Figure 8B:
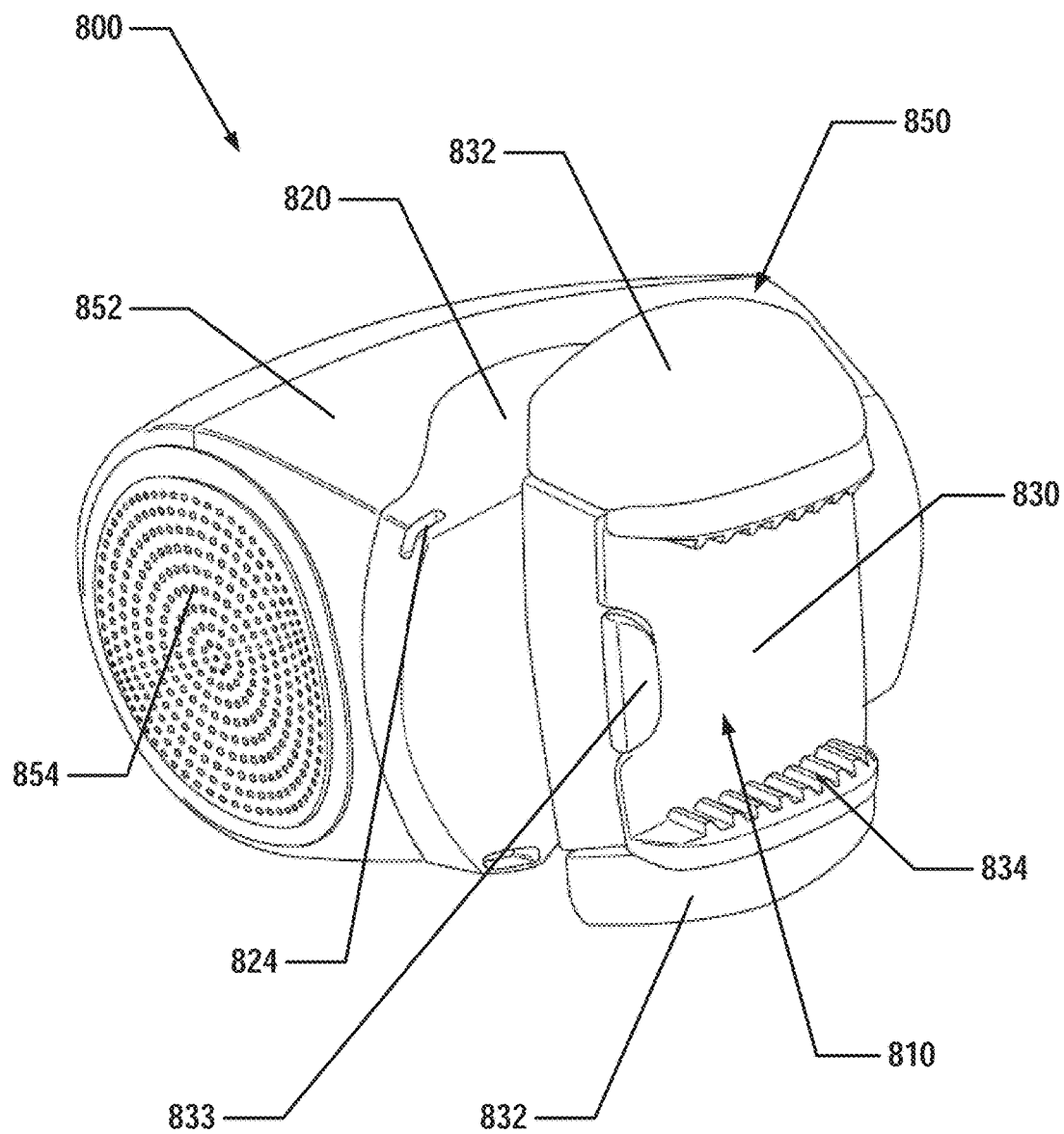
FIG. 8B illustrates a perspective front view of a rotated phone cradle assembly of the phone holder from FIG. 8A in accordance with aspects of this invention.

FIG. 8A illustrates a perspective front view of the phone holder 800 and FIG. 8B illustrates a perspective front view of a rotated phone cradle assembly of the phone holder 800. As illustrated in FIGS. 8A and 8B, the phone holder 800 may include a cradle assembly 810 and a speaker assembly 850. The cradle assembly 810 may be attached to, engaged with, or connected to the speaker assembly 850 in a variety of mechanical methods, such as screwed, snapped, clipped, etc. The cradle assembly 810 may receive a cell phone or mobile device 10. The cradle assembly 810, as described below in the various embodiments, may engage and hold the cell phone or mobile device 10 within the phone holder 800. As illustrated in FIG. 8B, the cradle assembly 810 and specifically a cradle 830 may rotate such that the cell phone or mobile device 10 can be located in either a portrait or landscape configuration for viewing and operation within phone holder 800.

Figure 10:
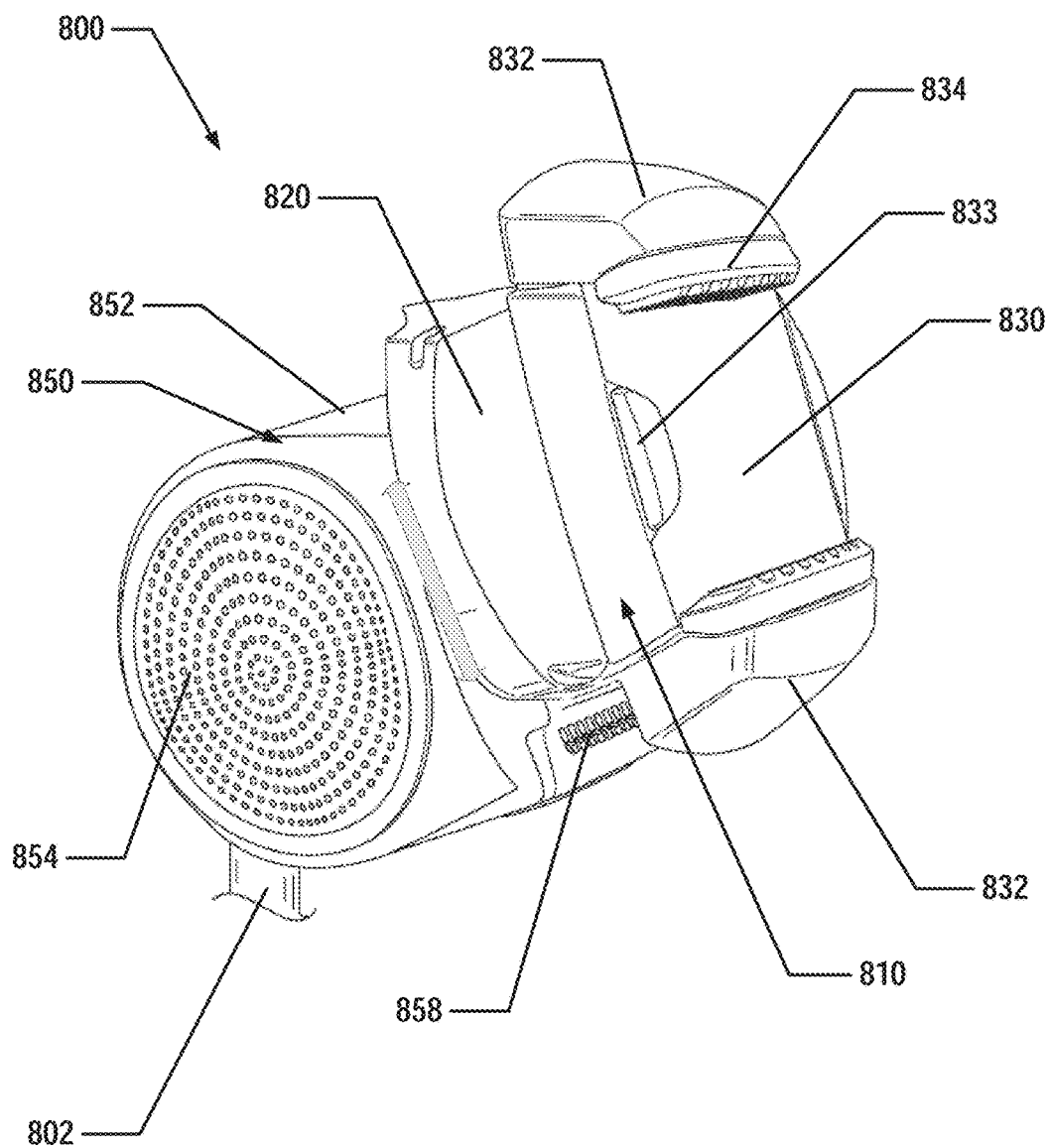
FIG. 10 illustrates a perspective front view of the phone cradle being removed from a speaker assembly of the phone holder from FIG. 8A in accordance with aspects of this invention.

FIG. 10 illustrates a perspective front view of the phone cradle assembly 810 being removed from the speaker assembly 850 of the phone holder 800. As illustrated in FIG. 10, the cradle assembly 810 may slide up or down into or out of connection with the speaker assembly 850. As illustrated in FIG. 8A, the cradle assembly 810 may include a cradle release button 822. When the cradle release button 822 is pressed or activated, the cradle assembly 810 may be released from the speaker assembly 850 and allowed to slide down or off of the speaker assembly 850. Other configurations of the cradle release button 822 may be utilized without departing from this invention and will be explained in more detail below.

Figure 11:
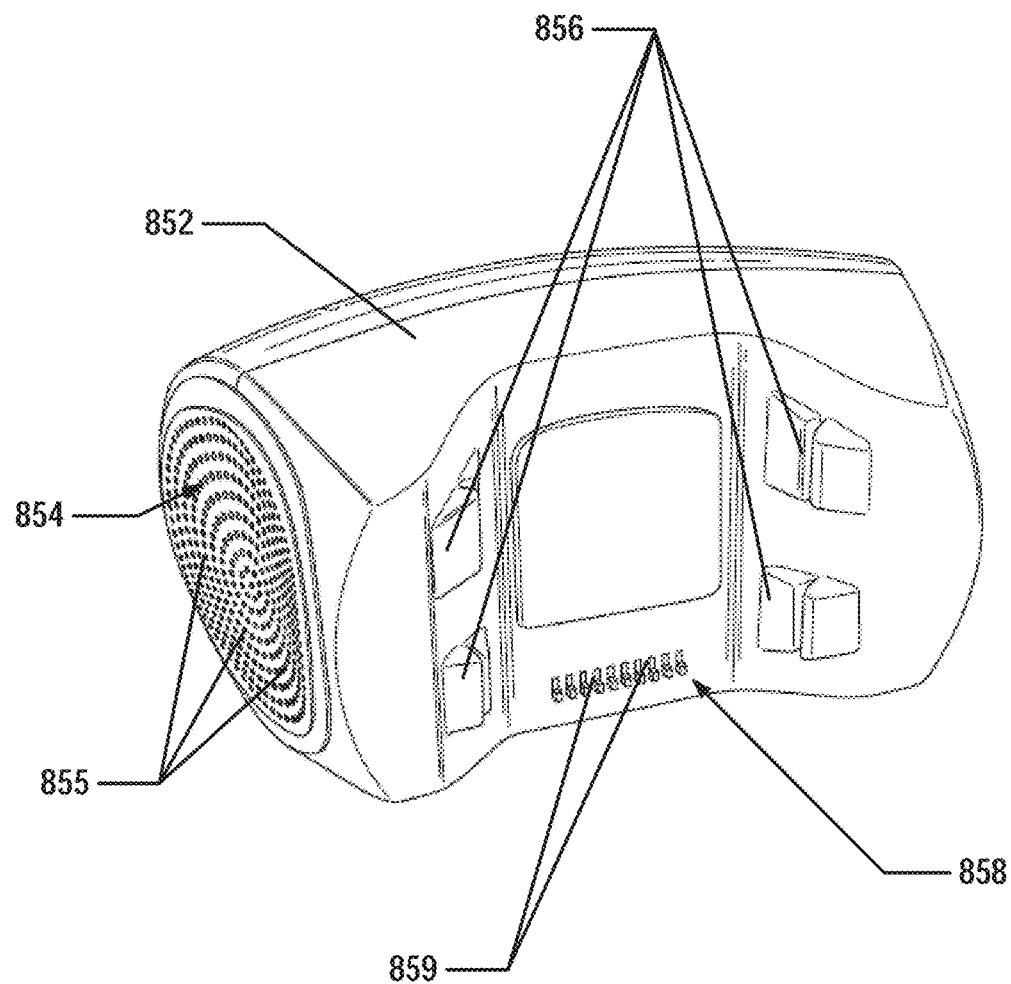
FIG. 11 illustrates a perspective front view of the speaker assembly of the phone holder from FIG. 8A in accordance with aspects of this invention.

The phone holder 800 may include both the speaker assembly 850 and the cradle assembly 810. FIG. 11 illustrates a perspective front view of just the speaker assembly 850 unassembled from the cradle assembly 810. As illustrated in FIG. 11, the speaker assembly 850 may include a speaker housing 852 and one or more speakers 854. The speaker housing 852 may contain the one or more speakers 854 within the speaker assembly 850. The speaker housing 852 may also include one or more cradle mounts 856 as shown in FIG. 11. The cradle mounts 856 may be sized, shaped, and located such that the cradle assembly 810 can slide and lock into the speaker assembly 850 when connecting the cradle assembly 810 to the speaker assembly 850. The cradle mounts 856 may be any mounting mechanisms which may be configured to engage, connect, and/or cooperate with surfaces on the cradle assembly 810 to connect the cradle assembly 810 to the speaker assembly 850. Additionally, as shown in FIG. 11, the speaker assembly may include loudspeaker connector 858. The loudspeaker connector 858 may have a plurality of leads or contacts 859 associated and may be configured to connect to leads or contacts located on the cradle assembly 810.

The one or more speakers 854 may include a plurality of openings 855 which are connected to the speakers 854 and the speaker assembly 850. The described embodiment envisions two speakers 854, generally directed in opposite directions from each other. The speakers 854 and plurality of openings 855 may generally define a circular shape. In alternative embodiments the speakers 854 and plurality of openings 855 may generally define different shapes and may not be limited to two speakers 854. The speakers 854 and plurality of openings 855 may provide a means for the sound to propagate outward from the speaker assembly 850 to provide sound to the user of the phone holder 100.

FIGS. 12A-12E illustrates various view of the cradle assembly 810 of the phone holder 100. The cradle assembly 810 may receive a cell phone or mobile device 10. The cradle assembly 810 may engage and hold the cell phone or mobile device 10 within the phone holder 800. The cradle assembly 810 may rotate such that the cell phone or mobile device 10 can be located in either a portrait or landscape configuration for viewing and operation within phone holder 800. As illustrated in FIGS. 12A-12E, the cradle assembly 810 may include a cradle base 820 and a cradle 830 rotatably attached to the cradle base 820. As discussed above the cradle assembly 810 and the cradle base 820 are removably attached to the speaker assembly 850.

The cradle base 820 is configured to attach to and engage with the speaker assembly 850. The cradle base 820 may be sized, shaped, and located such that the cradle assembly 810 can slide and lock into the speaker assembly 850 when connecting the cradle assembly 810 to the speaker assembly 850. The cradle base 820 and speaker assembly 850 may include any mounting mechanisms which may be configured to engage, connect, and/or cooperate with the surfaces to connect the cradle assembly 810 to the speaker assembly 850. The cradle base 820 may also include a cradle release button 822. When the cradle release button 822 is pressed or activated, the cradle assembly 810 and cradle base 820 may be released from the speaker assembly 850 and allowed to slide down or off of the speaker assembly 850. Other configurations of the cradle release button 822 may be utilized without departing from this invention and will be explained in more detail below.

Figure 12A:
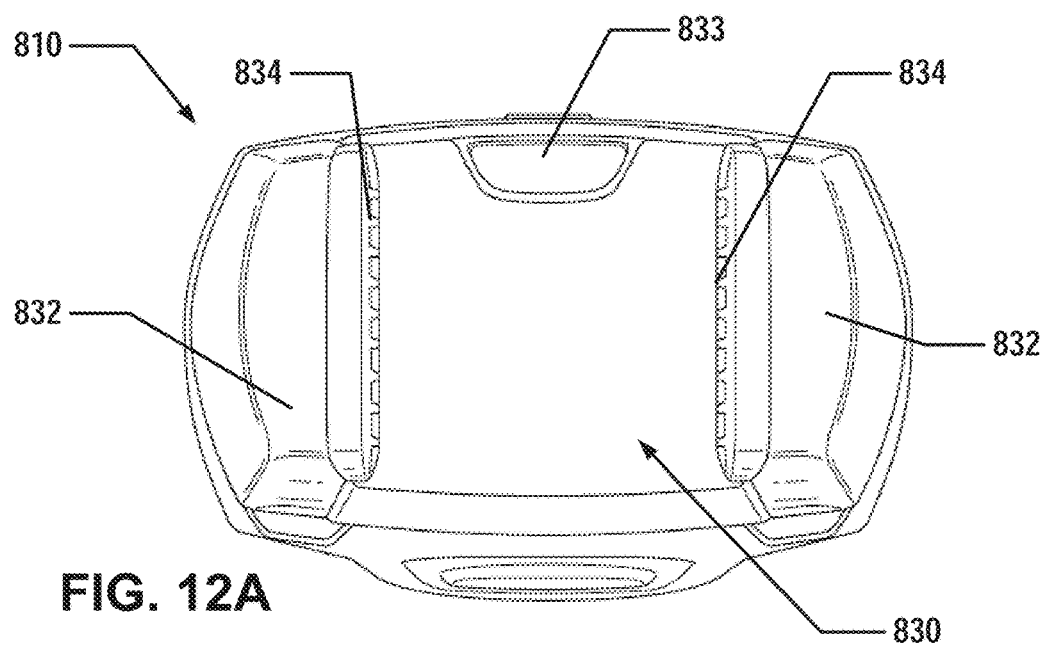
FIGS. 12A-12F illustrate various views of the cradle assembly of the phone holder from FIG. 8A in accordance with aspects of this invention.
Figure 12B:
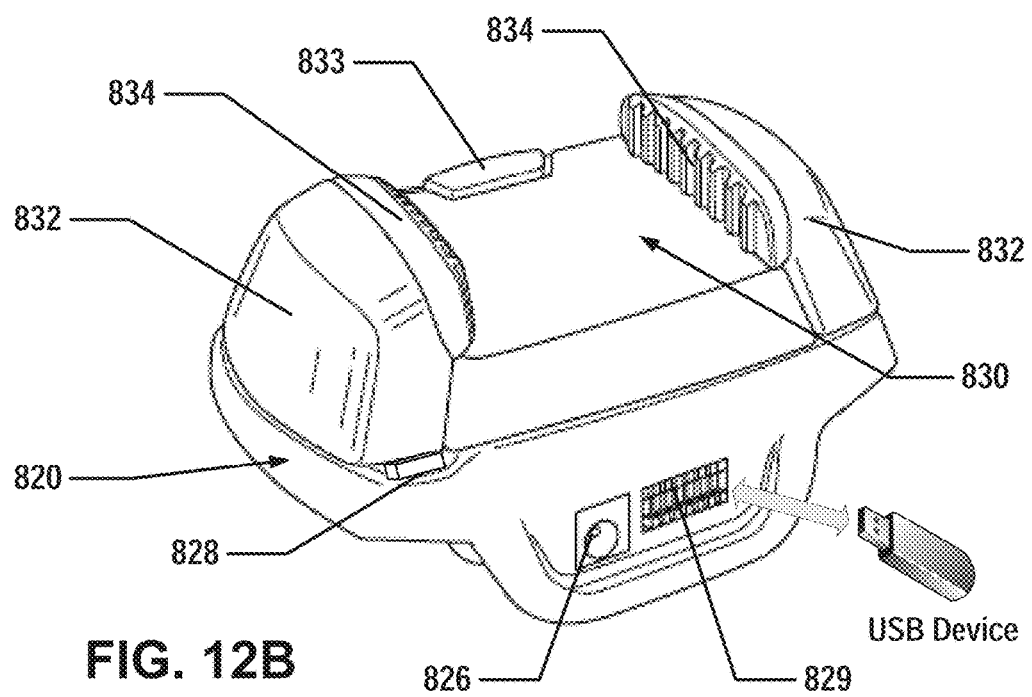
Figure 12C:
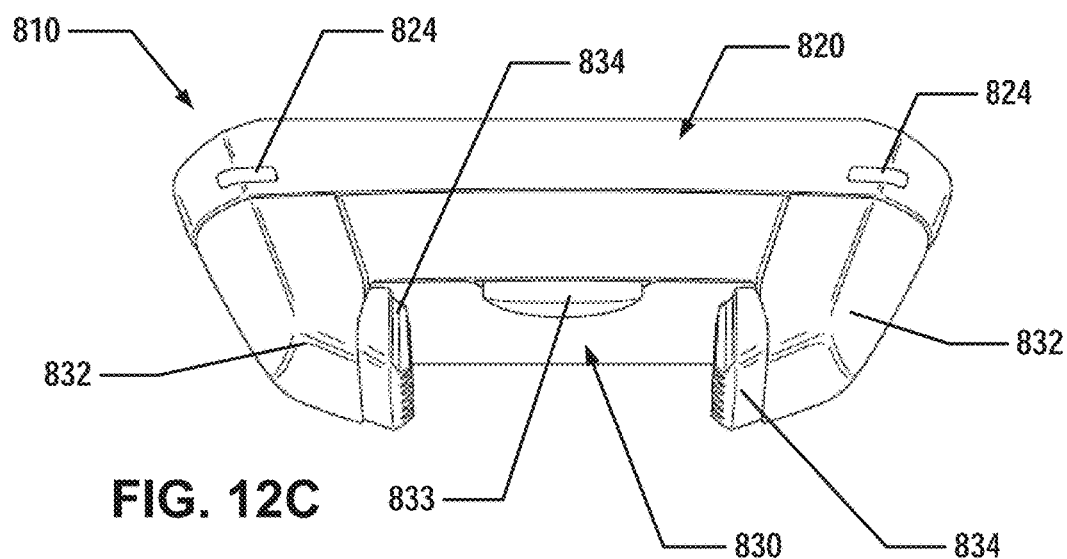
Figure 12D:
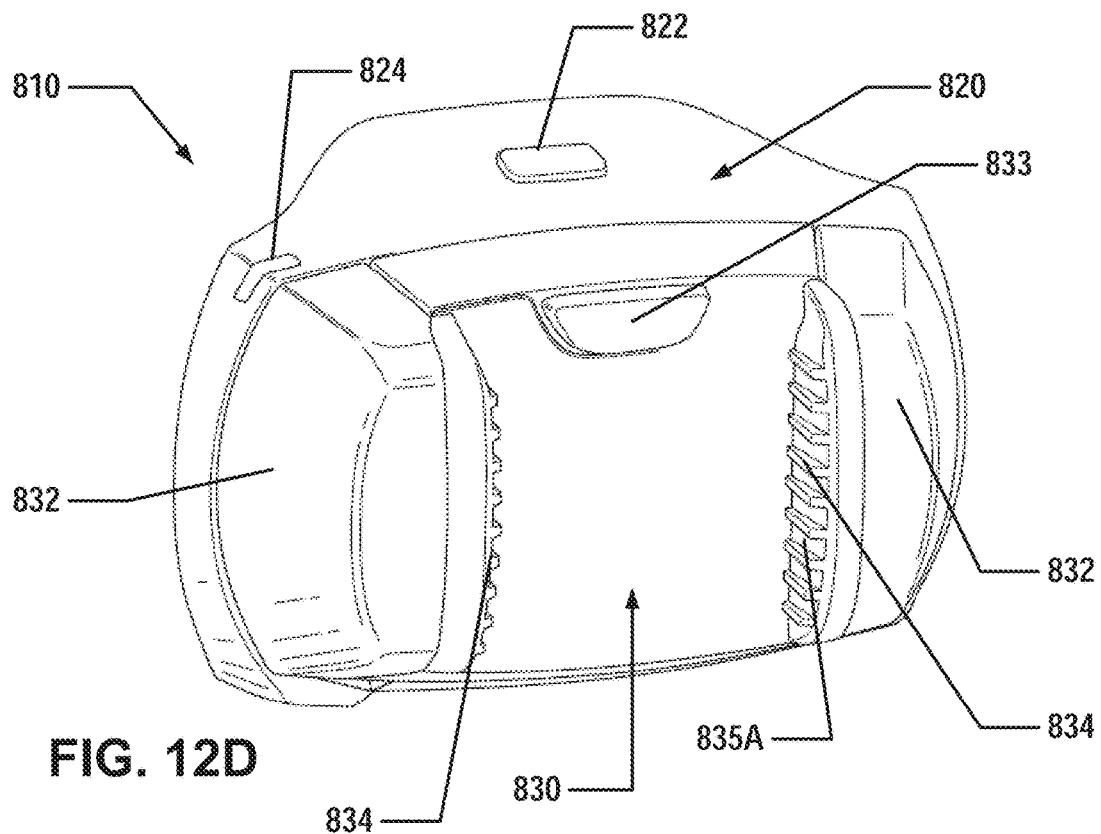
Figure 12E:
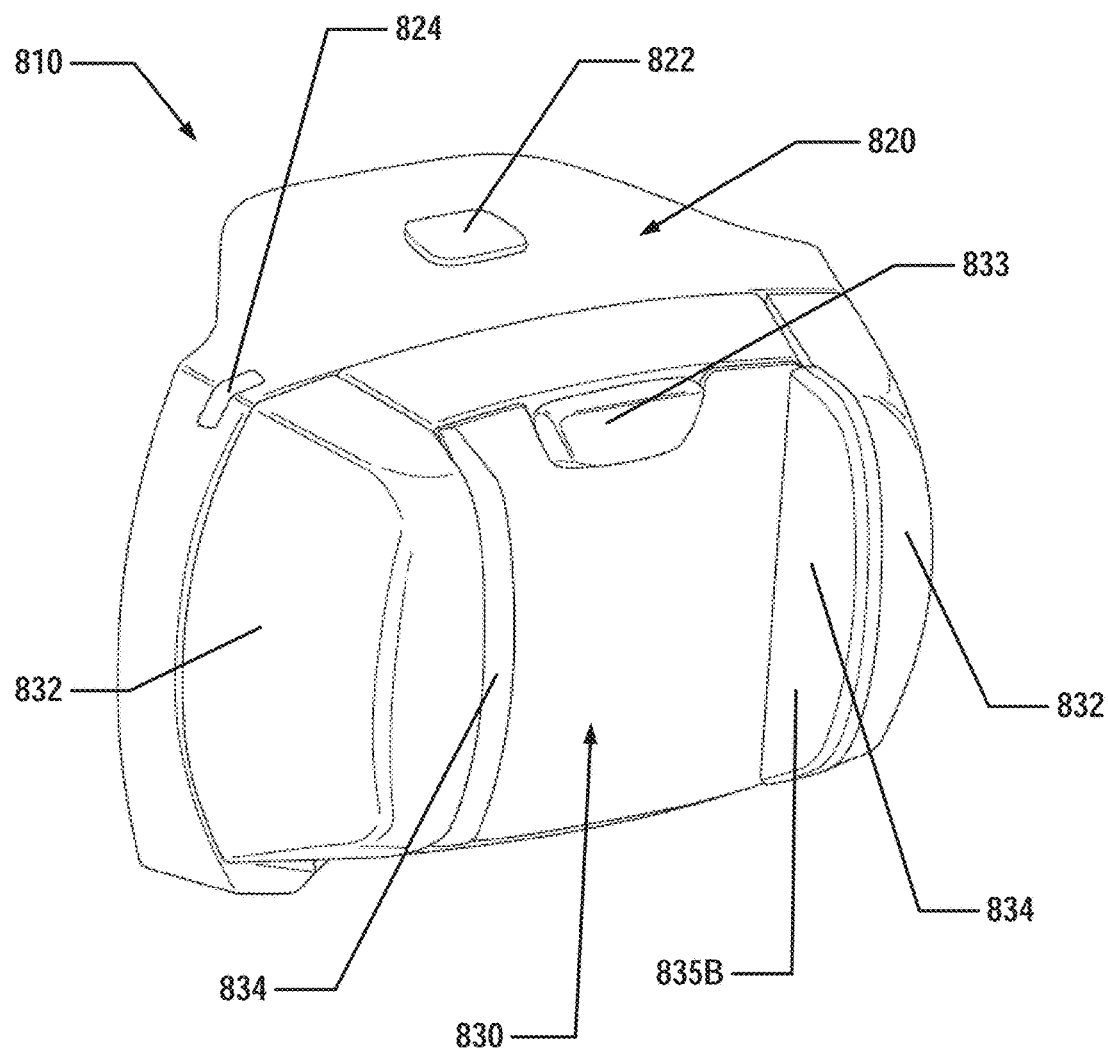

As illustrated in FIGS. 12C-12E, the cradle base 820 may also include a one or more lights 824. The one or more lights 824 may be located on the top portion of the cradle base 820 such a user will be able to view the lights 824. The one or more lights 824 may signify various configurations, events, or alerts, for example, power, status of pairing with Bluetooth devices (such as discoverable, not paired, paired without security, paired with security, etc.). The one or more lights 824 may also be various colors without departing from this invention.

Additionally, as illustrated in FIG. 12B, the cradle base 820 may also include a power charger adapter connection 826. The power charger adapter connection 826 may be configured to receive various different power connections without departing from this invention. In one embodiment, the power charger adapter connection 826 may be a 12 VDC connection. Also, as illustrated in FIG. 12B, the cradle base 820 may include a media slot 828 for use with a media memory device, such as a micro-SD card. Other forms of media may be utilized with the media slot 828 and the cradle base 820 without departing from this invention. As illustrated in FIG. 12B, the cradle base 820 may also include a USB or phone adapter connection 829. The USB or phone adapter connection 829 may be configured to allow the connection of a USB device or other phone connection ports without departing from this invention. Additionally, the cradle base 820 may include a speaker connector (not shown) on the back of the cradle base 820. The speaker connection may include a plurality of leads or contacts that may be configured to connect to the loudspeaker connector 858 leads or contacts located on the speaker assembly 850 when the cradle assembly 810 is connected to the speaker assembly 850.

The cradle 830 may be specifically utilized to hold the cell phone or mobile device 10. The cradle 830 may engage and hold the cell phone or mobile device 10 within the phone holder 800. The cradle assembly 810 and specifically the cradle 830 may rotate such that the cell phone or mobile device 10 can be located in either a portrait or landscape configuration for viewing and operation within phone holder 800. The cradle 830 may include a pair of cradle arms 832 that have a pair of grips 834 attached to each of the cradle arms 832. Additionally, the cradle 830 may include a cell phone locking button 833. When the cell phone locking button 833 is pressed or activated, the cell phone or mobile device 10 may be held in cradle 830 and the cradle arms 832 and the locking button 833 closes the cradle arms 832 and grips 834 to hold the cell phone or mobile device 10. Other configurations of the cell phone locking button 833 may be utilized without departing from this invention.

Figure 17A:
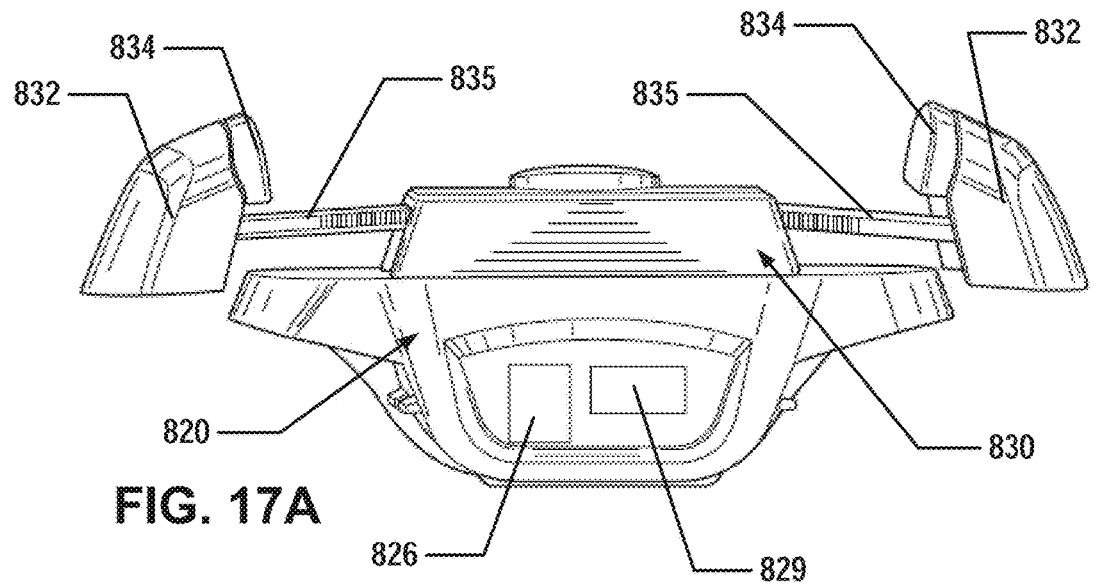
FIGS. 17A-17C illustrate the grips and cradle arms of the phone holder from FIG. 8A in the horizontal position in accordance with aspects of this invention.
Figure 17B:
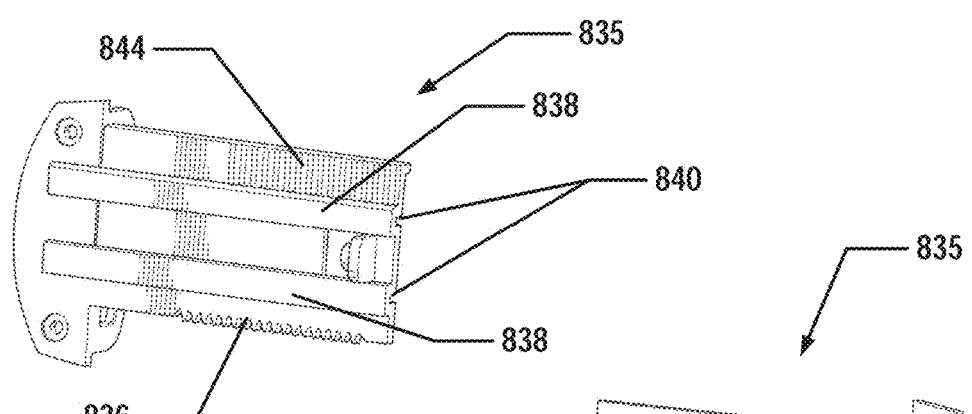
Figure 17C:
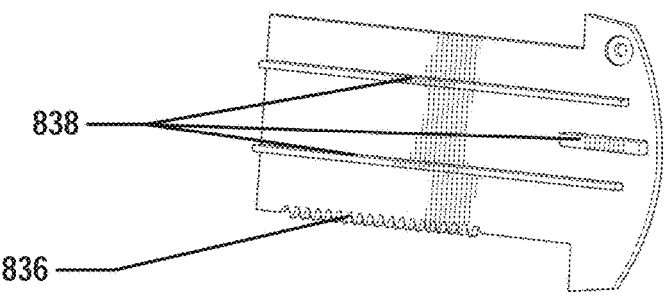
Figure 18:
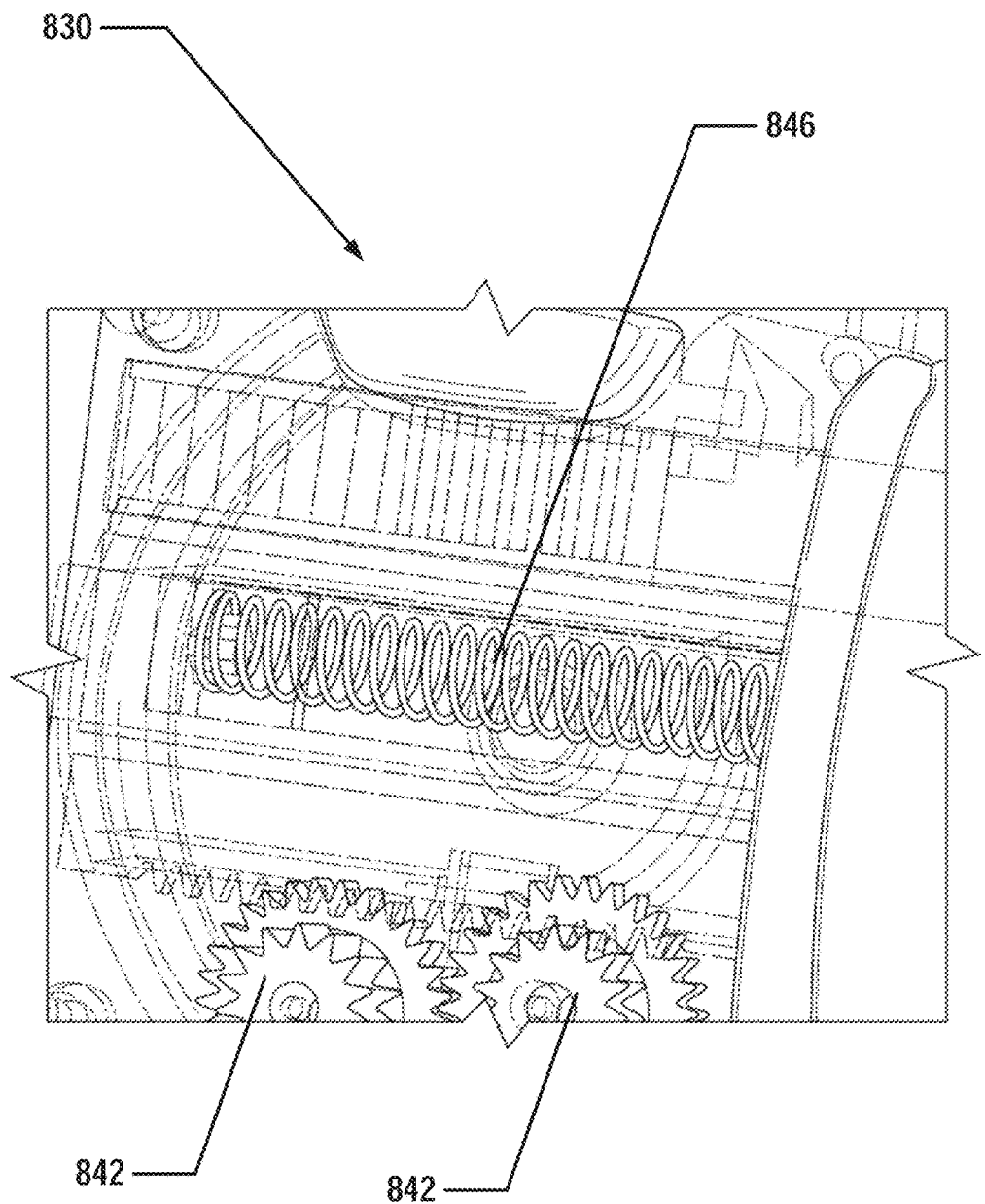
FIG. 18 illustrates exemplary internal components of the phone holder from FIG. 8A in the horizontal position in accordance with aspects of this invention.

As illustrated in FIG. 17A, the pair of cradle arms 832 may include a support arm 835 that is connected to each of the grips 834. The support arms 835 may extend outward to allow the cell phone or mobile device 10 to be inserted in between each of the pair of grips 834. The support arms 835 may include various features without departing from this invention. For example, as illustrated in FIGS. 17B and 17C, the support arms 835 may include locking or holding teeth 836 on a bottom portion of the support arms 835. The locking teeth 836 may engage with teeth or a locking wheel or gears or pawls 842 as shown in FIG. 18. The support arms 835 may also include various forms of rails 838 to help guide and hold the support arms 835 in place when the support arms 835 extend from the cradle 830. The rails 838 may engage with and cooperate with various slots 840 within the cradle 830 and/or the other support arm 835. As illustrated in FIG. 17B, the top portion of the support arm

835 may also include various forms of teeth or indentations 844 to assist with locking and/or holding the support arms 835 in their locations. Additionally, FIG. 18 illustrates exemplary internal components of the phone holder 800 and cradle 830. The cradle 830 may also include a spring 846 or a biasing element may be utilized to hold the support arms 835 together when holding the cell phone or mobile device 10. Any spring or biasing element may be utilized with the cradle without departing from this invention. The spring 846 may work together with the locking wheels or gears or pawls 842 and the locking teeth 836 such that the support arms 835 and grips 834 can firmly hold the cell phone or mobile device 10. Furthermore, the locking gears or pawls 842 may be released by the mobile device locking button 833 to thereby close the cradle arms 832 and grips 834 to hold the cell phone or mobile device 10. The spring 846 may have an arrangement to transmit tension through the gears or pawls 842 and locking teeth 836 to the other side. This spring arrangement 846 will reduce the stress on the gears 842, since the gears may now only be required to transmit enough force to keep the cell phone or mobile device 10 centered in the holder 800. This spring arrangement 846 may also reduce the torsion stress on the contact surfaces of the two grips 834. The spring 846 may be in the form of a compression spring. The spring 846 may also be in the form of an extension spring.

The pair of grips 834 may be made of any soft rubber-type surface and material in order to grip and hold the cell phone or mobile device 10. As shown in FIG. 12D, the grips 834 may also include indentation or teeth 835A to better hold the cell phone or mobile device 10. Additionally, as shown in FIG. 12E, the grips 834 may be flat 835B and not include any indentations or teeth without departing from this invention. The grips 834 may include other shapes, surfaces, or materials without departing from this invention as long as the grips 834 adequately hold the cell phone or mobile device 10 during use.

Figure 12F:
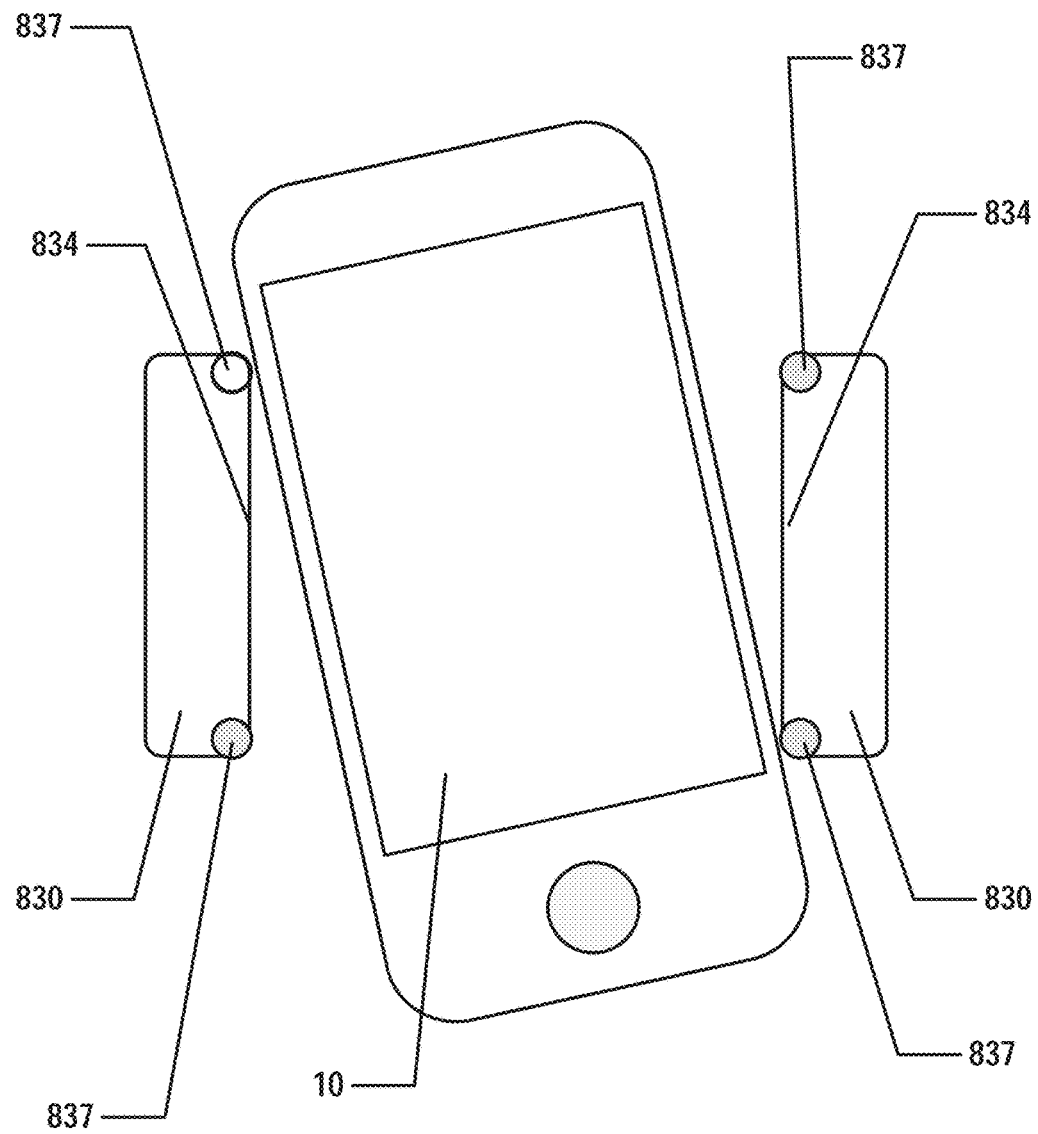

FIG. 12F illustrates a diagram of the cradle 830 and grips 834. As illustrated in FIG. 12F, the cradle 830 and grips 834 may include a hard surface or rollers 837. The rollers 837 may be located near the top and bottom of the grips 834 so that when the cell phone or mobile device 10 is turned a small amount, the cell phone or mobile device 10 is no longer solely touching the rubber surface of the grips 834, but is now instead starting to touch the rollers 837. Then, as the user rotates the cell phone or mobile device 10, the cell phone or mobile device 10 stops touching the rubber surfaces of the grips 834, but slides across the hard surface or rolls along the roller 837. If there was no hard surface or roller, the user would have trouble disengaging the cell phone or mobile device 10 during the twist-to-release operations. As the cell phone or mobile device 10 turns, the two grips 834 move away from each other in parallel, but so the distance between the upper left and lower right points of engagement of the two rollers 837 slide on the cell phone or mobile device 10. If these two rollers 837 were rubber, then it would be difficult to turn for two reasons. First, the spring pushing the two grips 834 toward each other, and second, the sliding of the cell phone or mobile device 10 across the two points of rubber engagement at the grips 834. The rollers 837 may be rounded and the rounded rollers 837 may be perpendicular to the cradle 830.

Figure 13A:
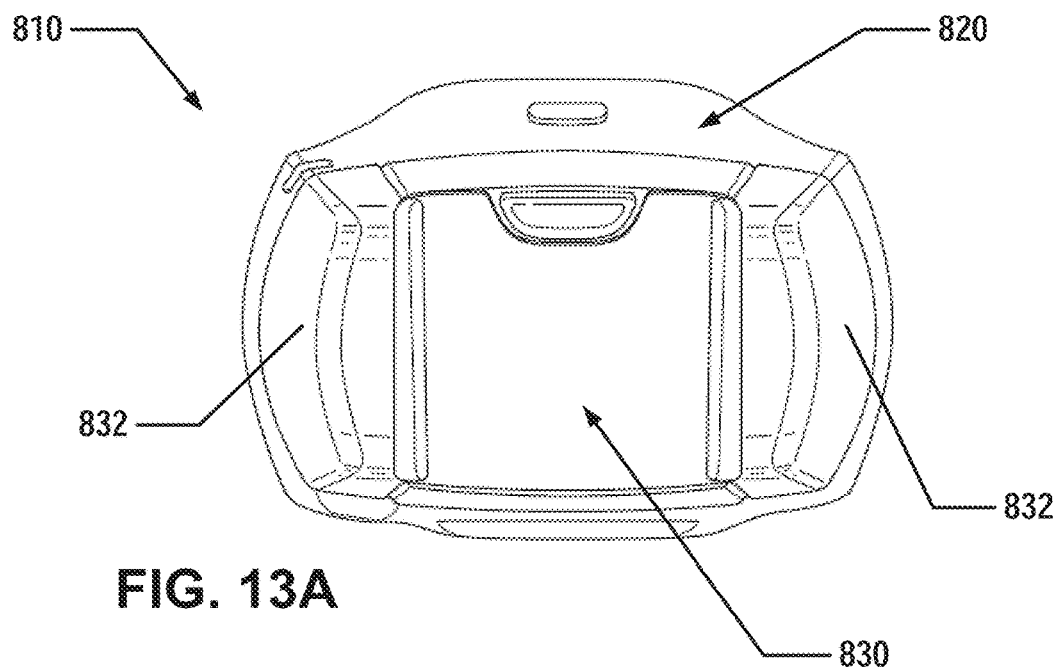
FIGS. 13A-13C illustrate various front views of the cradle assembly showing the cradle rotated clockwise in accordance with aspects of this invention.
Figure 13B:
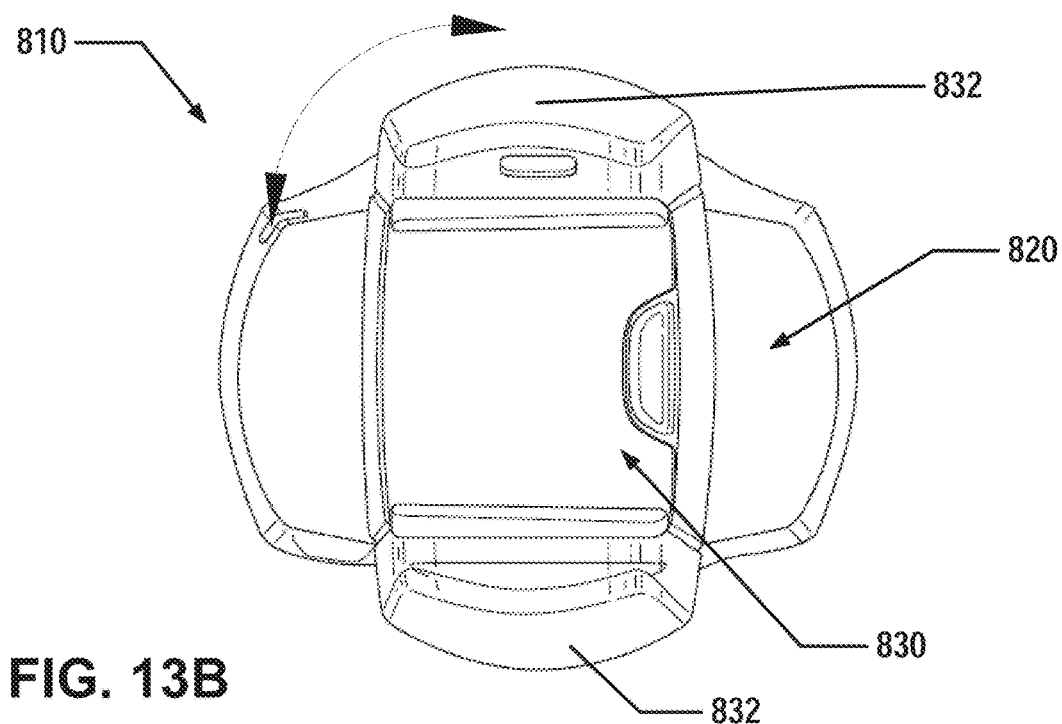
Figure 13C:
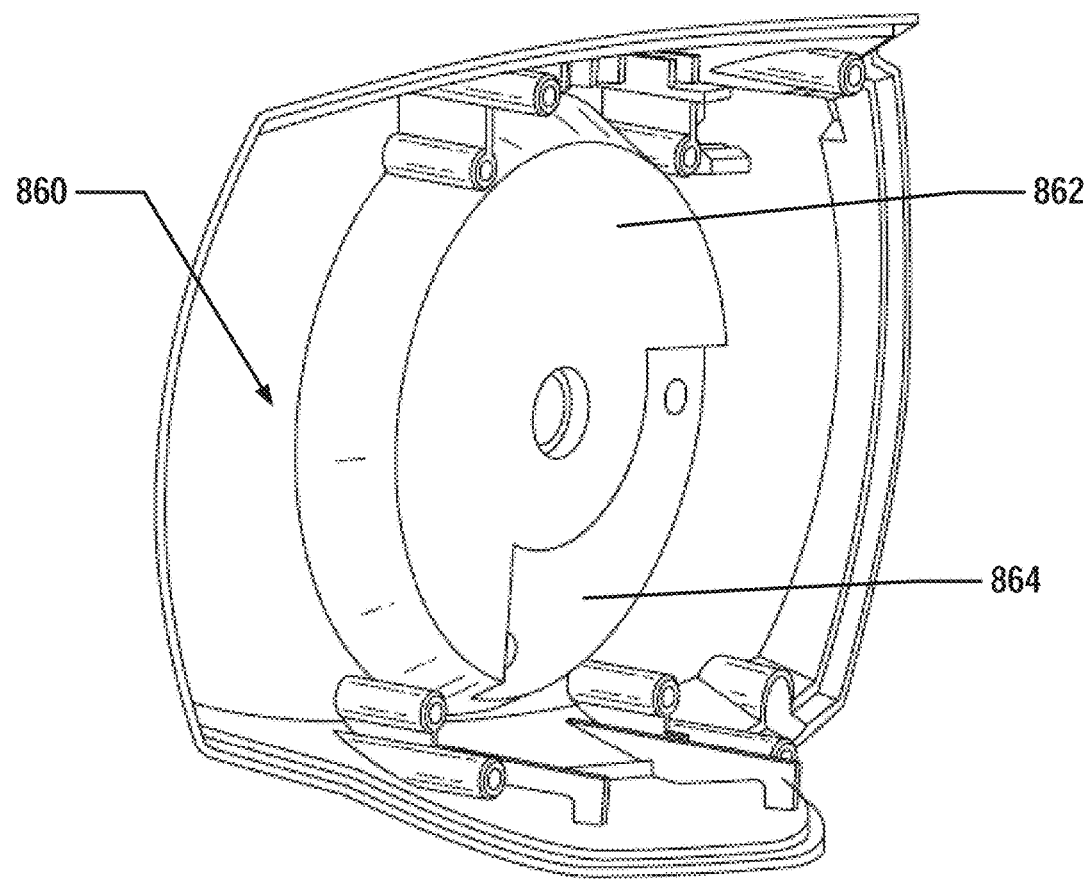

FIGS. 13A-13C illustrate various front views of the cradle assembly 810 showing the cradle 830 rotated clockwise in accordance with aspects of this invention. FIG. 13A shows the cradle 830 in the vertical, unrotated position, wherein the cell phone or mobile device 10 is in a portrait orientation. FIG. 13B shows the cradle 830 rotated on the cradle base 820 and in the clockwise rotated horizontal position, wherein the cell phone or mobile device 10 is in a landscape orientation. FIG. 13C illustrates an internal rotation mechanism 860 for a clockwise rotation. The internal rotation mechanism 860 may include a rotation wheel 862 and a rotation slot or guide 864 within the rotation wheel 862. The rotation slot or guide 864 defines the stops for the clockwise rotation of the cradle 830 and the cell phone or mobile device 10. As is shown in FIGS. 13A-13C, the clockwise rotation of the cradle 830 may be 90 degrees clockwise. Other degrees of clockwise rotation may be utilized without departing from this invention.

Figure 14A:
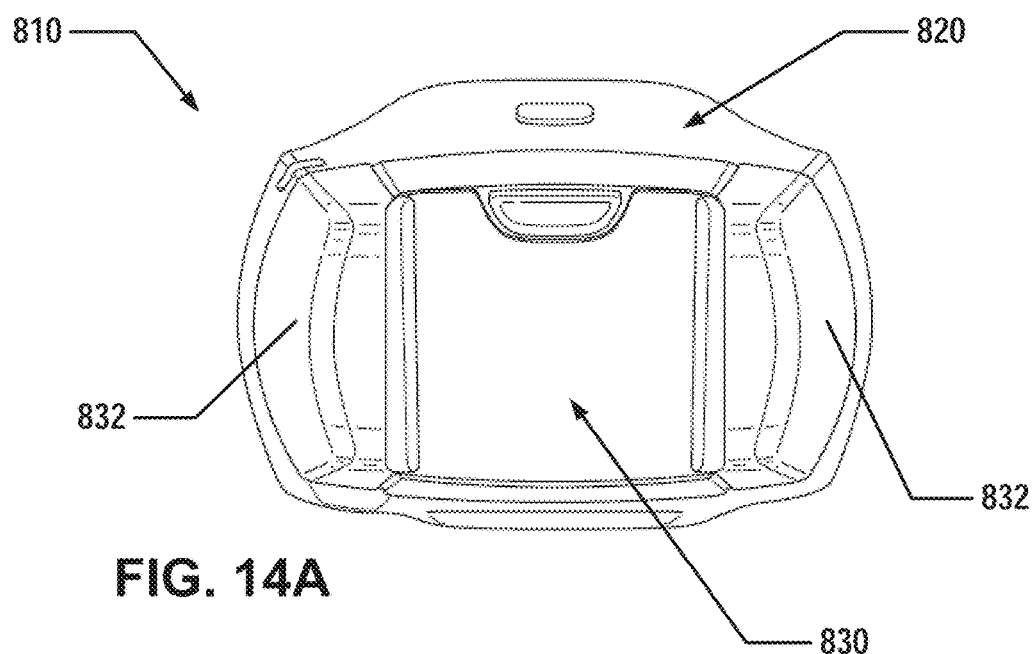
FIGS. 14A-14C illustrate front views of the cradle assembly showing the cradle rotated counter-clockwise in accordance with aspects of this invention.
Figure 14B:
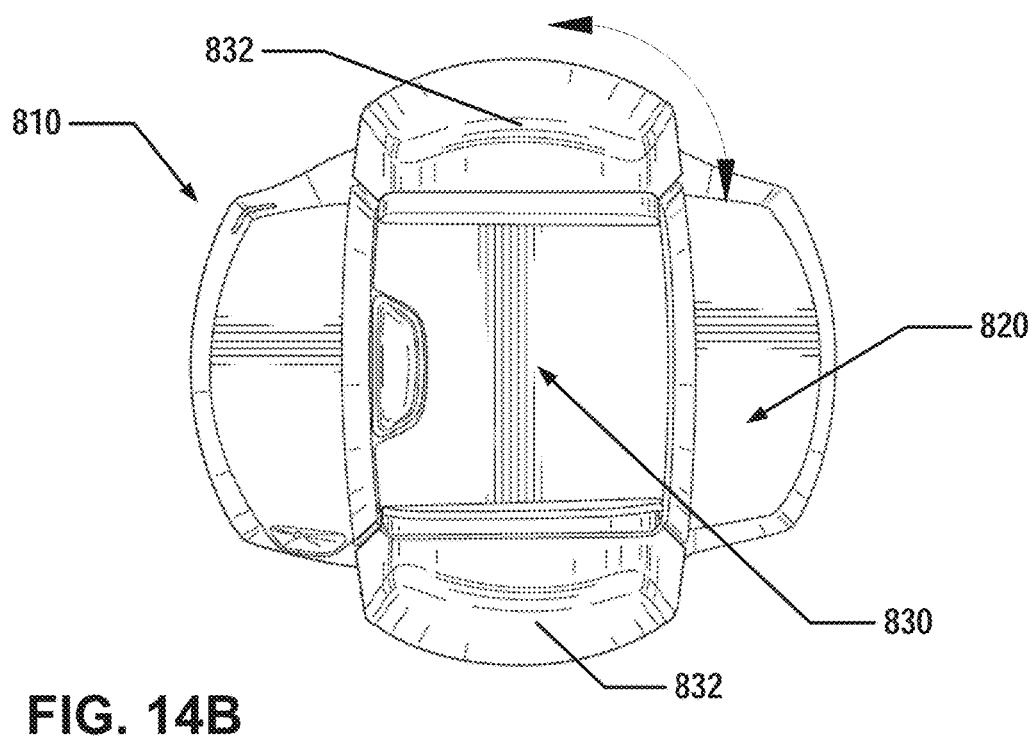
Figure 14C:
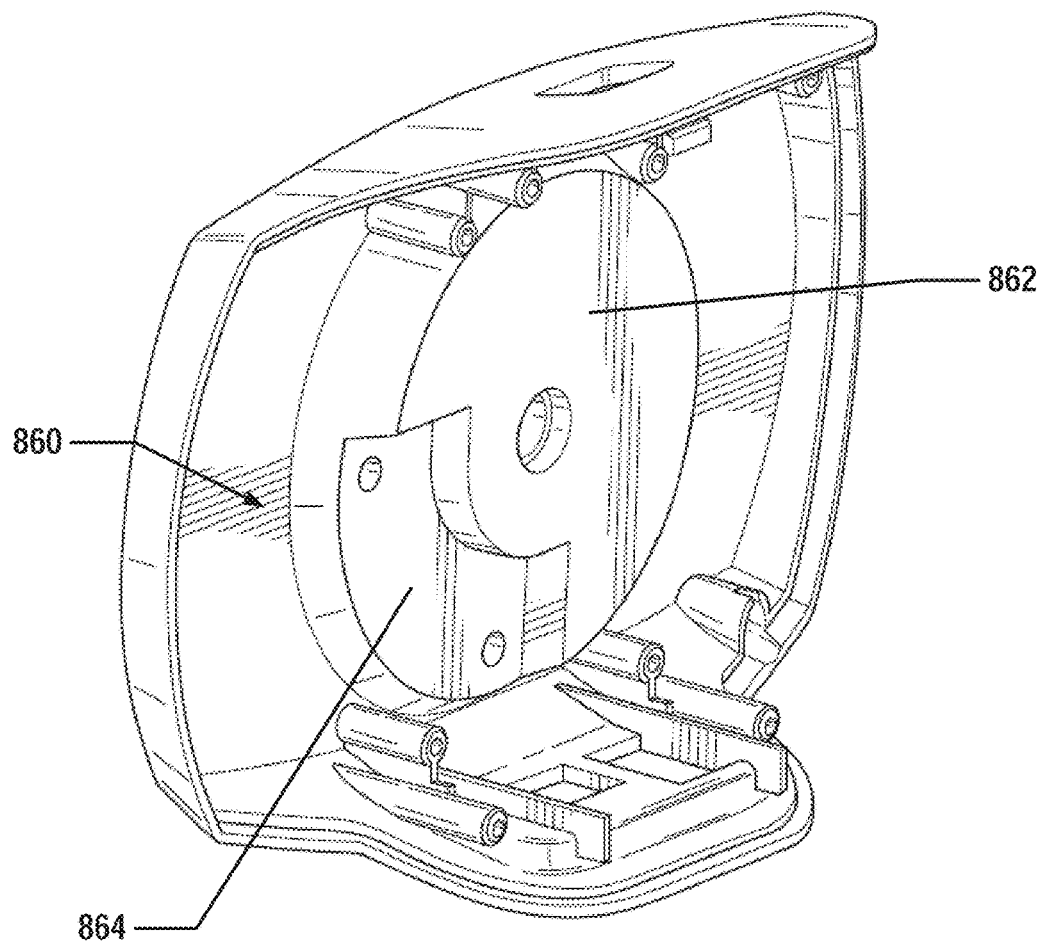

FIGS. 14A-14C illustrate various front views of the cradle assembly 810 showing the cradle 830 rotated counter-clockwise in accordance with aspects of this invention. FIG. 14A shows the cradle 830 in the vertical, unrotated position, wherein the cell phone or mobile device 10 is in a portrait orientation. FIG. 14B shows the cradle 830 rotated on the cradle base 820 and in the counter-clockwise rotated horizontal position, wherein the cell phone or mobile device 10 is in a landscape orientation. FIG. 14C illustrates an internal rotation mechanism 860 for a counter-clockwise rotation. The internal rotation mechanism 860 may include a rotation wheel 862 and a rotation slot or guide 864 within the rotation wheel 862. The rotation slot or guide 864 defines the stops for the counter-clockwise rotation of the cradle 830 and the cell phone or mobile device 10. As is shown in FIGS. 14A-14C, the counter-clockwise rotation of the cradle 830 may be 90 degrees counter-clockwise. Other degrees of counter-clockwise rotation may be utilized without departing from this invention.

FIGS. 15A-16B illustrate the phone holder 800 and the twist-to-release securement system to release the cell phone or mobile device 10 from the phone holder 10. The twist-to-release securement system allows the release of the cell phone or mobile device 10 from the phone holder 800 by twisting or slightly rotating the cell phone or mobile device 10 while the cell phone or mobile device 10 is held in the phone holder 800.

Figure 15A:
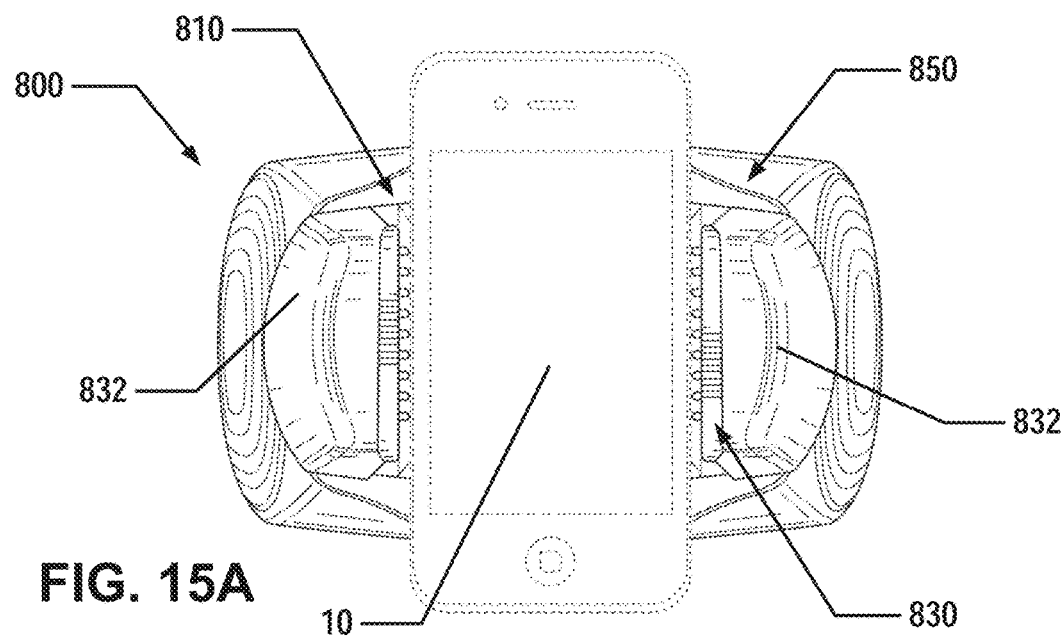
FIGS. 15A and 15B illustrate front views of the cradle assembly tilt function with the phone holder from FIG. 8A in the vertical position in accordance with aspects of this invention.
Figure 15B:
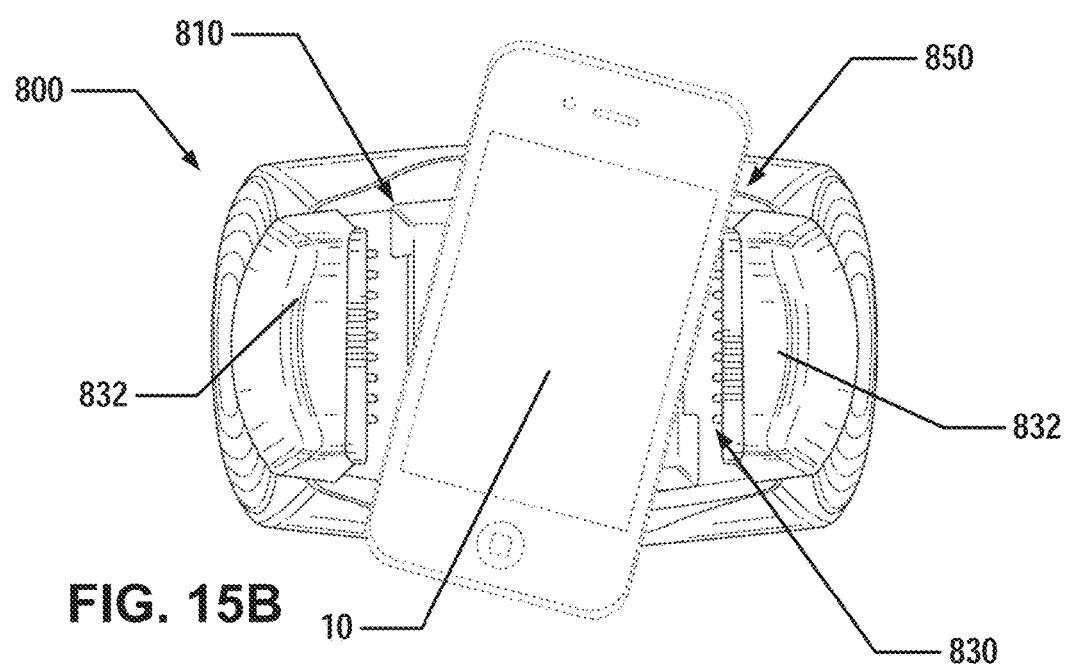
Figure 16A:
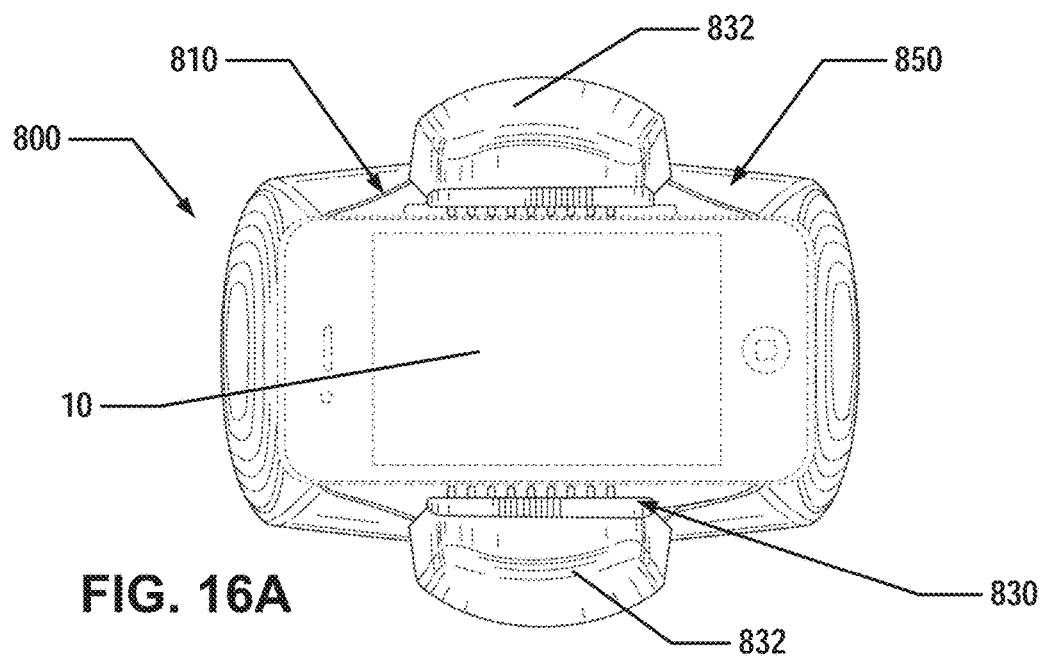
FIGS. 16A and 16B illustrate front views of the cradle assembly tilt function with the phone holder from FIG. 8A in the horizontal position in accordance with aspects of this invention.
Figure 16B:
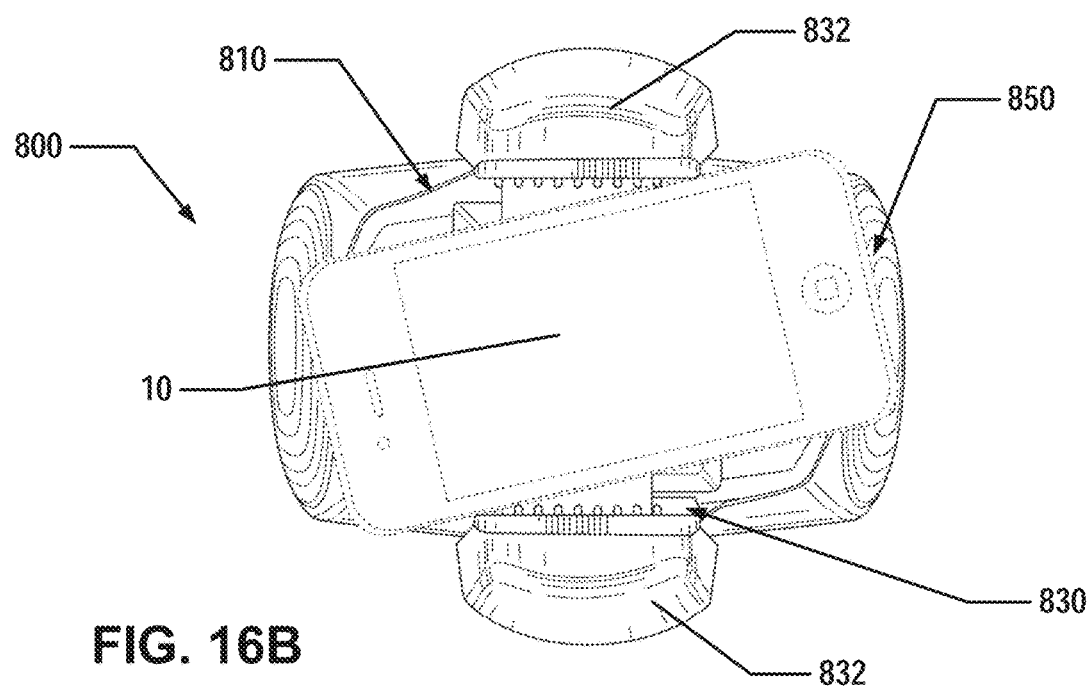

FIGS. 15A and 15B illustrate front views of the cradle assembly 810 with the cradle 830 and cell phone or mobile device 10 in the vertical position. FIGS. 15A and 15B illustrate how a cell phone or mobile device 10 may be removed from the cradle 830 and the cradle arms 832 while the cell phone or mobile device 10 is in the portrait orientation. As illustrated in FIG. 15A, the cell phone or mobile device 10 is locked into the cradle 830 in the vertical, unrotated position, wherein the cell phone or mobile device 10 is in a portrait orientation. A user may then slightly twist or rotate the cell phone or mobile device 10 as illustrated in FIG. 15B, thereby releasing and unlocking the cradle arms 832 and removing the cell phone or mobile device 10 from the cradle 830. FIGS. 16A and 16B illustrate front views of the cradle assembly 810 with the cradle 830 and cell phone or mobile device 10 in the horizontal position. FIGS. 16A and 16B illustrate how a cell phone or mobile device 10 may be removed from the cradle 830 and the cradle arms 832 while the cell phone or mobile device 10 is in the landscape orientation. As illustrated in FIG. 16A, the cell phone or mobile device 10 is locked into the cradle 830 in the horizontal, rotated position, wherein the cell phone or mobile device 10 is in a landscape orientation. A user may then slightly twist or rotate the cell phone or mobile device 10 as illustrated in FIG. 16B, thereby releasing and unlocking the cradle arms 832 and removing the cell phone or mobile device 10 from the cradle 830.

In another aspect of this invention, in accordance with any of the above described and detailed phone holders, the phone holder may include a post-mount structure to hold or carry Bluetooth capable speakers and a hands-free cell phone or mobile device. In yet another aspect of this invention, in accordance with any of the above described and detailed phone holders, the phone holder may be an integrated phone holder that includes a speaker/hands-free phone. In yet another aspect of this invention, in accordance with any of the above described and detailed phone holders, the phone holder may include a speaker that is separable from a base connected to the phone via Bluetooth. The Bluetooth base may include has a power input, a USB charging output, and electronics to drive the speakers. In addition, the Bluetooth base may include post mount structure even when and if the speaker is not in use.

Figure 19:
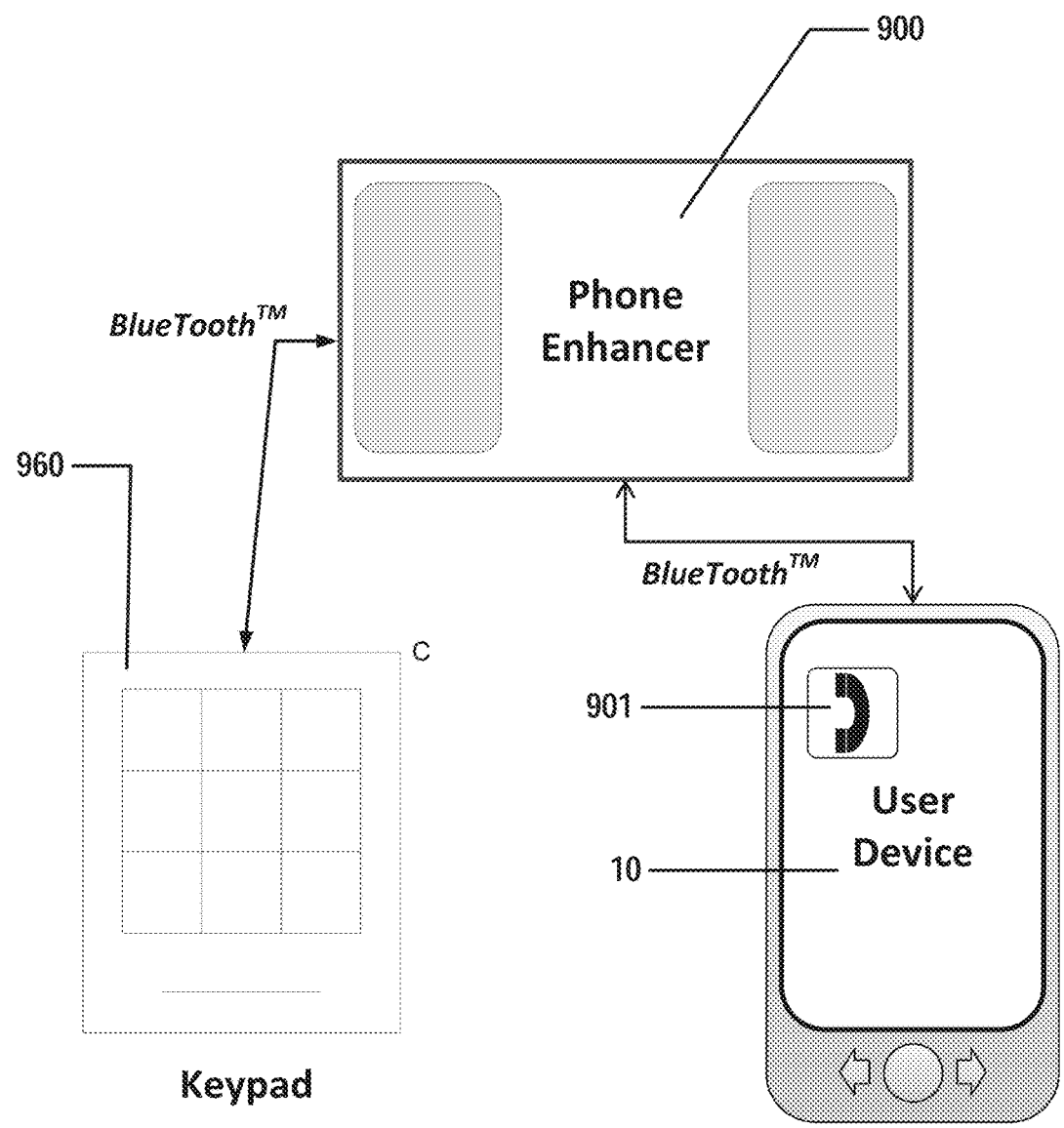
FIG. 19 illustrates another exemplary phone holder in accordance with aspects of this invention.

FIG. 19 illustrates another exemplary phone holder 900 or phone enhancer 900. The phone holder or phone enhancer 900 as illustrated in FIG. 19 and described below may include any of the above described and detailed phone holder features as illustrated and described in FIGS. 1-18. Generally, the phone enhancer 900 may be configured for holding a cell phone or mobile device 10 in a vehicle. The phone enhancer 900 may be utilized for sending and receiving phone calls and playing audio through the phone enhancer 900. The phone enhancer 900 may be secured to the inside of a vehicle such that the driver and/or passenger can see the screen of the cell phone or mobile device 10 more safely without diverting their attention/looks/gaze from the road ahead of them. The phone enhancer 900 may include a vehicle mount such that the phone enhancer 900 may be secured in a variety of different ways to the inside of the vehicle. For example, the phone enhancer 900 and vehicle mount may include a suction mechanism attached to the windshield. In another example, the phone enhancer 900 and vehicle mount may include an attachment mechanism that is attached or connected to the dashboard, such as a suction mechanism or other mechanical connection to the dashboard. In another example, the phone enhancer 900 and the vehicle mount may be secured to the vent system of the vehicle by a mechanical means, such as a clip or vice securing mechanism. Other example vehicle mounts may be utilized to secure the phone enhancer 900 to the inside of the vehicle without departing from this invention.

The phone enhancer 900 may include a keypad 960 and a keypad-to-base connection. The keypad 960 may include a Bluetooth connection for wireless connection of the keypad 960 to the phone enhancer 900. The keypad 960 may be capable of receiving keypad events and instructions. The keypad 960 may include functionality to answer the phone, hang up the phone, pause and play music, and adjust volume of phone calls and music. For example, the keypad 960 may receive keypad events and instructions such as: answer the cell phone or mobile device 10, hang up the cell phone or mobile device 10, dial a phone number on the keypad 960 for the cell phone or mobile device 10, pause and play music from the cell phone or mobile device 10, adjust the volume of phone calls on the cell phone or mobile device 10, and adjust the volume of music from the cell phone or mobile device 10. The phone enhancer 900 may transform keypad events and instructions to Bluetooth events and then send those events or instructions to the cell phone or mobile device 10.

One driver with a cell phone or mobile device 10 may install the phone enhancer 900 into the vehicle. The phone enhancer 900 may need power through a power source in the vehicle. The phone enhancer 900 may also be able to be powered from batteries or other power sources known and used in the art. The phone enhancer 960 may include a Bluetooth connection for wireless connection of the cell phone or mobile device 10 to the phone enhancer 900. The phone enhancer 900 may then be Bluetooth paired or Bluetooth connected to the driver's cell phone or mobile device 10. The Bluetooth connection may be similar to those Bluetooth connections known and used in the art. Additionally, the phone enhancer 900 may include a phone enhancer application 901 that can be run and operated on the cell phone or mobile device 10. The phone enhancer application 901 may be downloaded onto the cell phone or mobile device 10.

In another aspect of this invention, in accordance with any of the above described and detailed phone holders in FIGS. 1-18, the phone enhancer 900 may be utilized with multiple driver phones. The phone enhancer 900 may retain up to a certain number of phone pairings. Generally, priority order is pairing. All cell phones or mobile devices 10 may connect to the phone enhancer 900. In one example, only the highest priority cell phone or mobile device 10 may get the audio services.

There may be various connection requirements and rules that the phone enhancer 900 may utilize which defines how the phone enhancer 900 may connect to paired cell phones or mobile devices 10. Generally, for cell phones or mobile devices 10 which do not have the phone enhancer application 901, the only connection method is to connect with the earliest paired cell phone or mobile device 10. For cell phones or mobile devices 10 with the phone enhancer application 901, the connection method allows pairing with all of these cell phones or mobile devices 10.

In the example of retaining the order of pairing and the least recently used connection list, the phone enhancer 900 may retain pairing with N (N>1) cell phones or mobile devices 10. The phone enhancer 900 may retain the order of pairing of all of the cell phones or mobile devices 10 to which the phone enhancer 900 is paired. The phone enhancer 900 may retain a LRU (least recently used) list of cell phones or mobile devices 10 to which the phone enhancer 900 has connected, a list of most recently connected to least recently connected cell phones or mobile devices 10. At each connection, whenever a cell phone or mobile device 10 that has a valid pairing with the phone enhancer 900 connects to the phone enhancer 900, the cell phone or mobile device's 10 entry in the LRU shall be moved in the list to the most recently used position. If only one cell phone or mobile device 10 is connected to the phone enhancer 900, then that cell phone or mobile device 10 receives all of the services for the phone enhancer 900, regardless of the order of the pairing.

If a vehicle has two (or more) drivers whose cell phones or mobile devices 10 have connected to the phone enhancer 900 in the past, and both (all) of the people are in the vehicle, the phone enhancer 900 needs to determine which is the driver. Since the phone enhancer 900 has no information to make this determination, the phone enhancer 900 chooses the first cell phone or mobile device 10 the phone enhancer 900 paired with (out of the set of cell phones or mobile devices 10 to which the phone enhancer 900 could connect). In this situation, if the passenger's cell phone or mobile device 10 is connected, the passenger may have to turn off his or her Bluetooth on the cell phone or mobile device 10. This requirement can be implemented by the phone enhancer 900 refusing connections to the later paired cell phone or mobile device 10. In practice this could result in a connection to a later paired cell phone or mobile device 10, then a disconnect from the later paired cell phone or mobile device 10 and a connection to the earlier paired cell phone or mobile device 10.

If a vehicle has two (or more) drivers whose phones have connected to the phone enhancer 900 in the past, and both (all) of the people are in the vehicle, and one of the people has the phone enhancer application 901 installed on their cell phone or mobile device 10, the phone enhancer application 901 may start when the cell phone or mobile device 10 detects the phone enhancer 900. The phone enhancer application 901 may communicate with the phone enhancer 900 and display in a list the names of both (all) phones that are connected to the phone enhancer 900. The phone enhancer application 901 will indicate its own entry in the list. The user may then use the phone enhancer application 901 to indicate which cell phone or mobile device 10 is assigned to the driver.

If a vehicle has multiple drivers whose cell phone or mobile device 10 have connected to the phone enhancer 900 in the past, and more than one cell phone or mobile device 10 has the phone enhancer application 901 installed, as the cell phones or mobile devices 10 connect to the phone enhancer 900, the phone enhancer application 901 may start when the cell phone or mobile device 10 detects the phone enhancer 900. On each cell phone or mobile device 10 running the phone enhancer application 901, the phone enhancer application 901 may communicate with the phone enhancer 900 and display in a list the names of the other cell phones or mobile devices 10 connected to the phone enhancer 900.

Generally, the phone enhancer application 901 may determine which user is the driver when multiple users are in the vehicle. Additionally, when multiple users are in the vehicle, the phone enhancer 900 may include a base that does not allow audio or keypad services until the driver is determined.

CONCLUSION

The present invention is disclosed above and in the accompanying drawings with reference to a variety of examples. The purpose served by the disclosure, however, is to provide an example of the various features and concepts related to the invention, not to limit the scope of the invention. One skilled in the relevant art will recognize that numerous variations and modifications may be made to the aspects described above without departing from the scope of the present invention, as defined by the appended claims.

We claim:

1. A phone holder for holding a cell phone in a vehicle, the phone holder including:
   a phone enhancer and a cradle attached to the phone enhancer configured to hold a cell phone in a vehicle, the phone enhancer wirelessly connected to the cell phone, the cradle including a triangular hold securement system connected to the cradle, wherein the triangular hold securement system includes a first grab post, a second grab post, and a third grab post, wherein the first grab post and the second grab post are positioned to contact and engage on one of two long sides of the cell phone and the third grab post is positioned to contact and engage on the opposite long side of the cell phone, and further wherein the first grab post and third grab post are connected by a first arm and the second grab posts and the third grab post are connected by a second arm, wherein the first arm and the second arm are connected to a linkage element providing biasing forces to the first arm, the second arm, and the grab posts to secure the cell phone to the cradle;
   a keypad wirelessly connected to the phone enhancer, wherein the keypad includes a Bluetooth connection for wireless connection of the keypad to the phone enhancer, wherein the keypad receives one or more keypad events and instructions that include one or more of the following: answer the cell phone, hang up the cell phone, pause and play music from the cell phone, adjust the volume of a phone call on the cell phone, adjust the volume of the music on the cell phone, and dial a phone number for a phone call on the cell phone; and
   a phone enhancer application installed and operated on the cell phone, wherein the phone enhancer application determines a driver of the vehicle when multiple users are in the vehicle.

2. A phone holder according to claim 1, further including a vehicle mount to secure the phone holder to the inside of the vehicle such that the driver can see the cell phone.

3. A phone holder according to claim 1, wherein the phone enhancer includes a Bluetooth connection for wireless connection of the cell phone to the phone enhancer.

4. A phone holder according to claim 1, wherein the phone enhancer transforms the keypad events and instructions to a Bluetooth event and then sends the keypad events and instructions to the cell phone.

5. A phone holder according to claim 1, wherein the phone enhancer retains an order of pairing of cell phones and a least recently used connection list, wherein the least recently used connection list is a list of most recently connected cell phone to least recently connected cell phone.

6. A phone holder according to claim 5, wherein when a cell phone has a valid connection with the phone enhancer, the phone enhancer places an identification associated with the cell phone in the least recently used connection list to the most recently connected cell phone.

7. A phone holder according to claim 1, wherein when the vehicle has multiple users whose cell phone have previously connected to the phone enhancer, the phone enhancer application starts when the cell phone detects the phone enhancer.

8. A phone holder according to claim 7, wherein the phone enhancer application communicates with the phone enhancer and displays in a list an identification of the other cell phones connected the phone enhancer.

9. A phone holder according to claim 1, wherein when the vehicle has multiple users whose cell phone have previously connected to the phone enhancer, the phone enhancer does not allow an audio service or a keypad service until a driver of the vehicle is determined.

10. A phone holder according to claim 1, wherein the phone enhancer includes a power charger adapter connection and a USB connector connection.

11. A mobile device holder for holding a mobile device in a vehicle, the mobile device holder including:
   a phone enhancer and a cradle attached to the phone enhancer configured to hold a mobile device in a vehicle, the phone enhancer wirelessly connected to the mobile device, wherein the phone enhancer includes a Bluetooth connection for wireless connection of the mobile device to the phone enhancer, the cradle including a triangular hold securement system connected to the cradle, wherein the triangular hold securement system includes a first grab post, a second grab post, and a third grab post, wherein the first grab post and the second grab post are positioned to contact and engage on one of two long sides of the mobile device and the third grab post is positioned to contact and engage on the opposite long side of the mobile device, and further wherein the first grab post and third grab post are connected by a first arm and the second grab posts and the third grab post are connected by a second arm, wherein the first arm and the second arm are connected to a linkage element providing biasing forces to the first arm, the second arm, and the grab posts to secure the mobile device to the cradle;

a keypad wirelessly connected to the phone enhancer, wherein the keypad includes a Bluetooth connection for wireless connection of the keypad to the phone enhancer, wherein the keypad receives one or more keypad events and instructions that include one or more of the following: answer the mobile device, hang up the mobile device, pause and play music from the mobile device, adjust the volume of a phone call on the mobile device, adjust the volume of the music on the mobile device, and dial a phone number for a phone call on the mobile device; and a phone enhancer application installed and operated on the mobile device, wherein the phone enhancer application determines a driver of the vehicle when multiple users are in the vehicle, wherein when the vehicle has multiple users whose mobile device have previously connected to the phone enhancer, the phone enhancer application starts when the mobile device detects the phone enhancer, and further wherein the phone enhancer retains an order of pairing of cell phones and a least recently used connection list, wherein the least recently used connection list is a list of most recently connected mobile devices to least recently connected mobile devices.

12. A mobile device holder according to claim 11, further including a vehicle mount to secure the phone holder to the inside of the vehicle such that the driver can see the mobile device.

13. A mobile device holder according to claim 11, wherein the phone enhancer transforms the keypad events and instructions to a Bluetooth event and then sends the keypad events and instructions to the mobile device.

14. A mobile device holder according to claim 11, wherein when a mobile device has a valid connection with the phone enhancer, the phone enhancer places an identification associated with the mobile device in the least recently used connection list to the most recently connected mobile device.

15. A mobile device holder according to claim 11, wherein the phone enhancer application communicates with the phone enhancer and displays in a list an identification of the other mobile devices connected the phone enhancer.

16. A mobile device holder according to claim 11, wherein when the vehicle has multiple users whose mobile device have previously connected to the phone enhancer, the phone enhancer does not allow an audio service or a keypad service until a driver of the vehicle is determined.

17. A mobile device holder according to claim 11, wherein the phone enhancer includes a power charger adapter connection and a USB connector connection.

18. A mobile device holder for holding a mobile device in a vehicle, the mobile device holder including:

a phone enhancer and a cradle attached to the phone enhancer configured to hold a mobile device in a vehicle, the phone enhancer wirelessly connected to the mobile device, wherein the phone enhancer includes a Bluetooth connection for wireless connection of the mobile device to the phone enhancer, the cradle including a triangular hold securement system connected to the cradle, wherein the triangular hold securement system includes a first grab post, a second grab post, and a third grab post, wherein the first grab post and the second grab post are positioned to contact and engage on one of two long sides of the mobile device and the third grab post is positioned to contact and engage on the opposite long side of the mobile device, and further wherein the first grab post and third grab post are connected by a first arm and the second grab posts and the third grab post are connected by a second arm, wherein the first arm and the second arm are connected to a linkage element providing biasing forces to the first arm, the second arm, and the grab posts to secure the mobile device to the cradle;

a keypad wirelessly connected to the phone enhancer, wherein the keypad includes a Bluetooth connection for wireless connection of the keypad to the phone enhancer, wherein the keypad receives one or more keypad events and instructions that include one or more of the following: answer the mobile device, hang up the mobile device, pause and play music from the mobile device, adjust the volume of a phone call on the mobile device, adjust the volume of the music on the mobile device, and dial a phone number for a phone call on the mobile device; and a phone enhancer application installed and operated on the mobile device, wherein the phone enhancer application determines a driver of the vehicle when multiple users are in the vehicle, wherein the phone enhancer application communicates with the phone enhancer and displays in a list an identification of the other mobile devices connected the phone enhancer, wherein when the vehicle has multiple users whose mobile device have previously connected to the phone enhancer, the phone enhancer application starts when the mobile device detects the phone enhancer, and wherein when the vehicle has multiple users whose mobile device have previously connected to the phone enhancer, the phone enhancer does not allow an audio service or a keypad service until a driver of the vehicle is determined.

19. A mobile device holder according to claim 18, wherein the phone enhancer retains an order of pairing of cell phones and a least recently used connection list, wherein the least recently used connection list is a list of most recently connected mobile devices to least recently connected mobile devices and when a mobile device has a valid connection with the phone enhancer, the phone enhancer places an identification associated with the mobile device in the least recently used connection list to the most recently connected mobile device.

20. A mobile device holder according to claim 18, wherein the phone enhancer includes a power charger adapter connection and a USB connector connection.

* * * * *